Feb. 11, 1936.  W. F. NEWHOUSE ET AL  2,030,071
MACHINERY FOR MAKING RECEPTACLES
Filed March 28, 1932  40 Sheets-Sheet 1

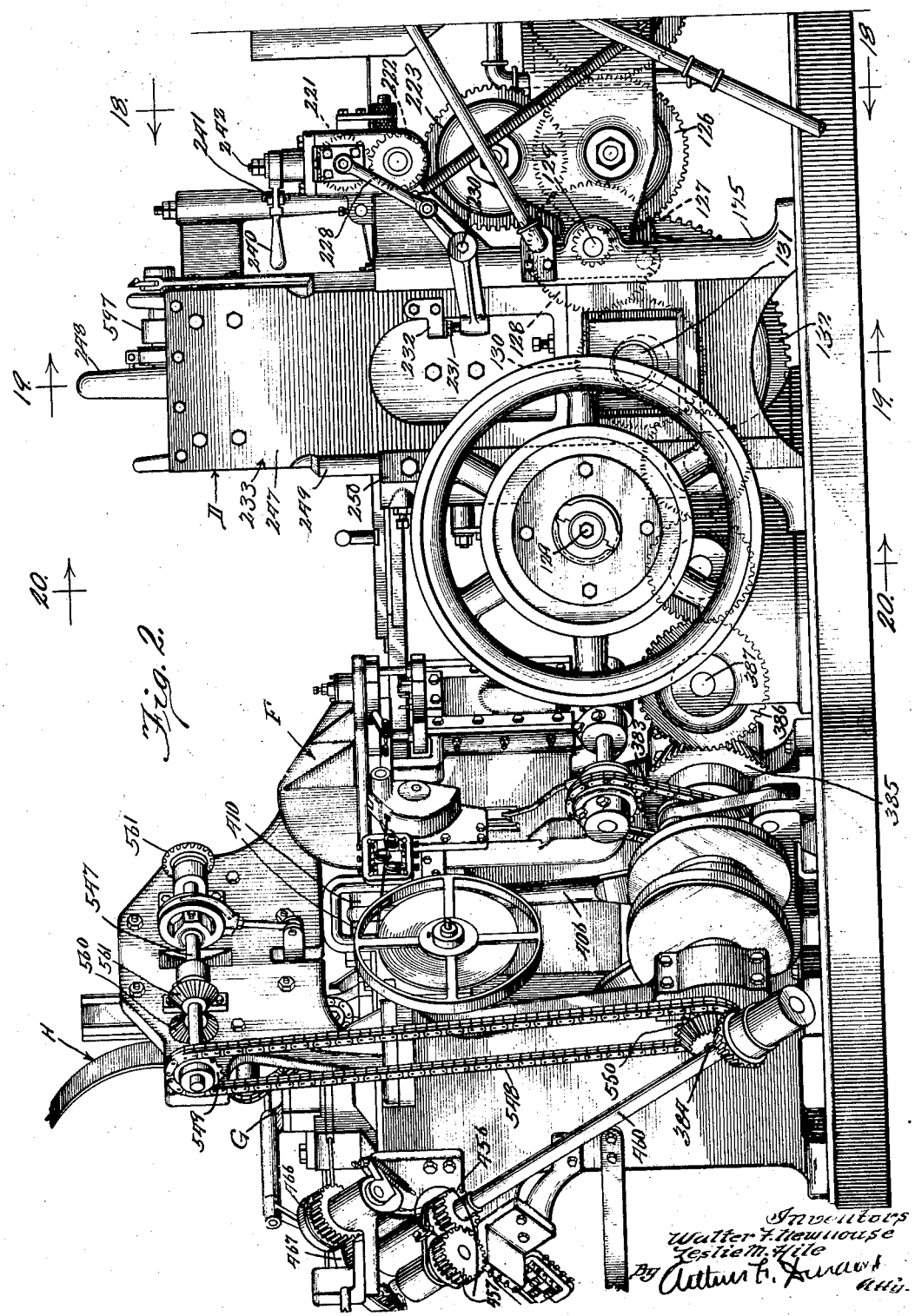

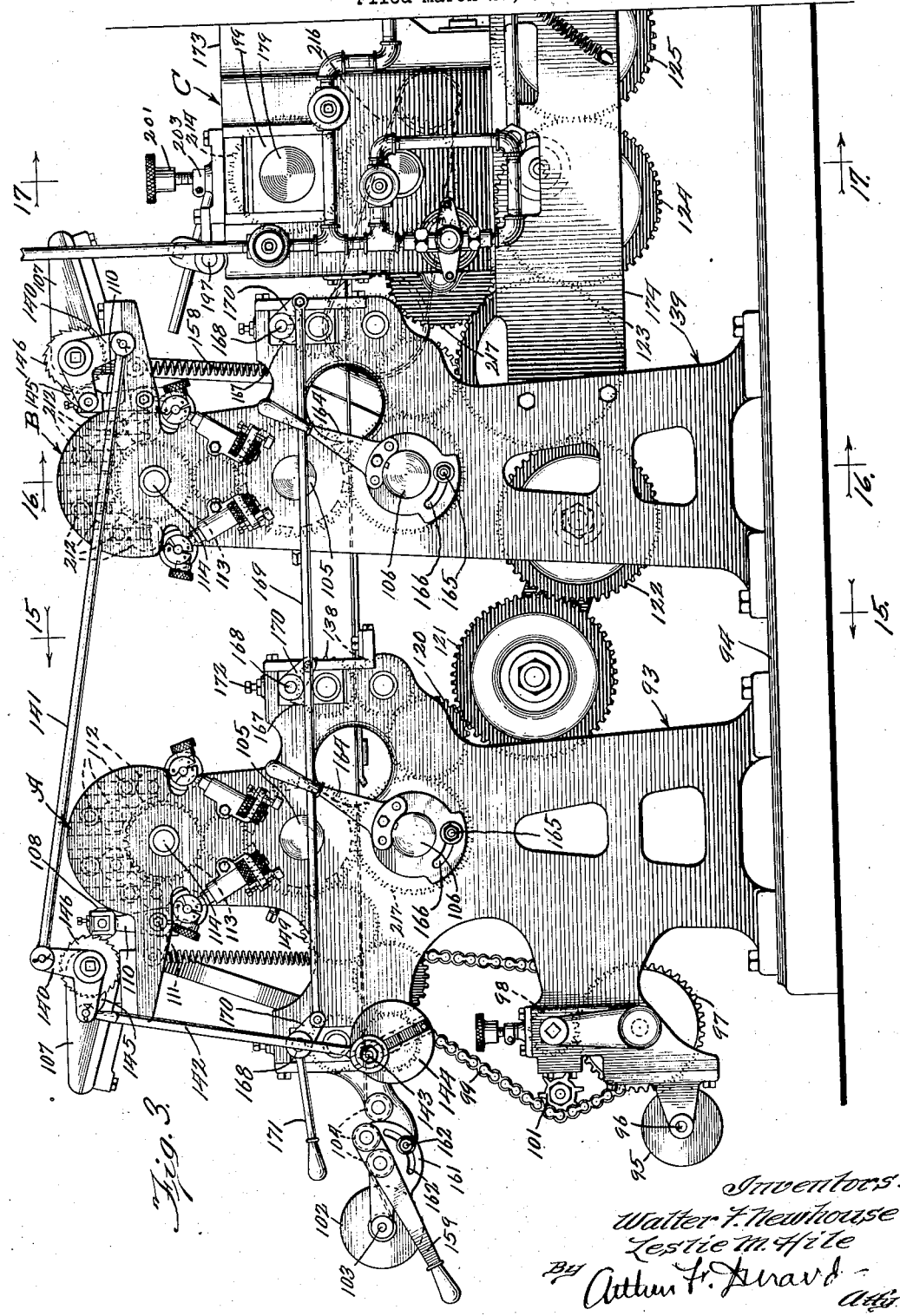

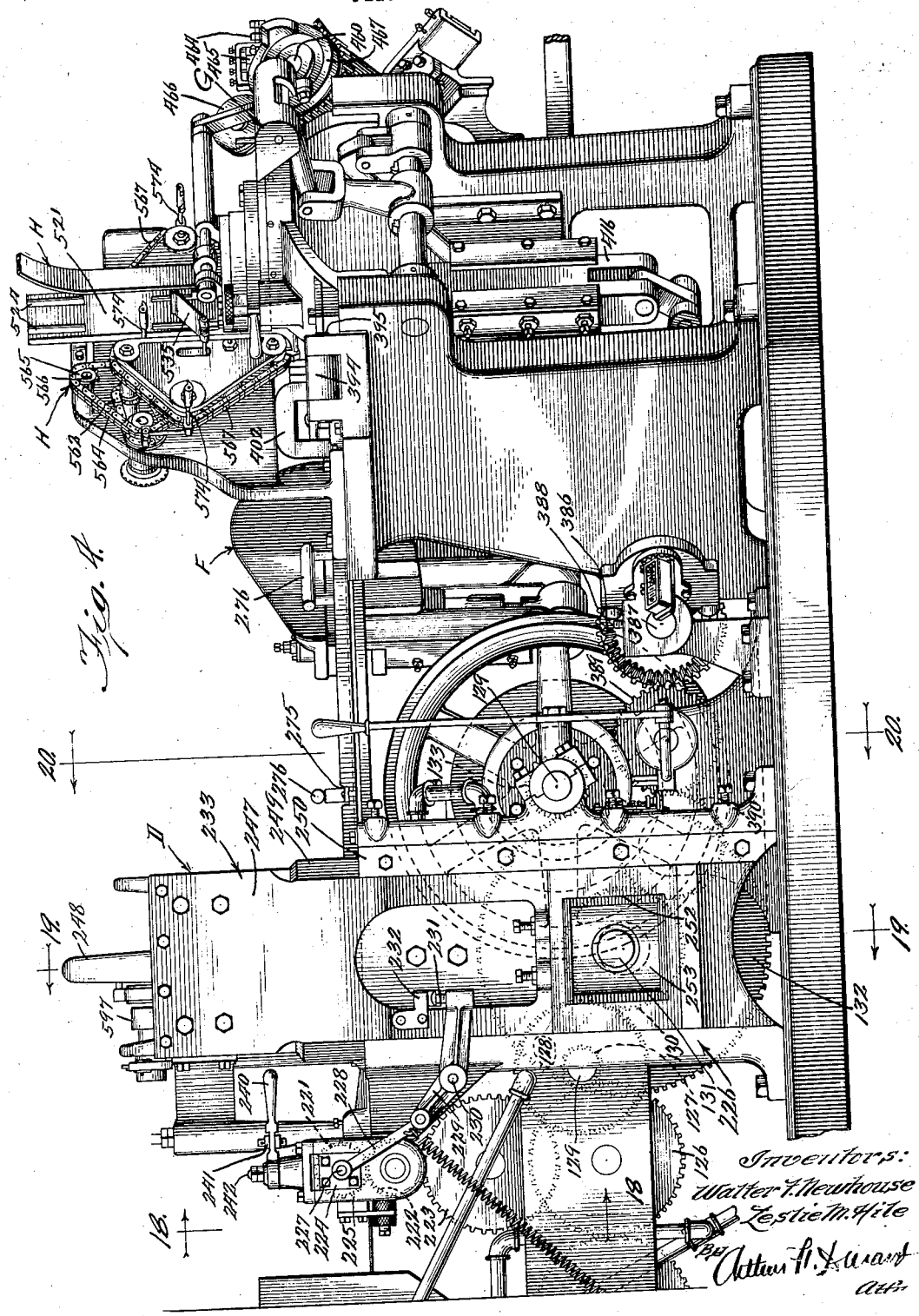

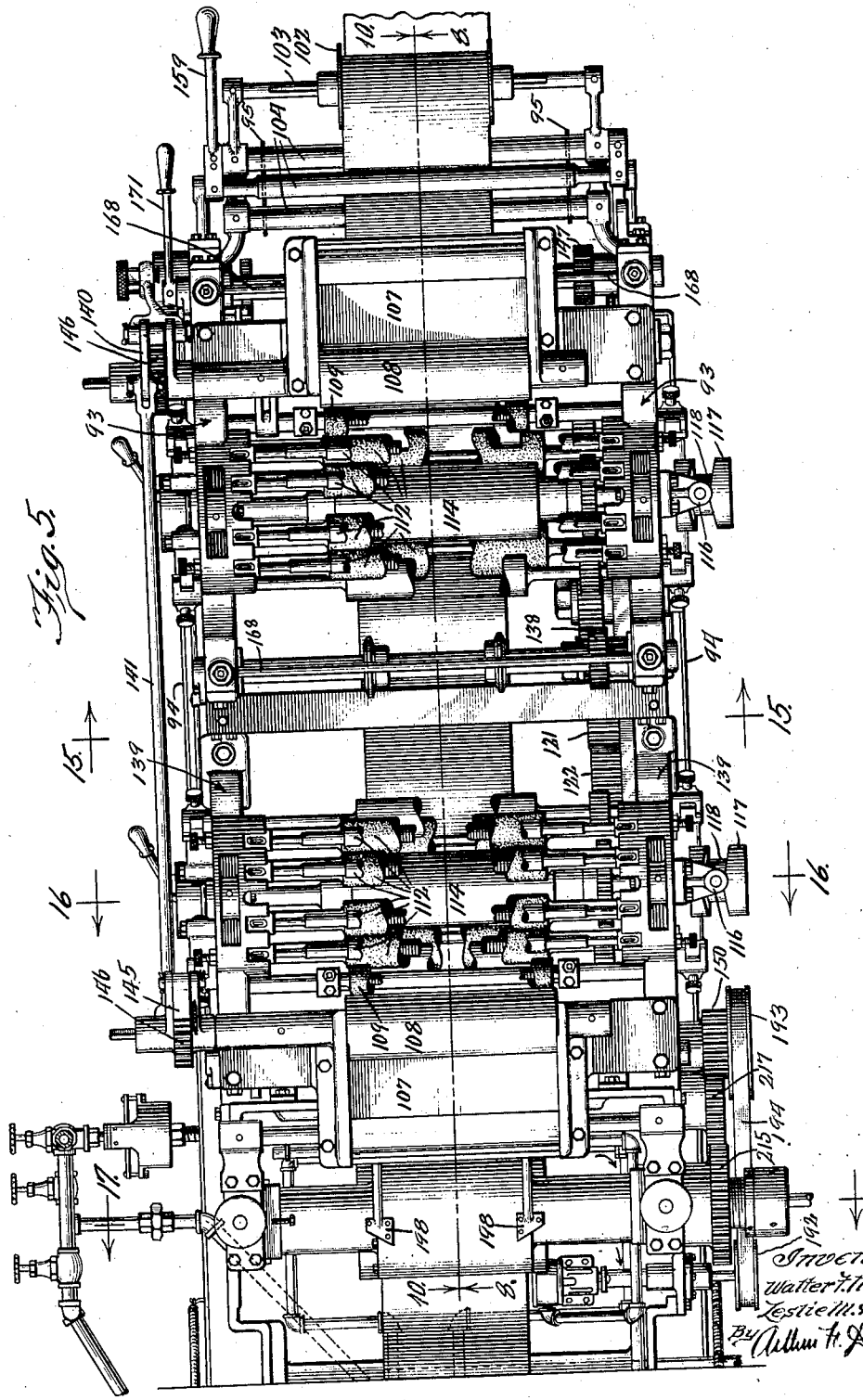

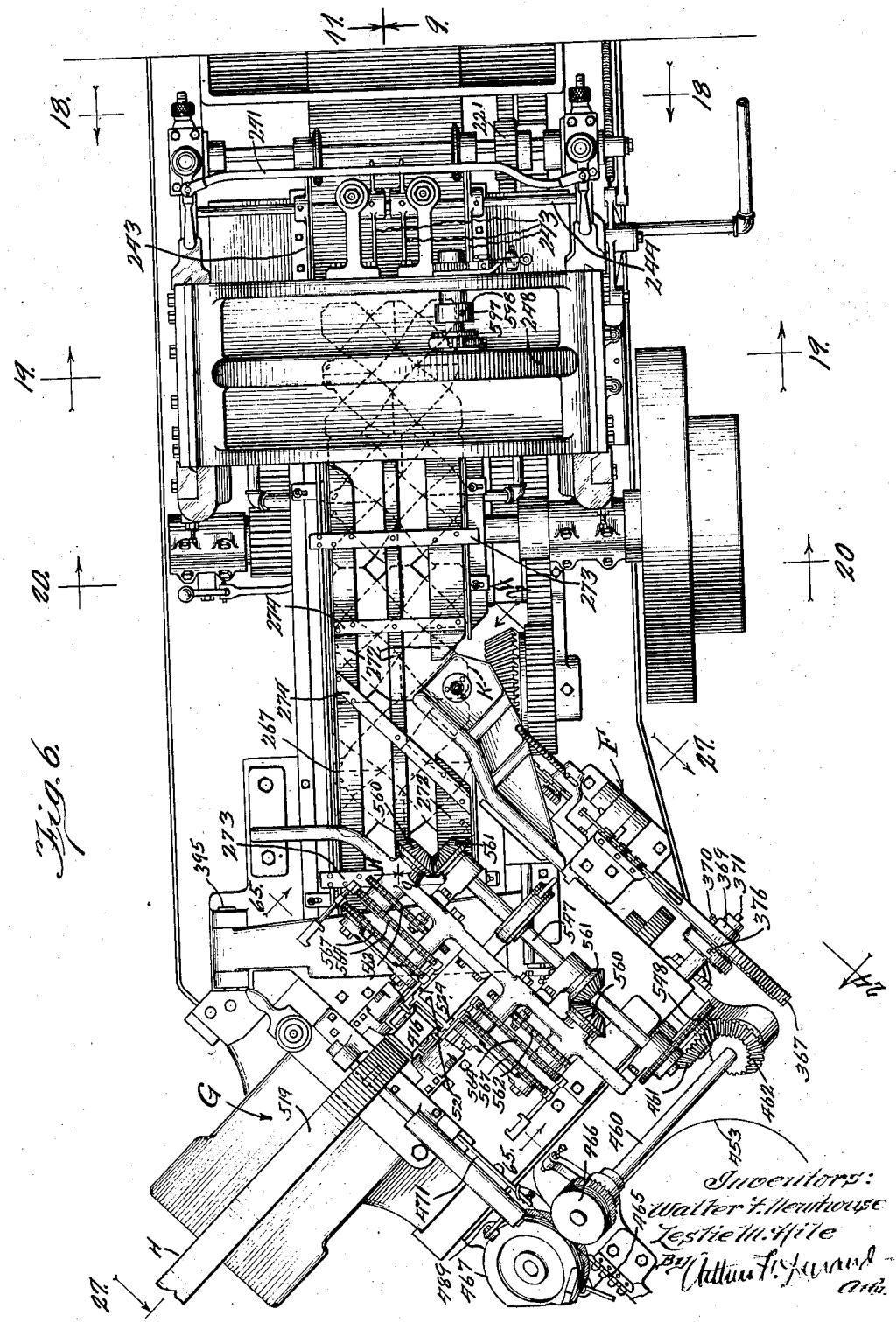

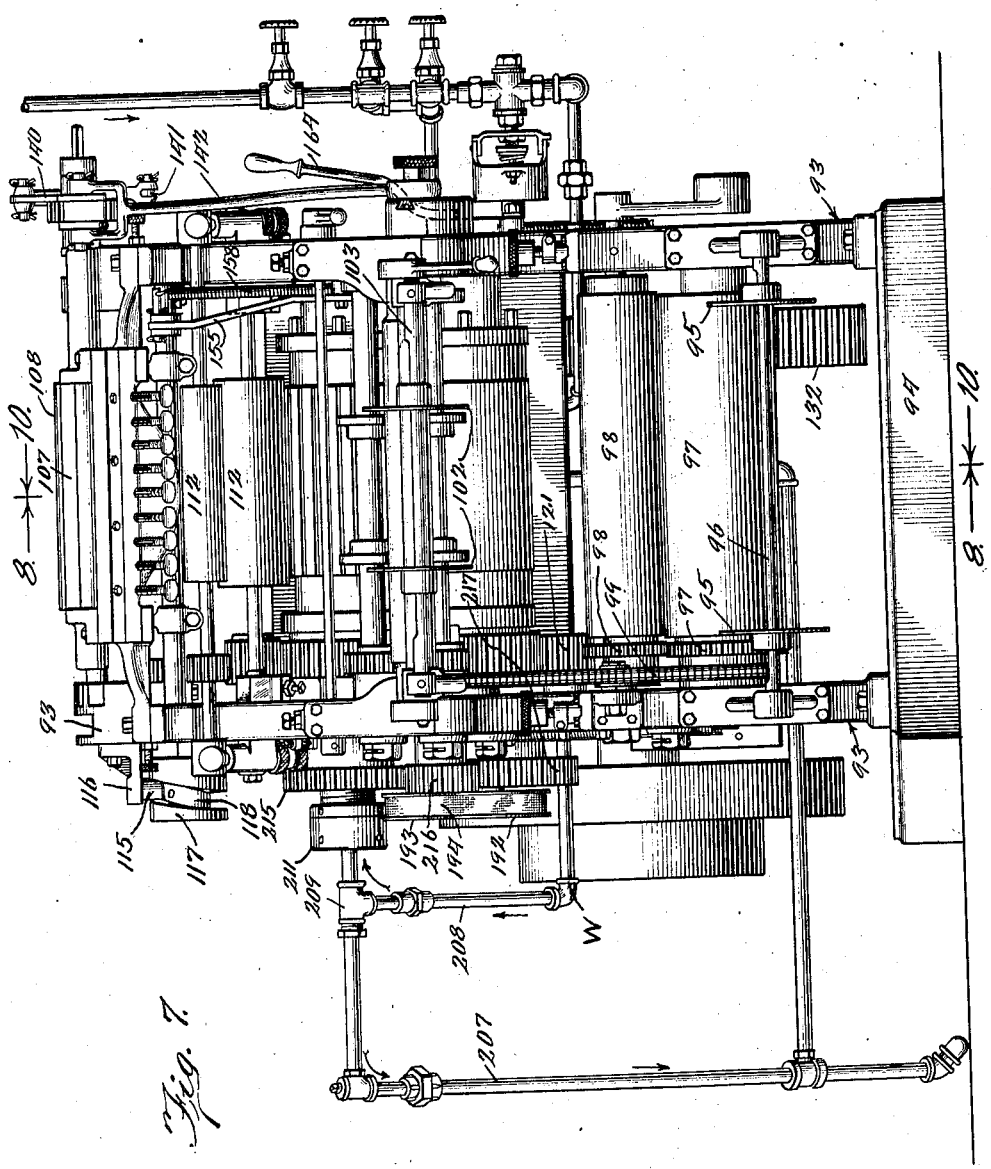

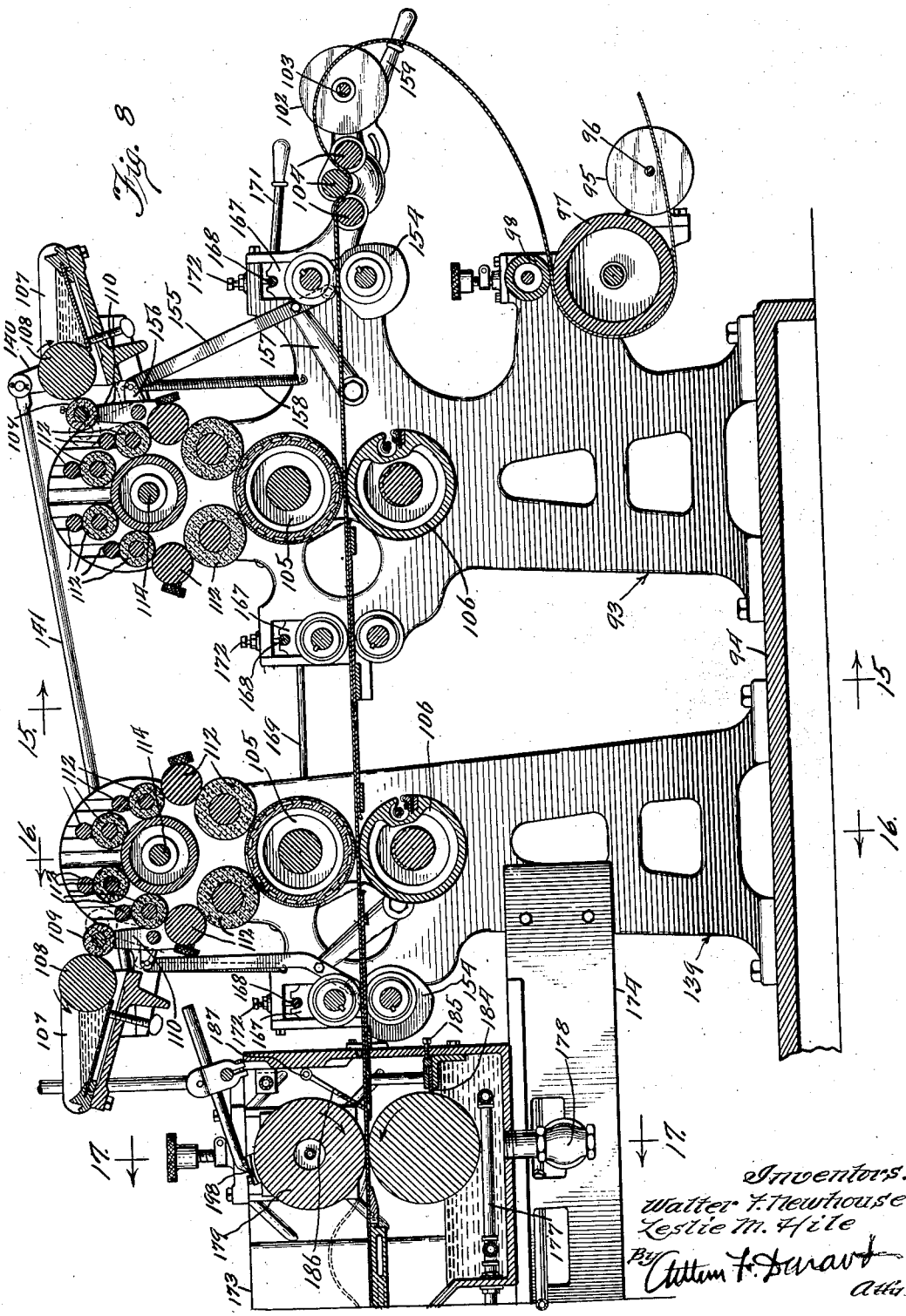

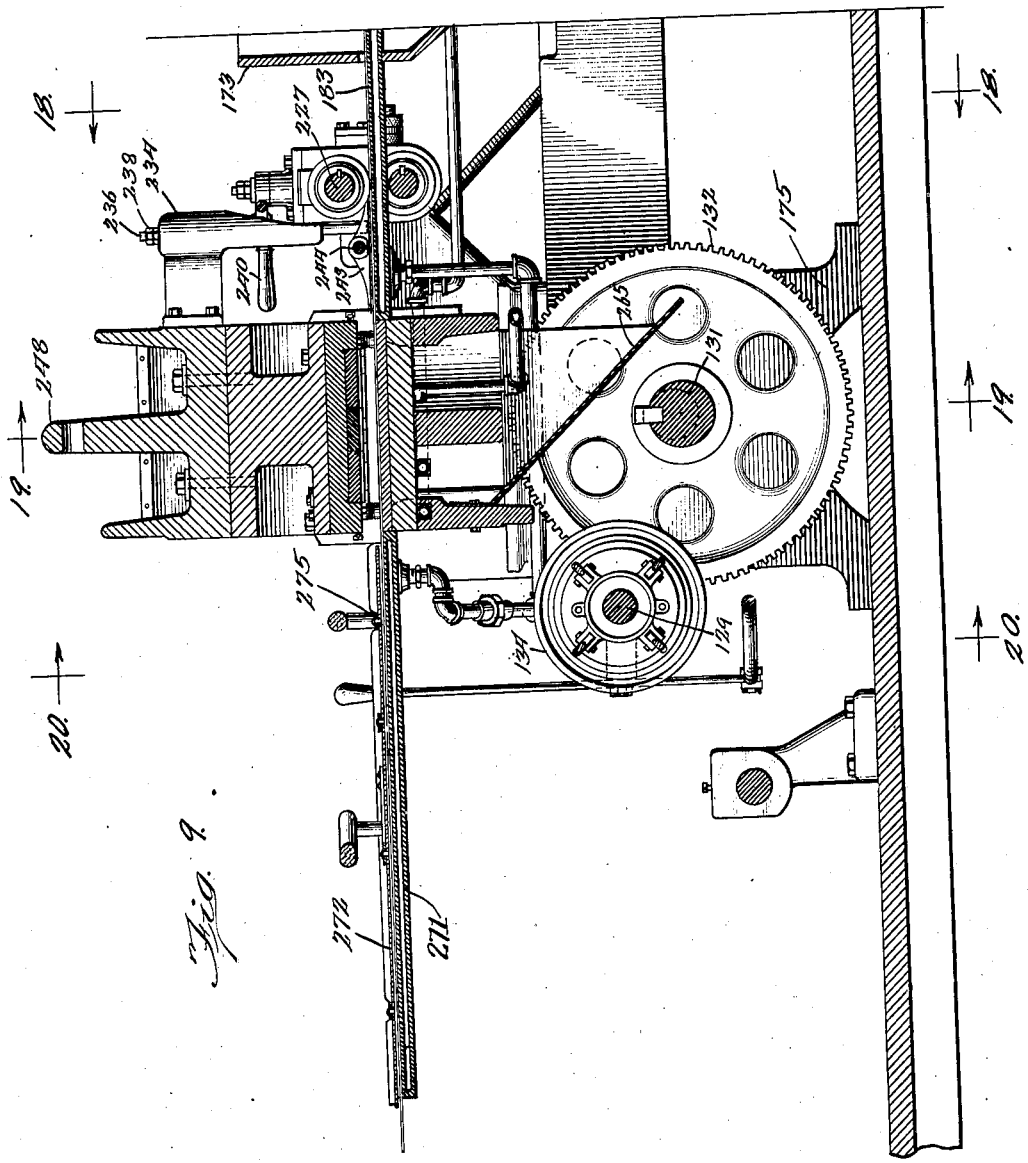

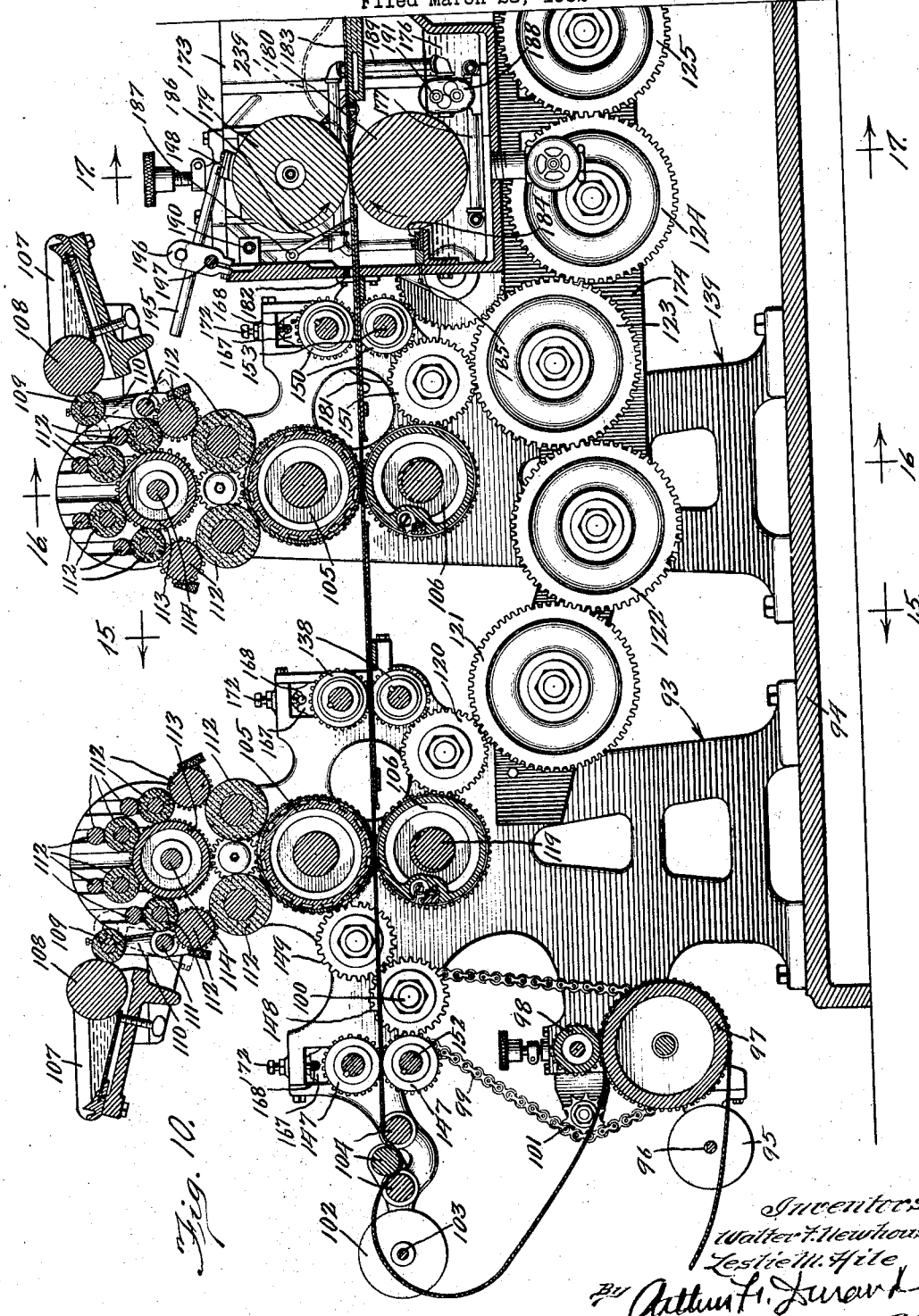

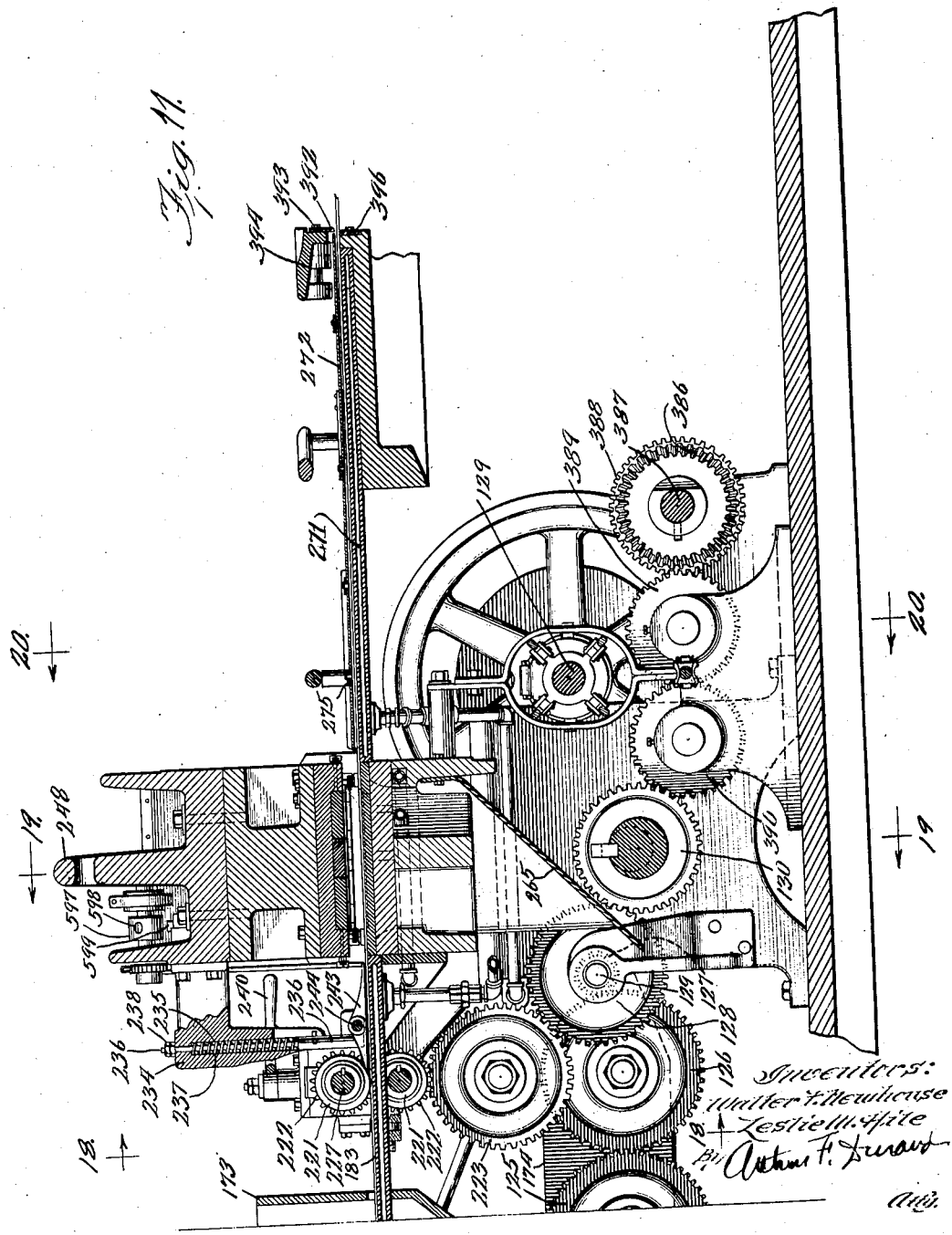

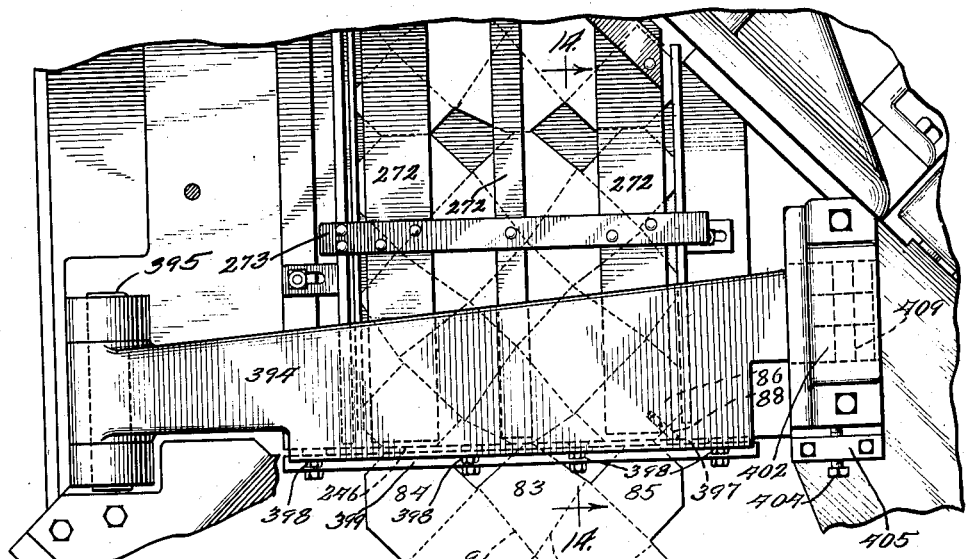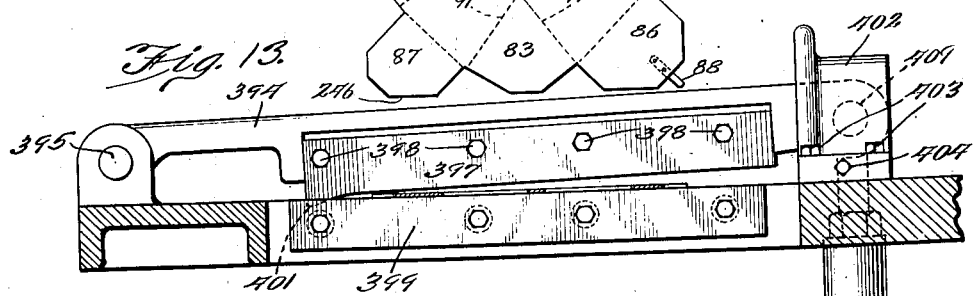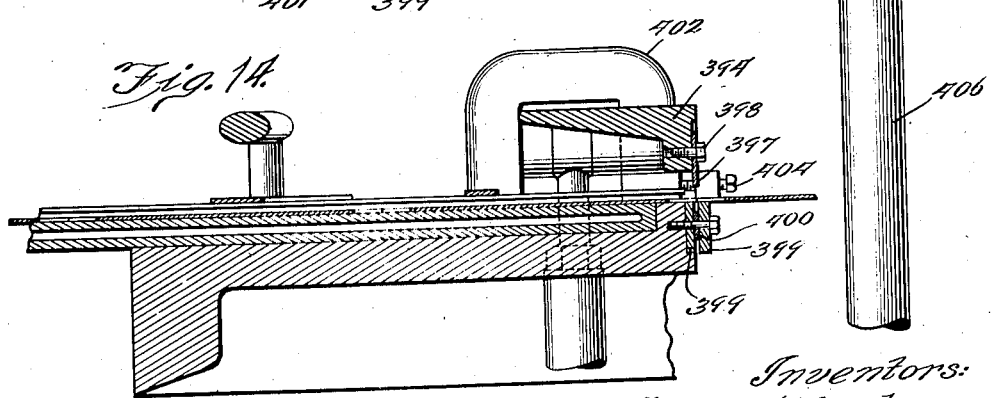

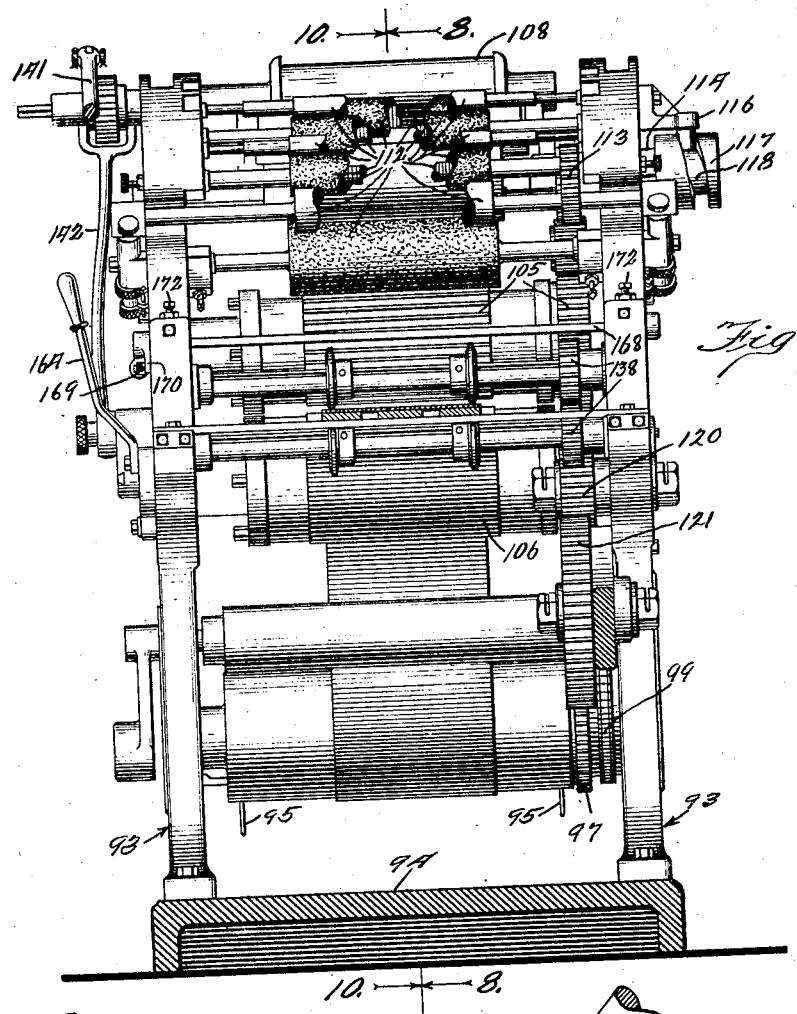
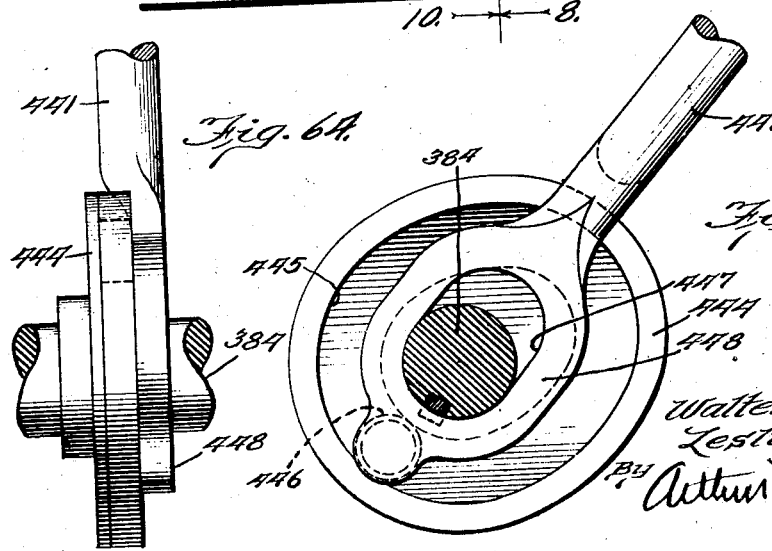

Feb. 11, 1936. W. F. NEWHOUSE ET AL 2,030,071
MACHINERY FOR MAKING RECEPTACLES
Filed March 28, 1932 40 Sheets-Sheet 14

Inventors:
Walter F. Newhouse
Leslie M. Hite
By Arthur F. Durand
Atty.

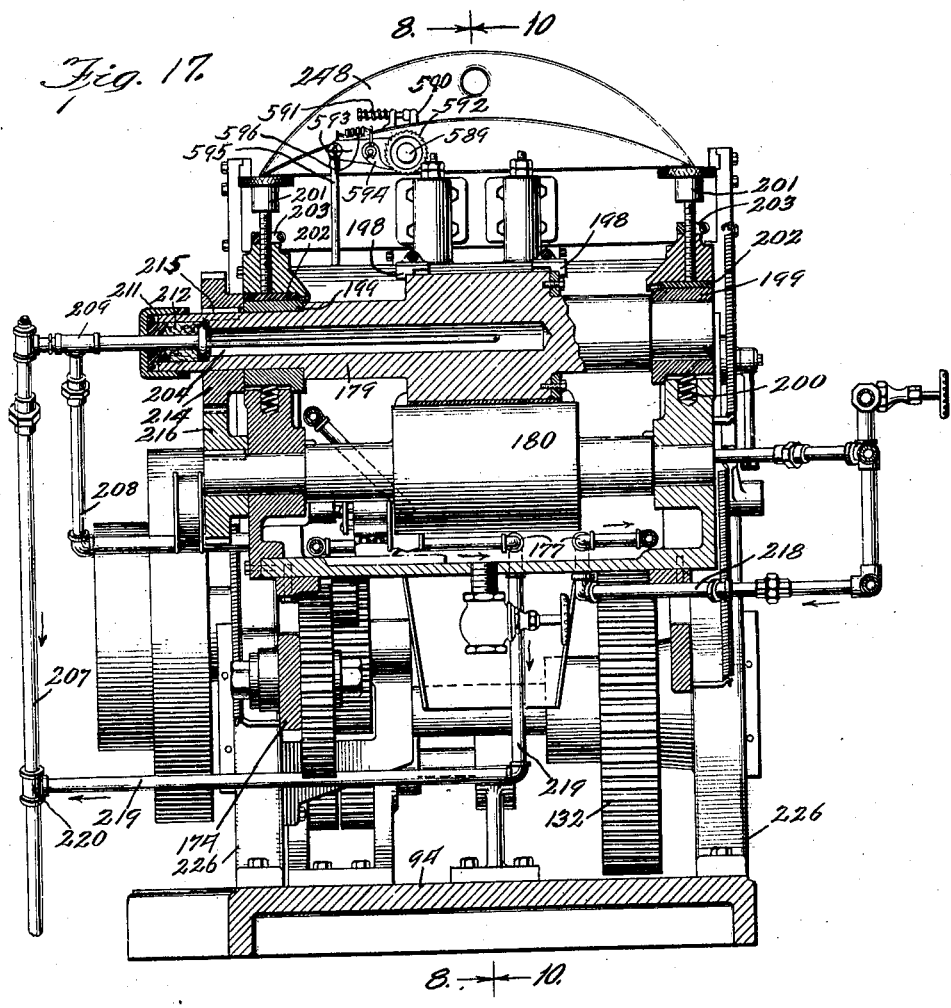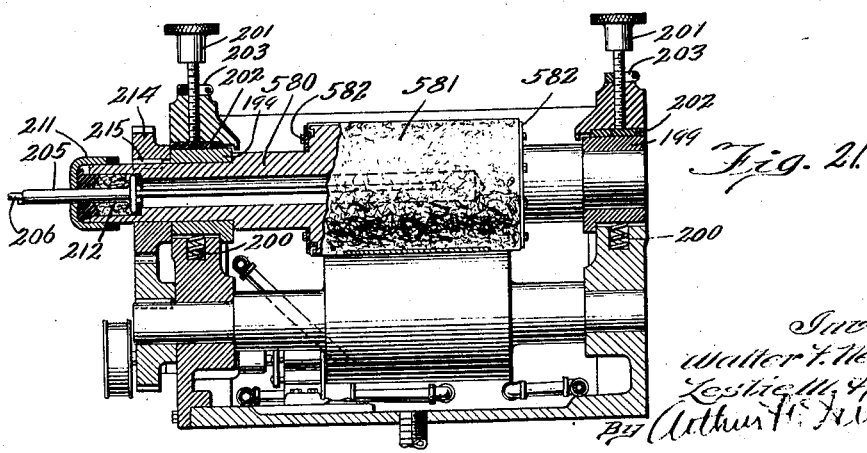

Feb. 11, 1936. W. F. NEWHOUSE ET AL 2,030,071
MACHINERY FOR MAKING RECEPTACLES
Filed March 28, 1932 40 Sheets-Sheet 16

Inventors:
Walter F. Newhouse
Leslie M. Hile
By Arthur F. Durand
Atty.

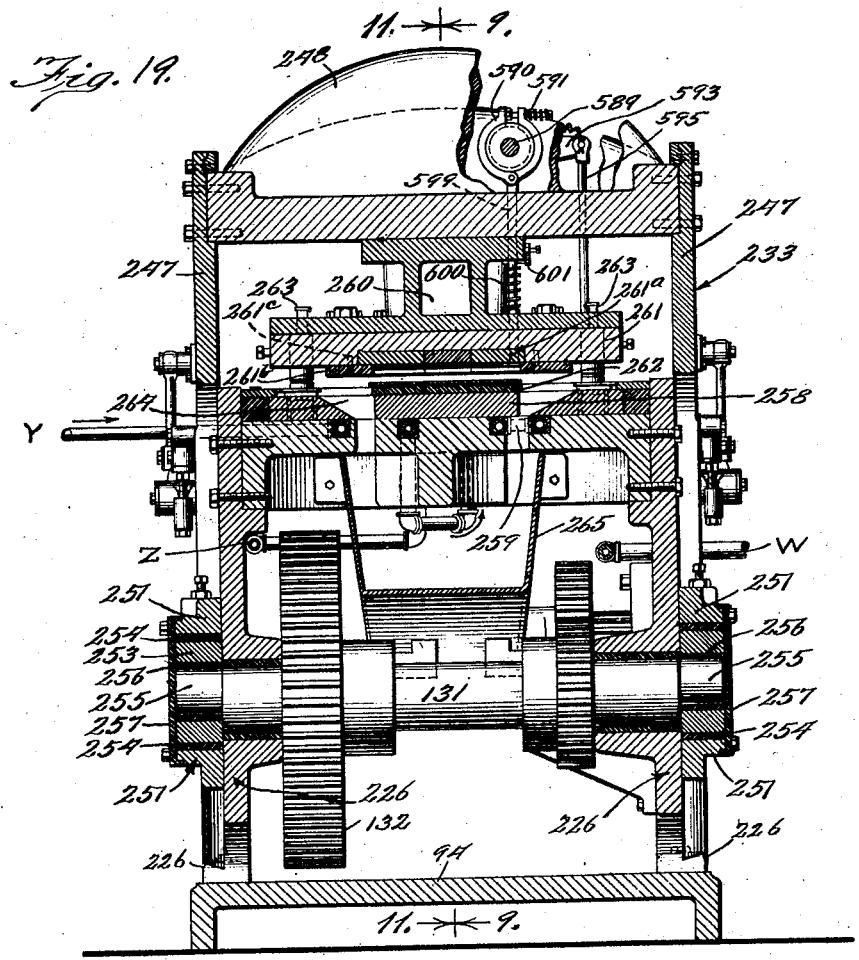
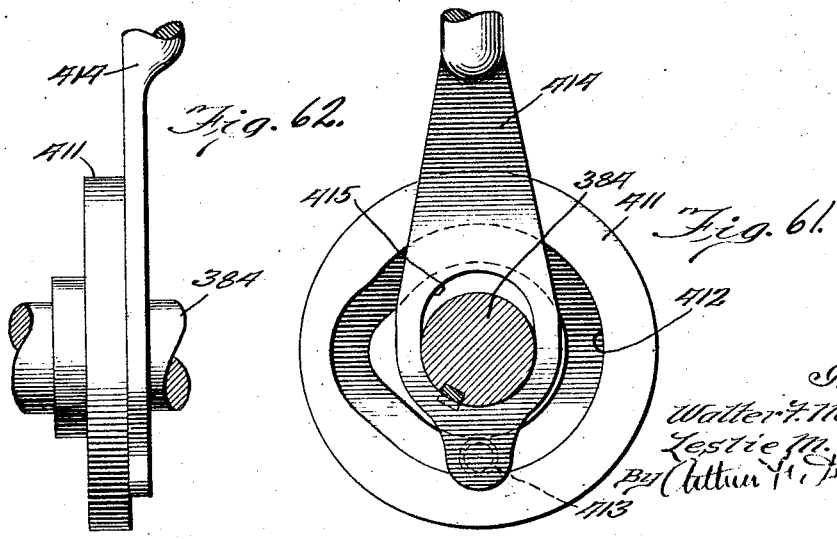

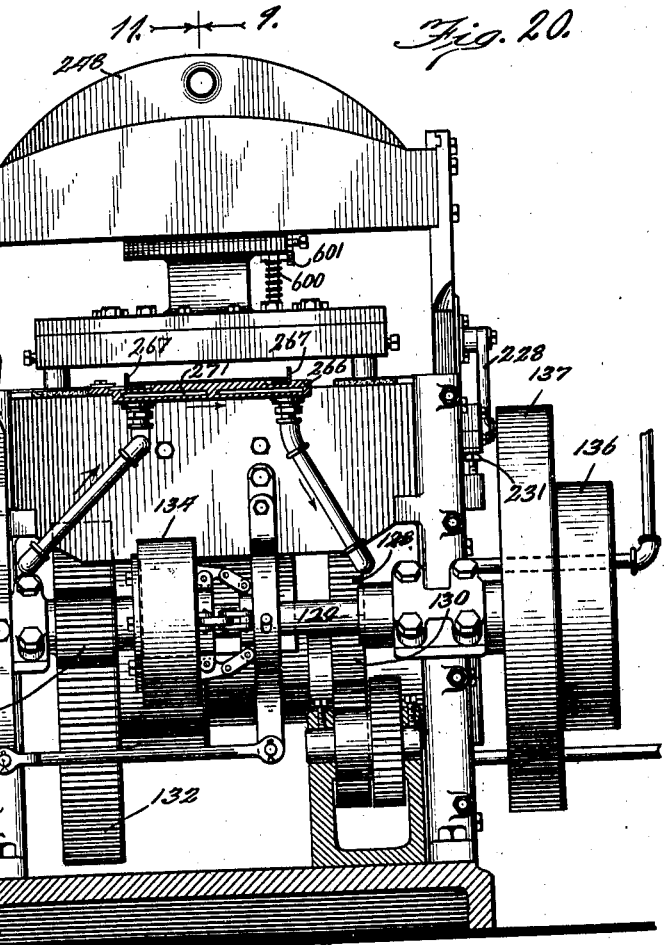
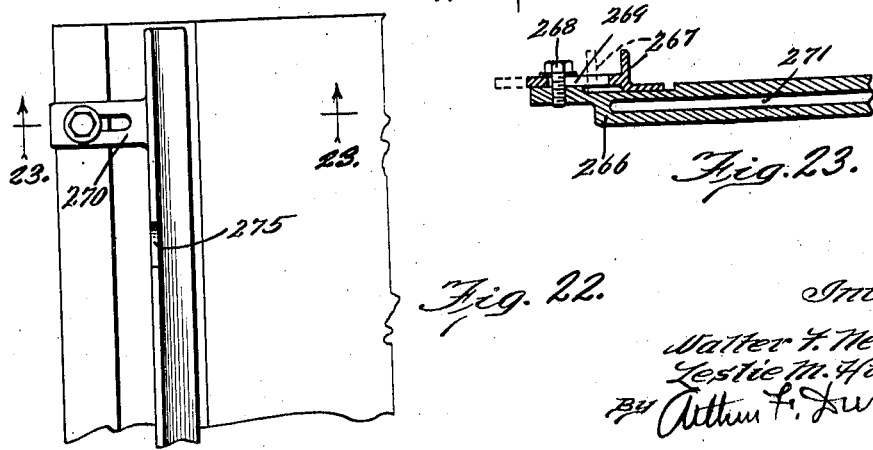

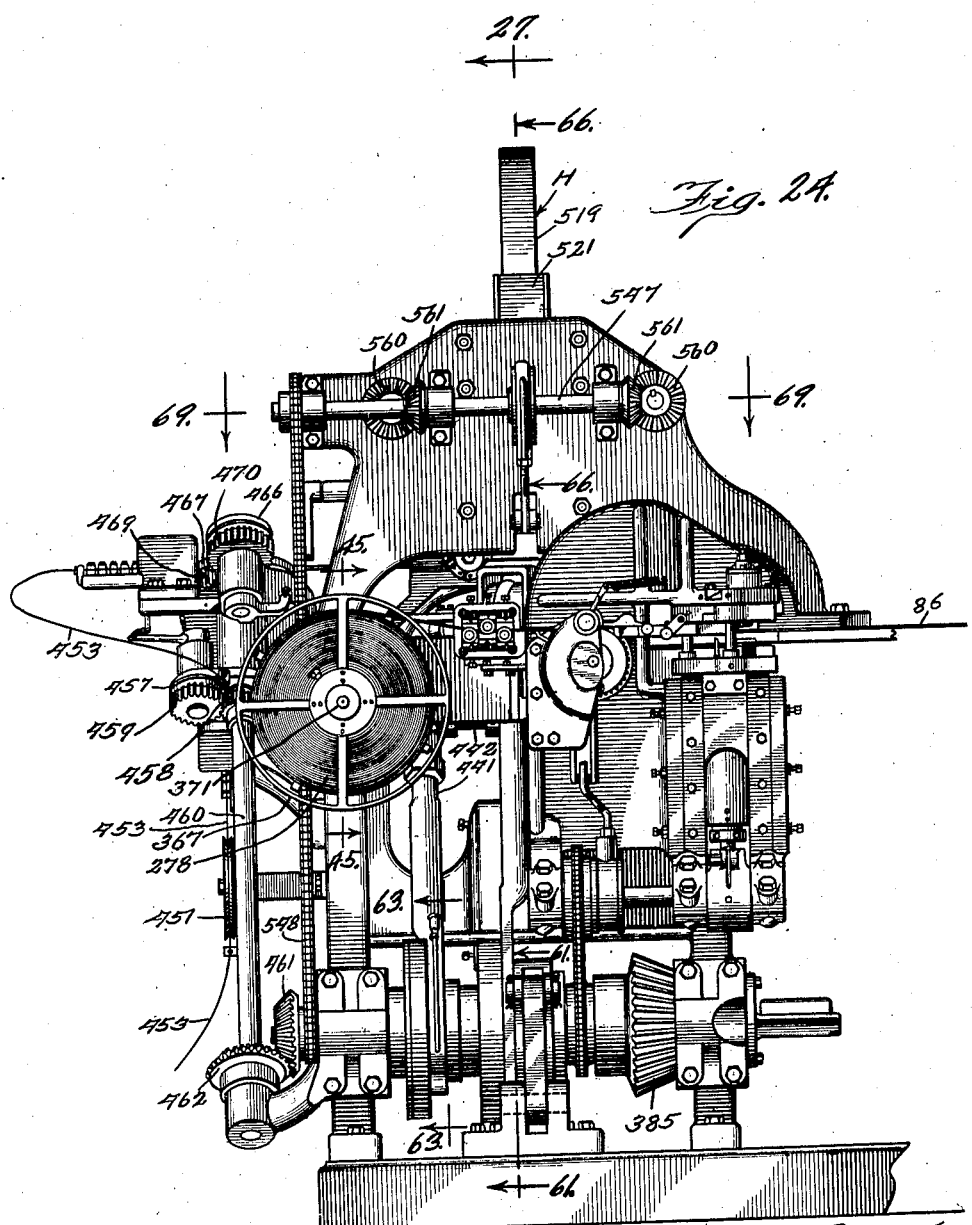

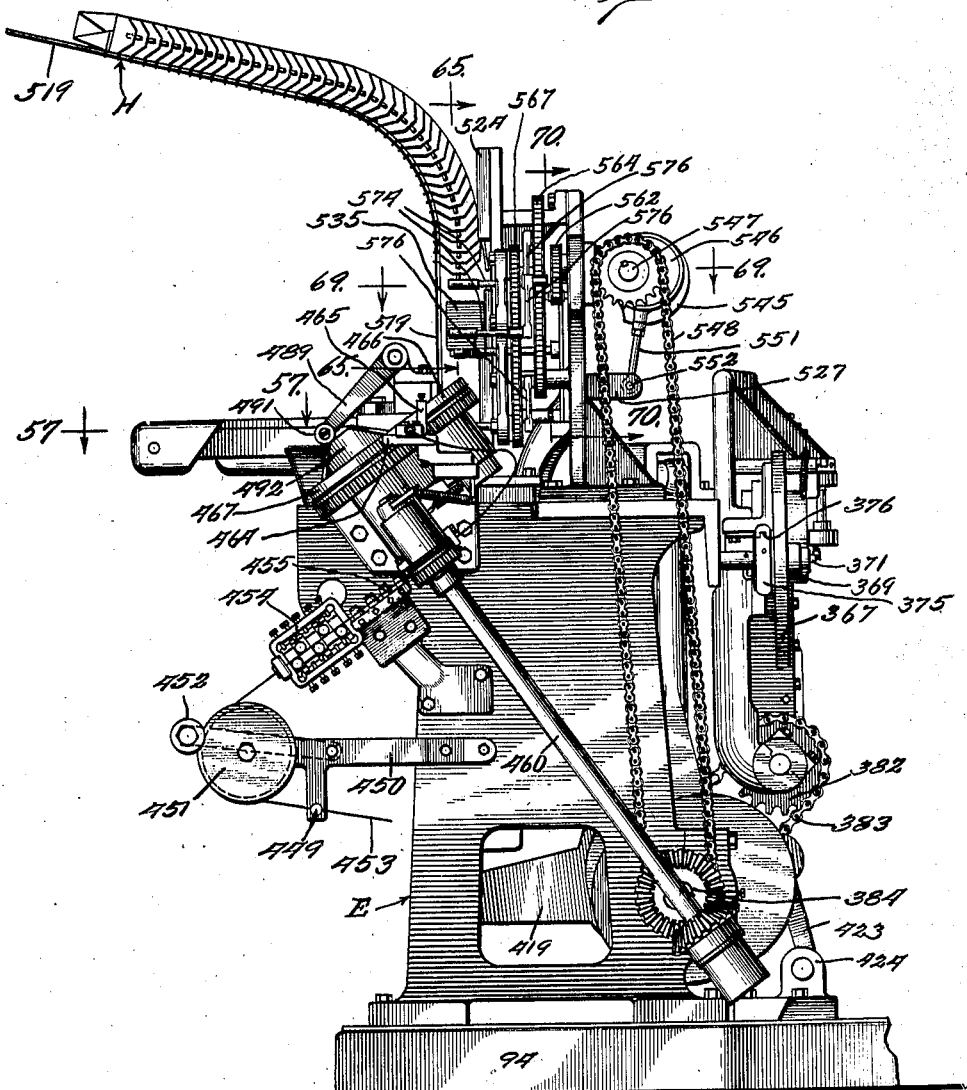

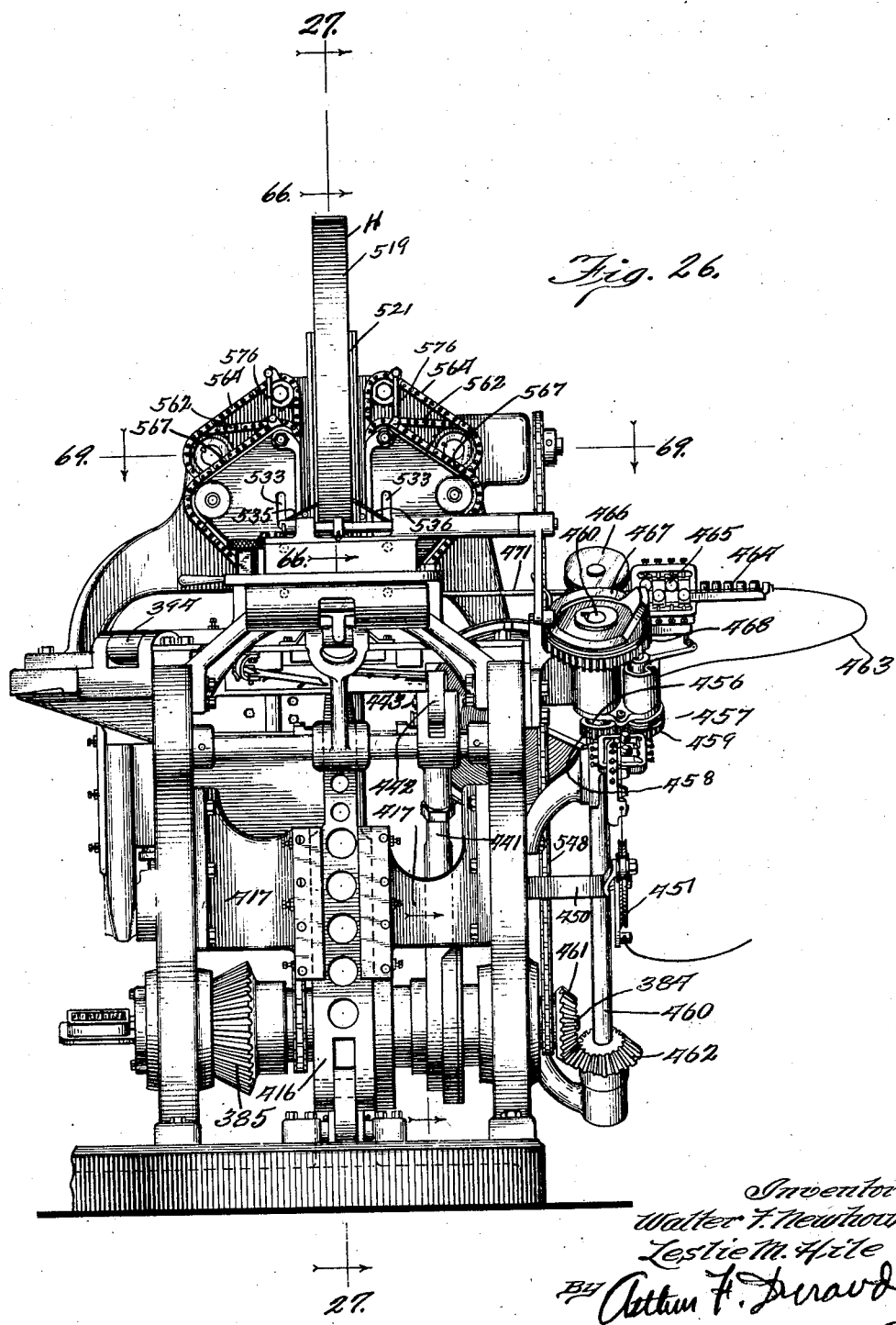

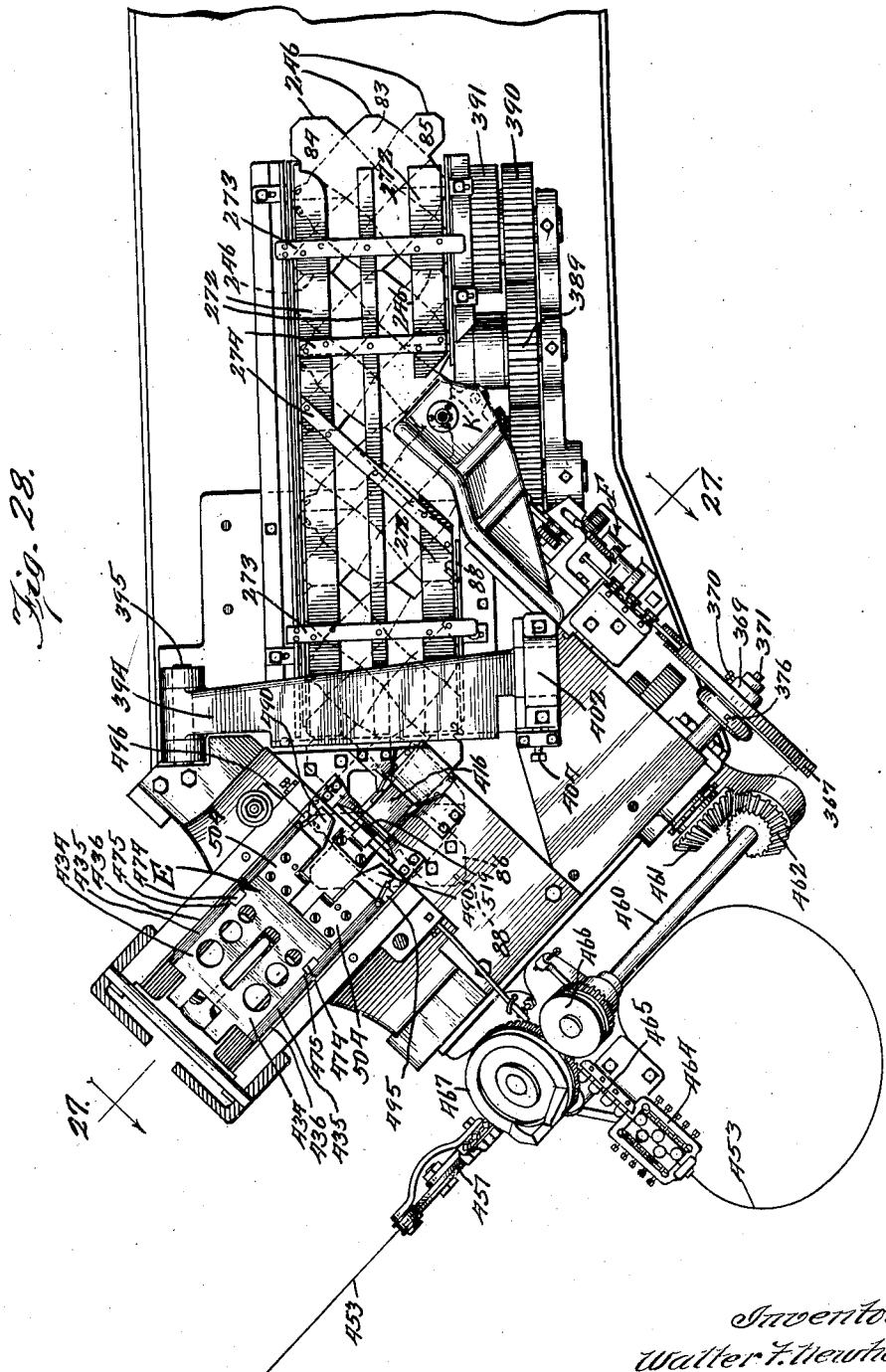

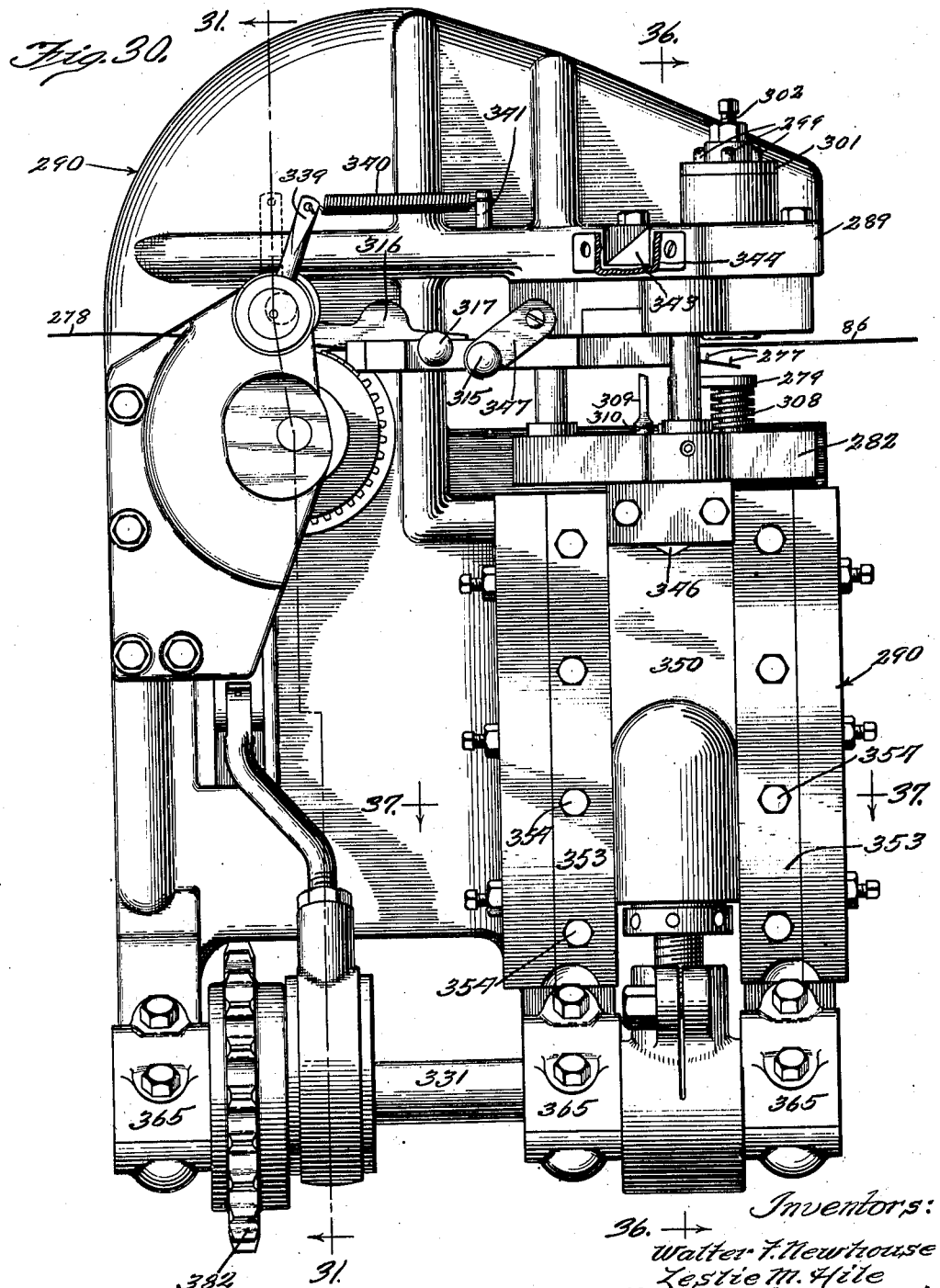

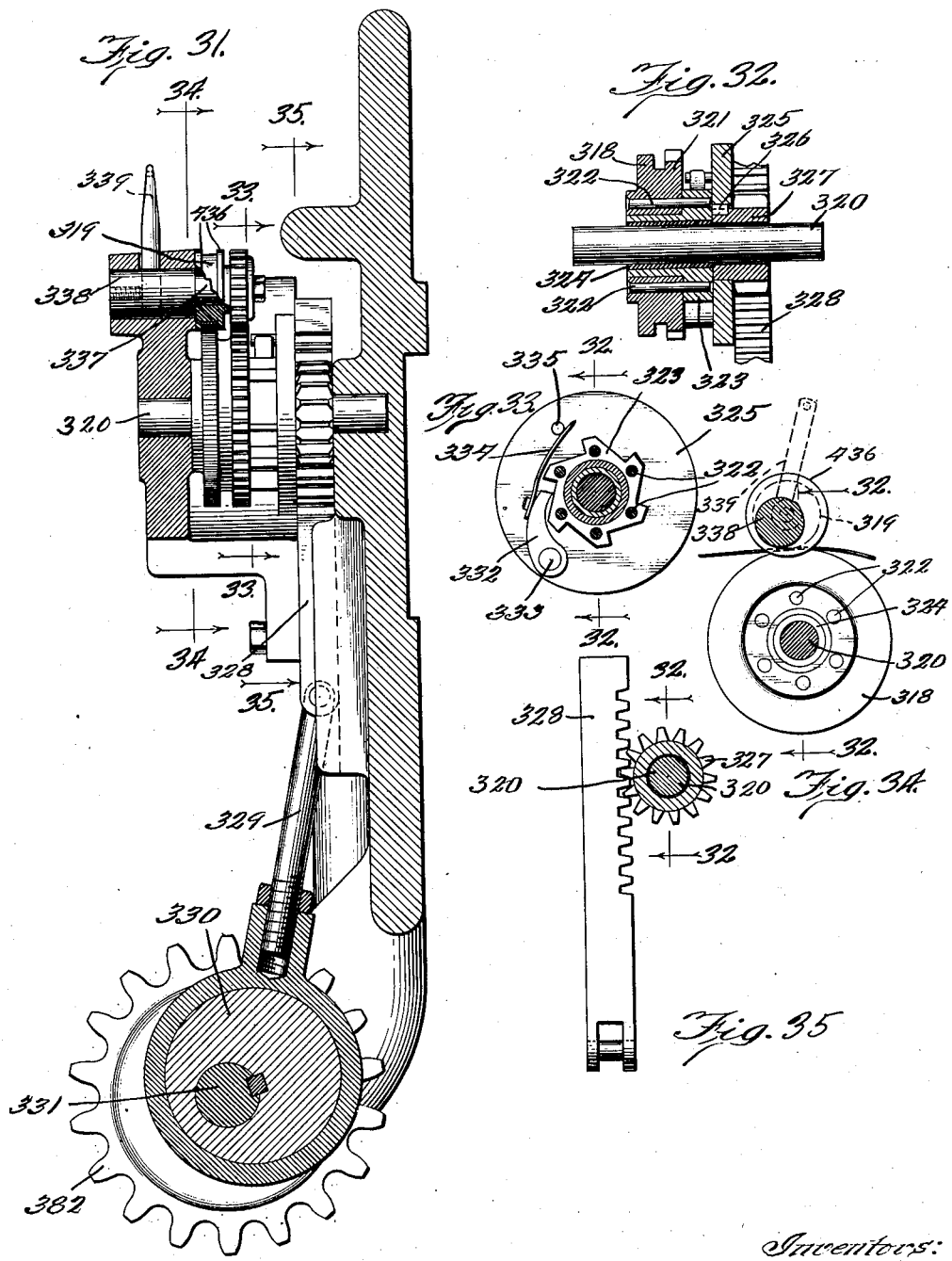

Feb. 11, 1936. W. F. NEWHOUSE ET AL 2,030,071
MACHINERY FOR MAKING RECEPTACLES
Filed March 28, 1932 40 Sheets-Sheet 26
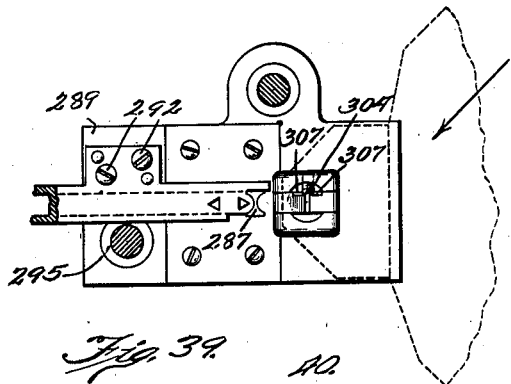
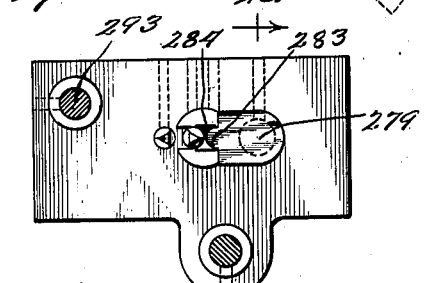
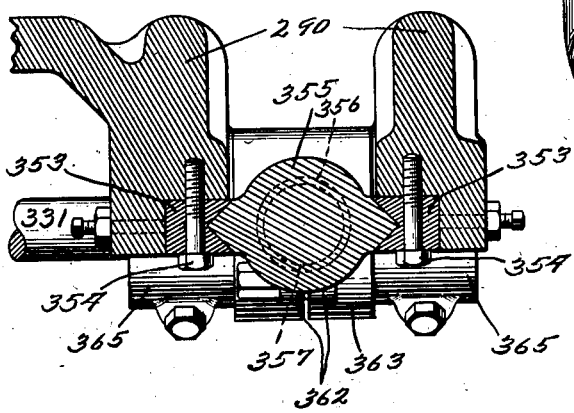
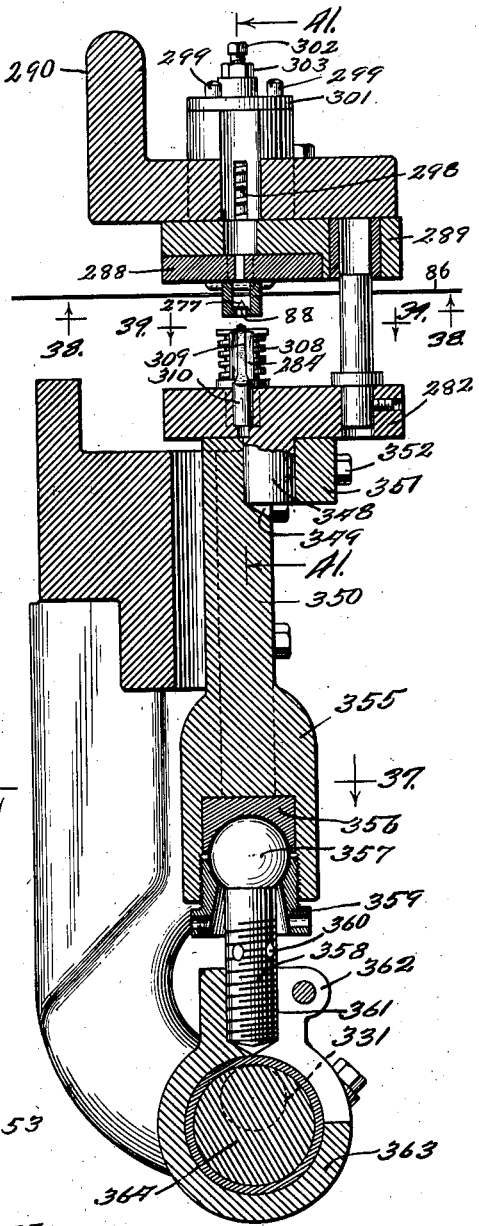
Inventors:
Walter F. Newhouse
Leslie M. Hite
By Arthur F. Durand
Att'y.

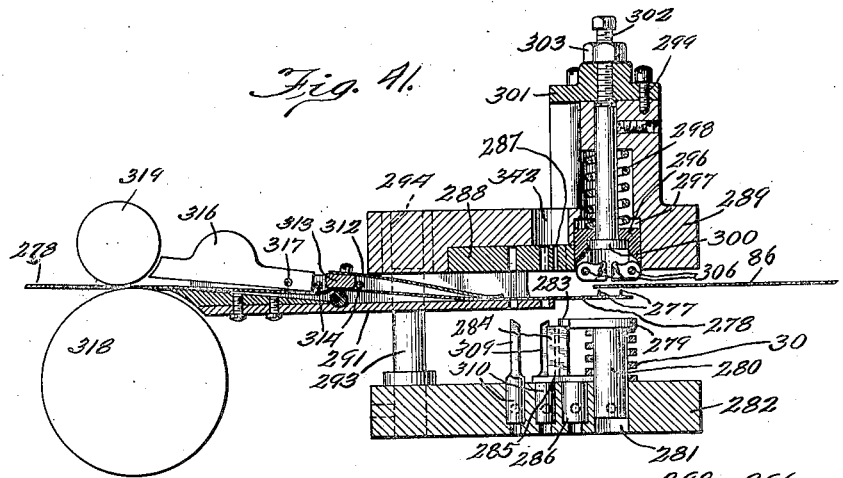
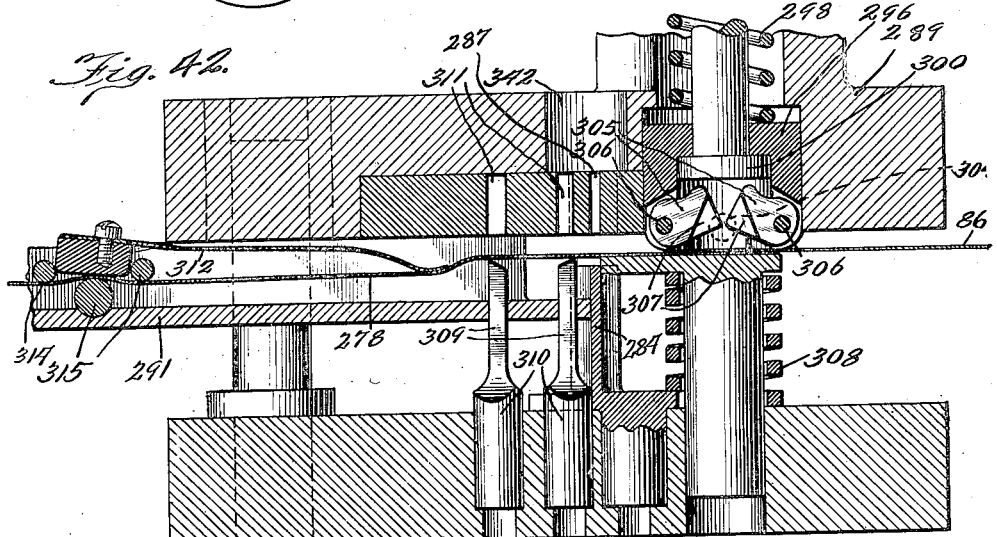
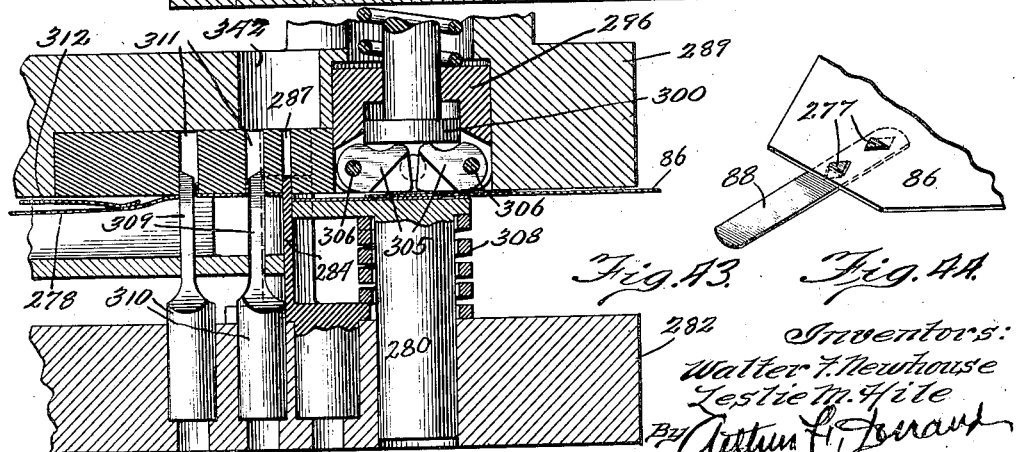

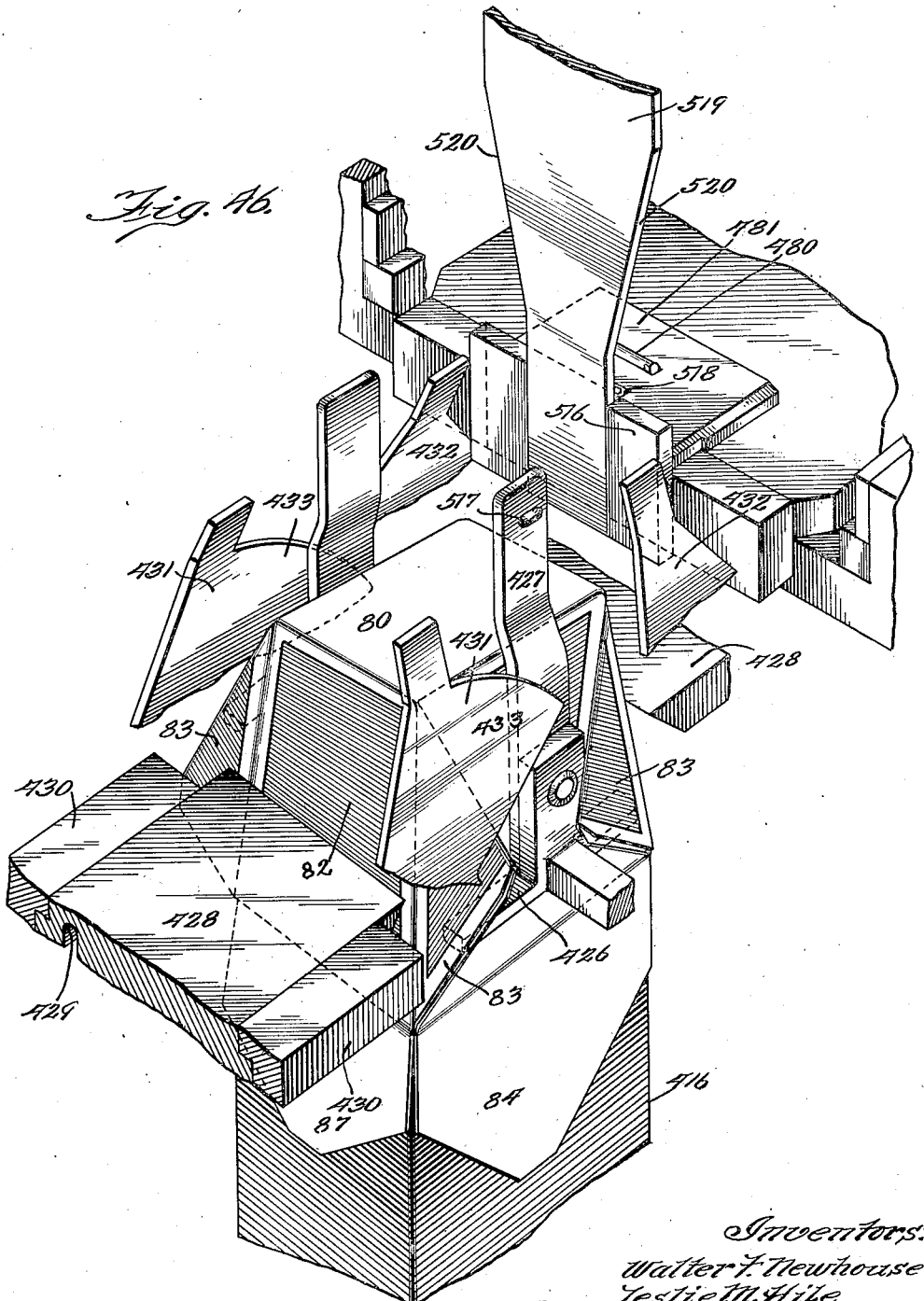

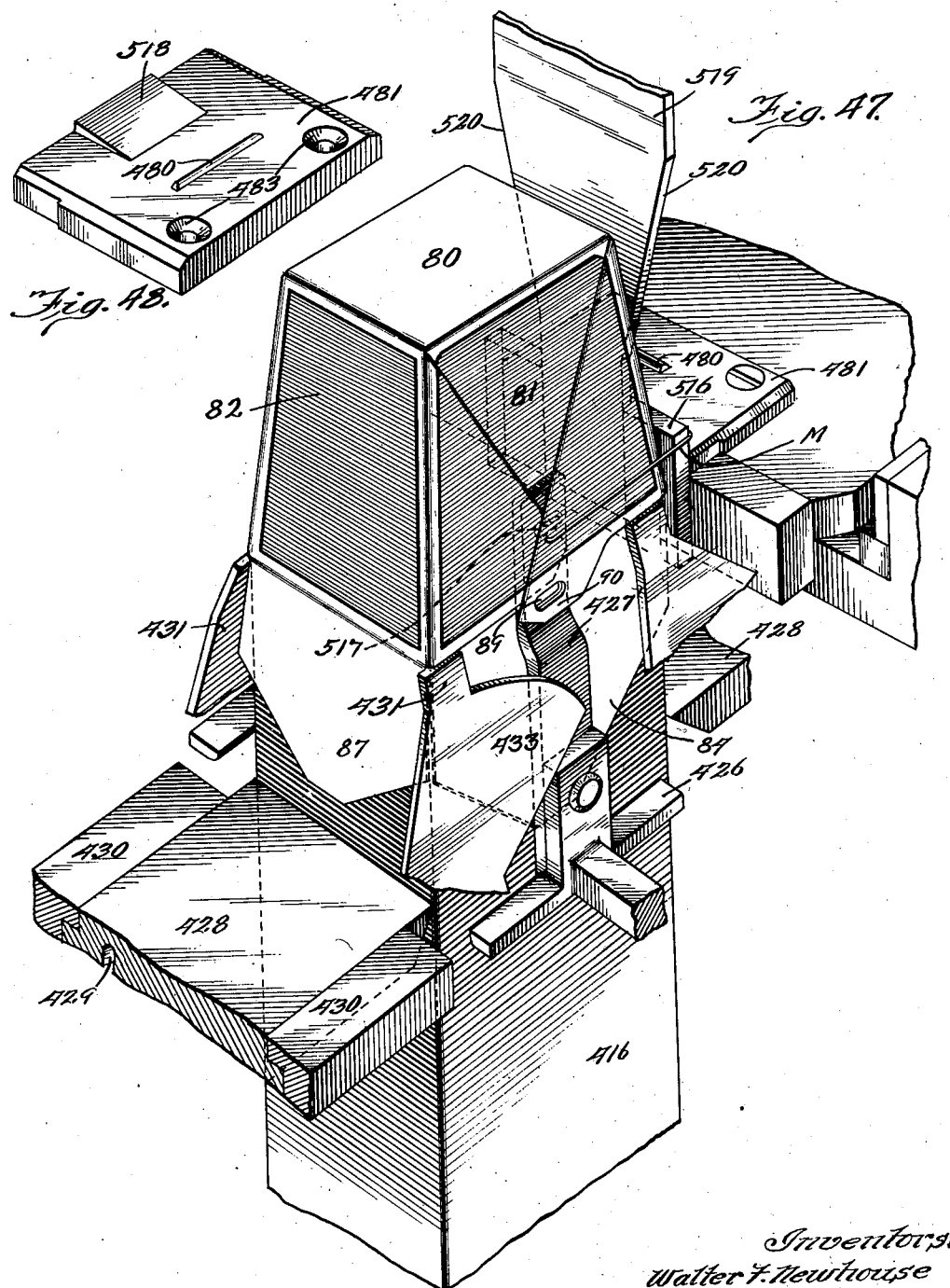

Feb. 11, 1936.  W. F. NEWHOUSE ET AL  2,030,071
MACHINERY FOR MAKING RECEPTACLES
Filed March 28, 1932  40 Sheets-Sheet 30
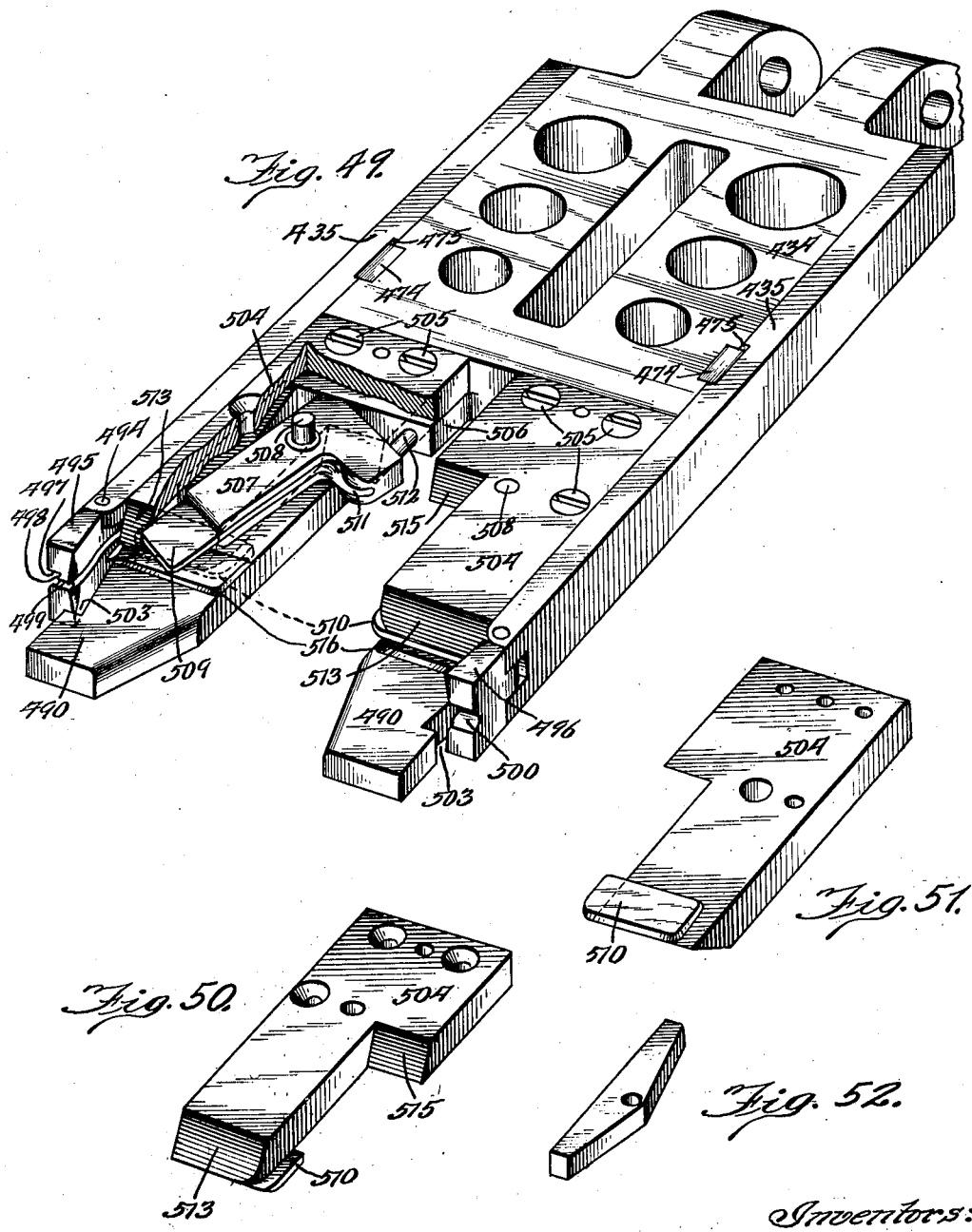

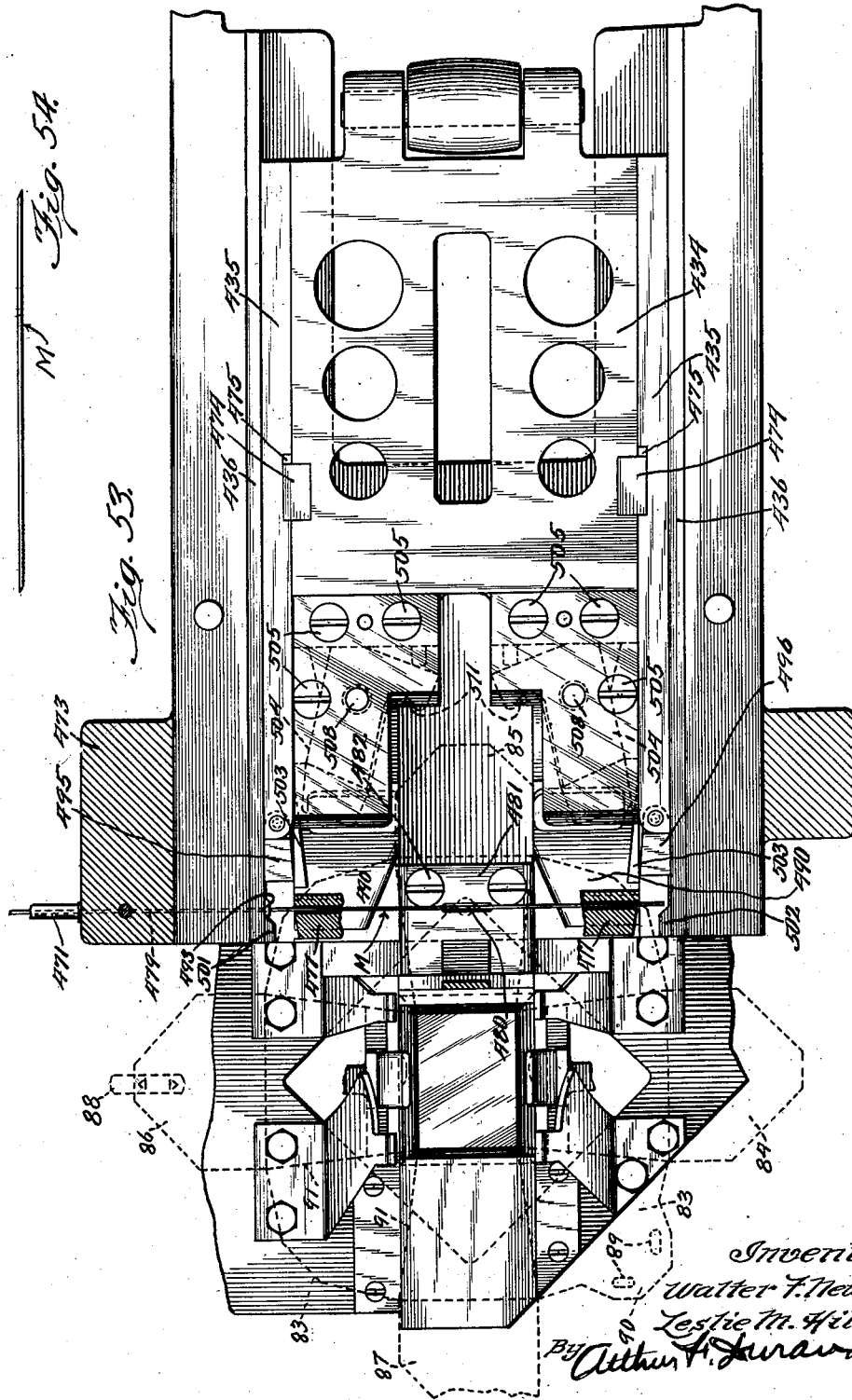

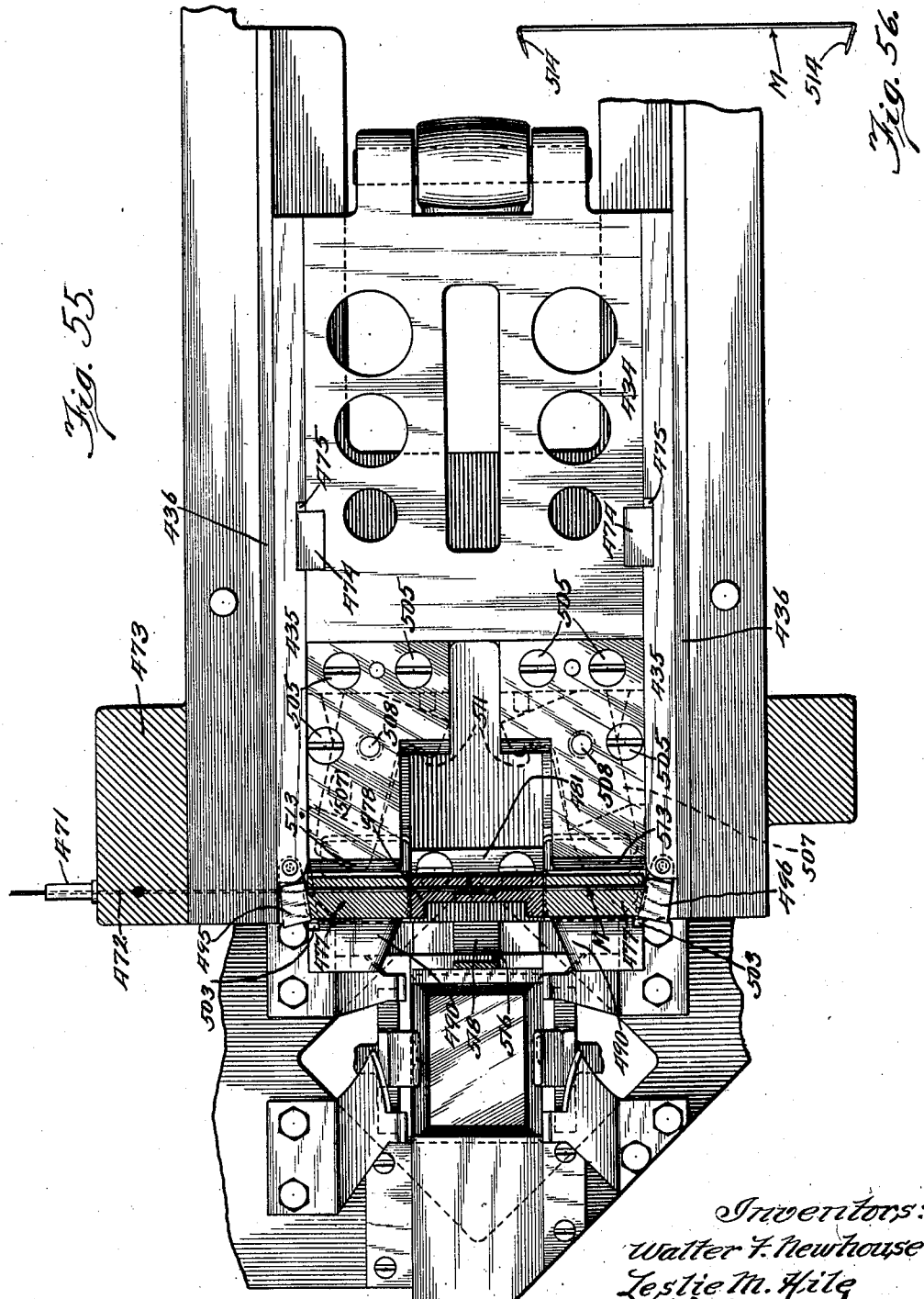

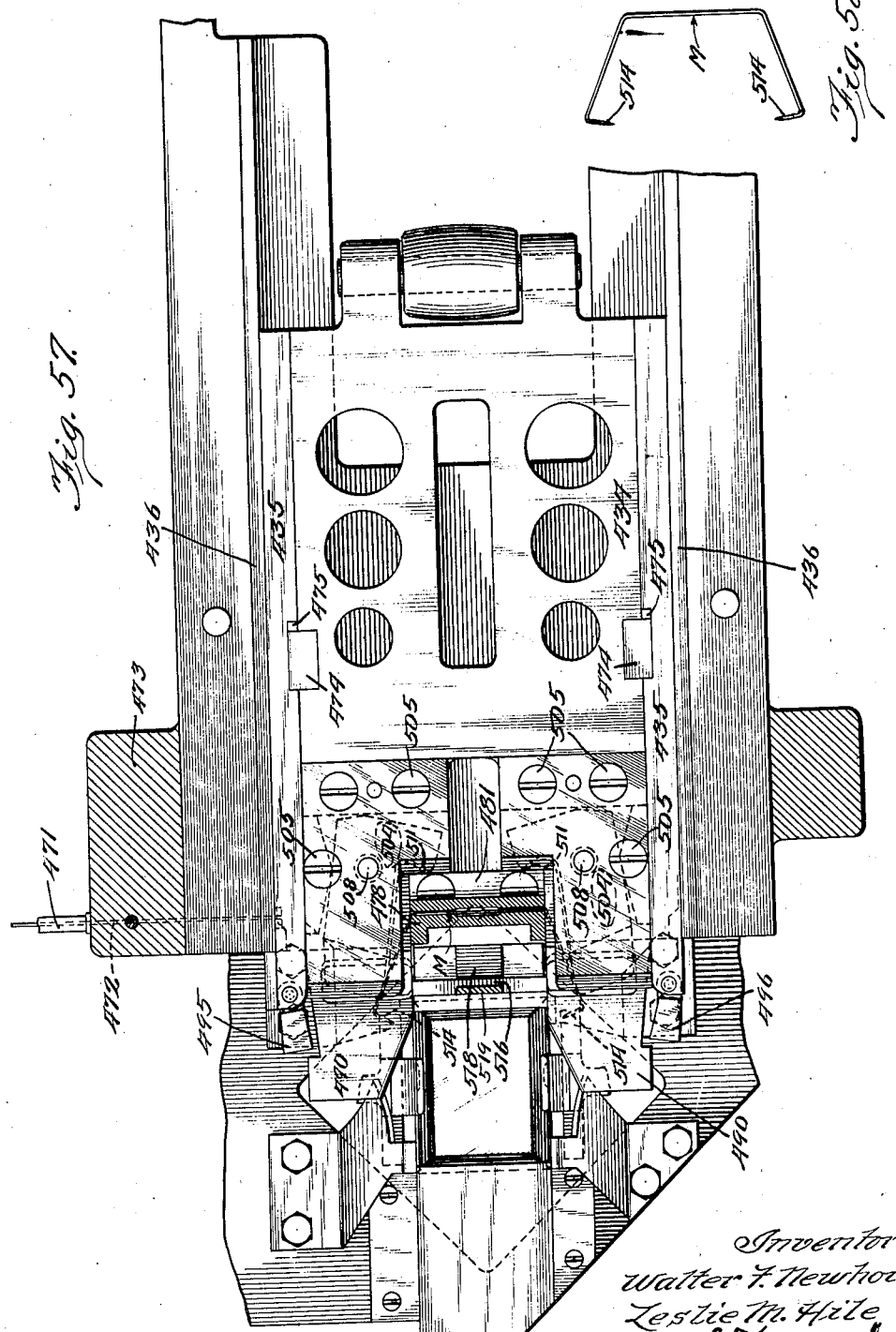

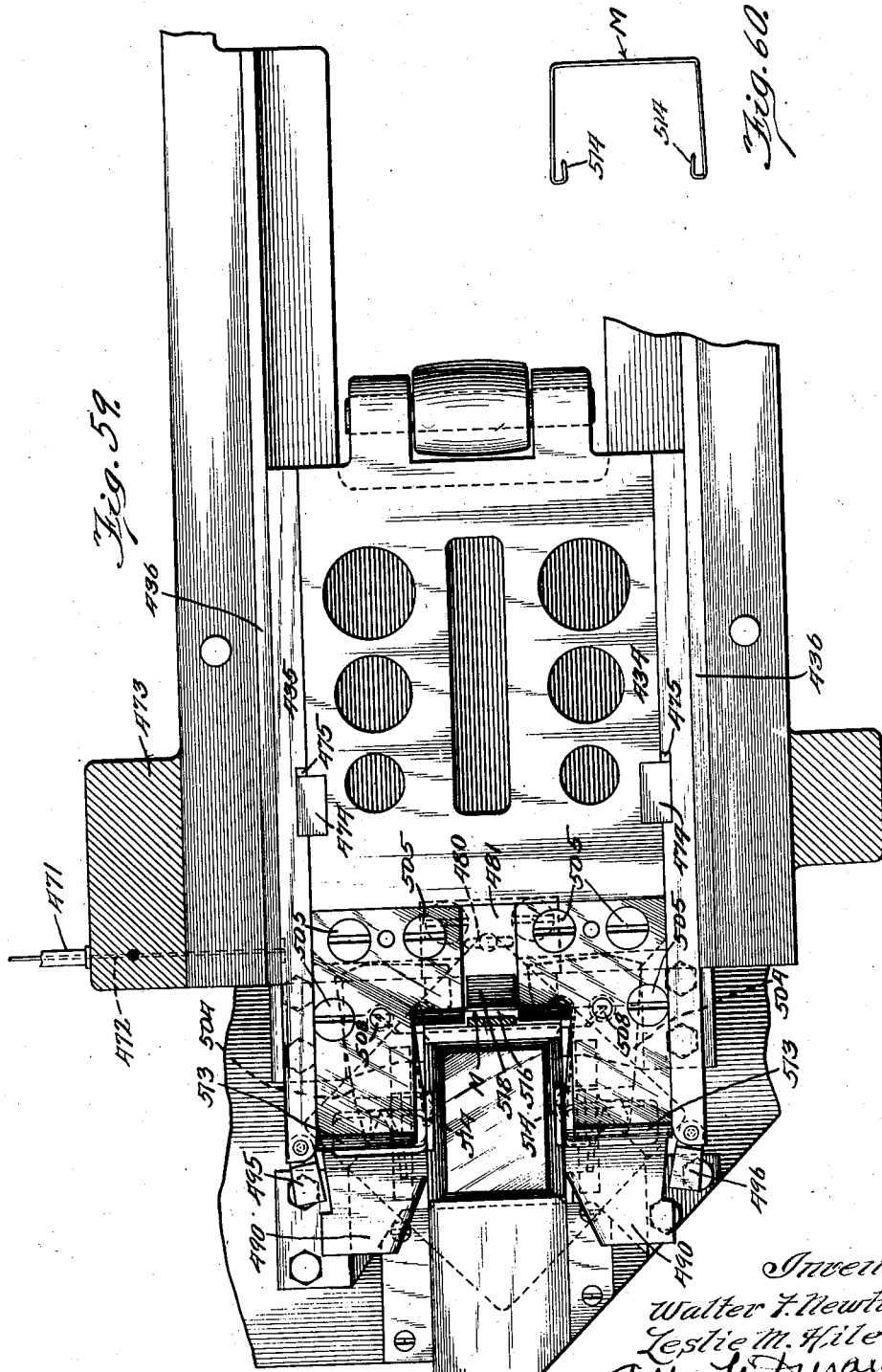

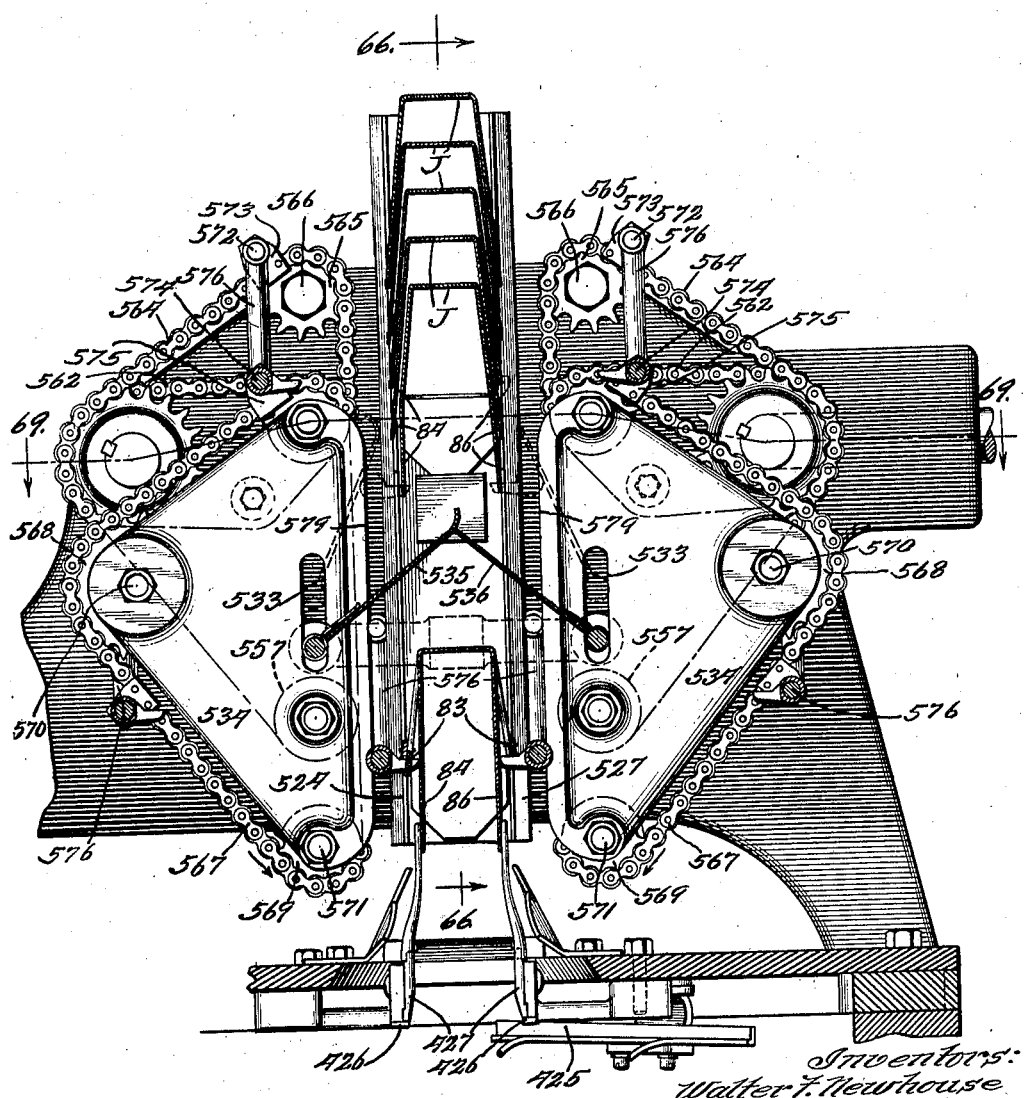

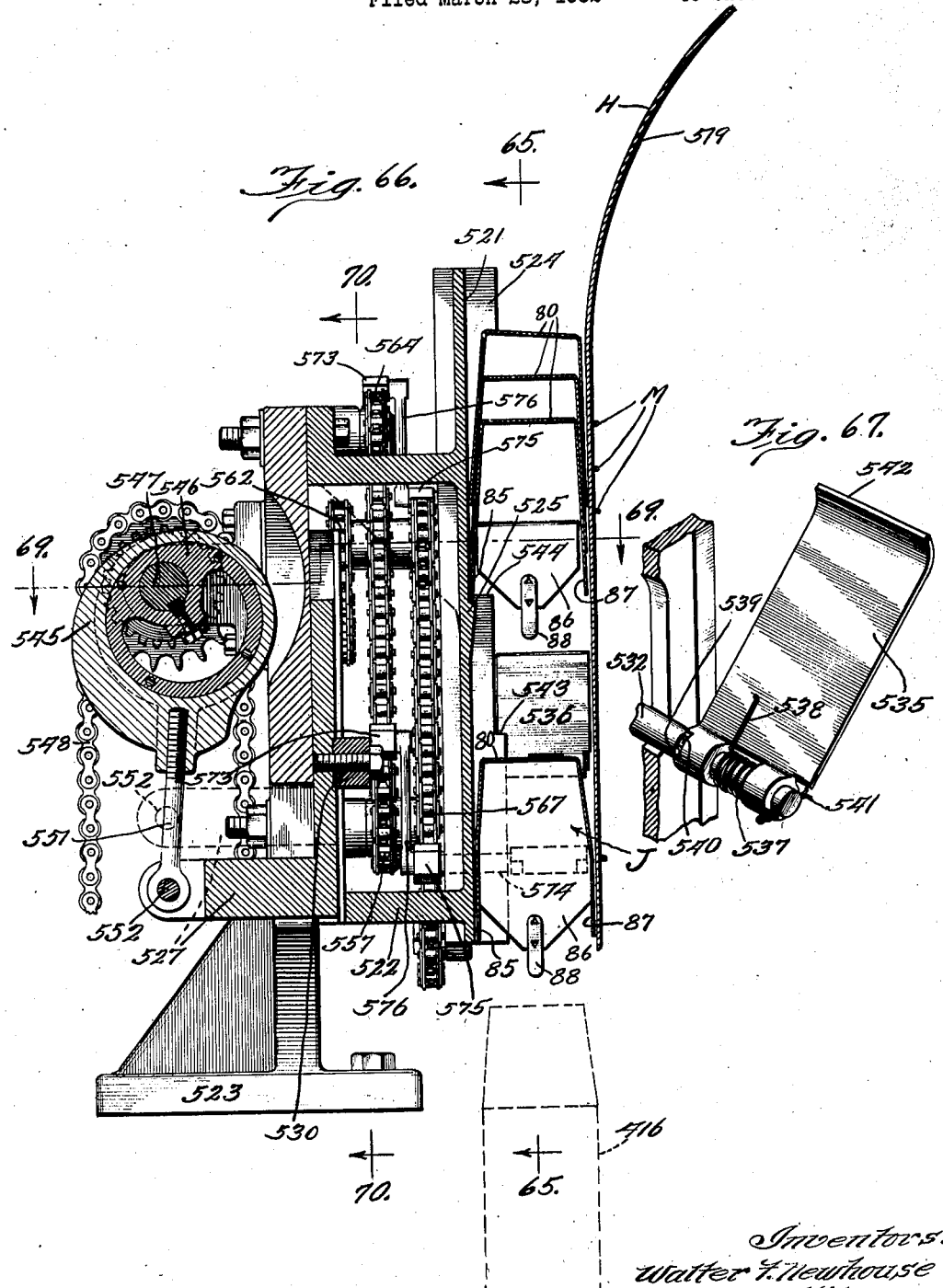

Feb. 11, 1936.  W. F. NEWHOUSE ET AL  2,030,071
MACHINERY FOR MAKING RECEPTACLES
Filed March 28, 1932   40 Sheets-Sheet 37
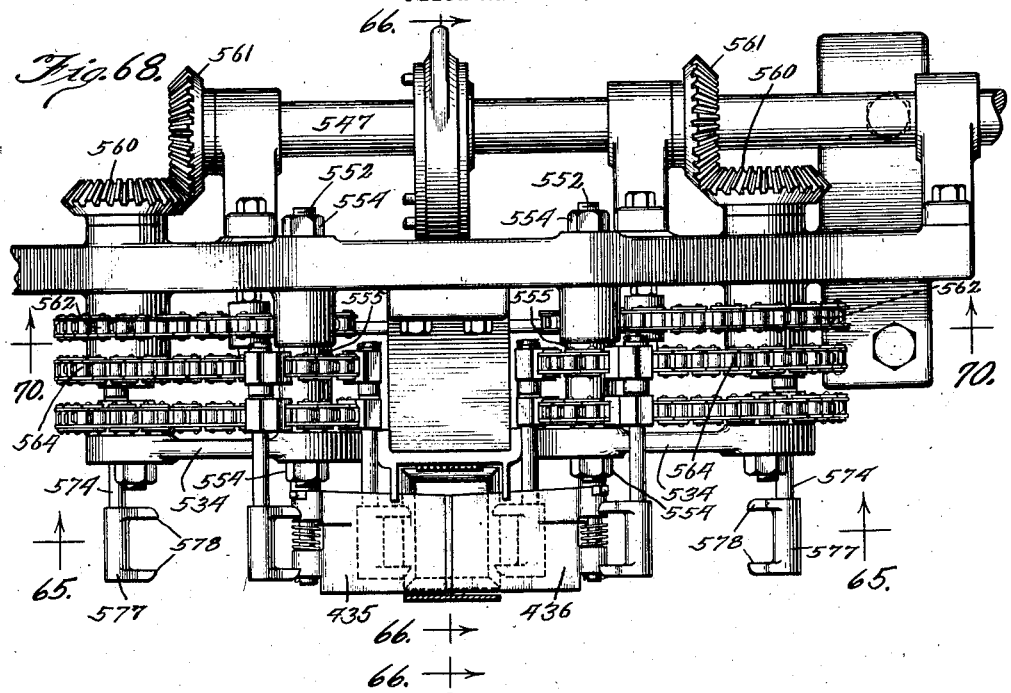
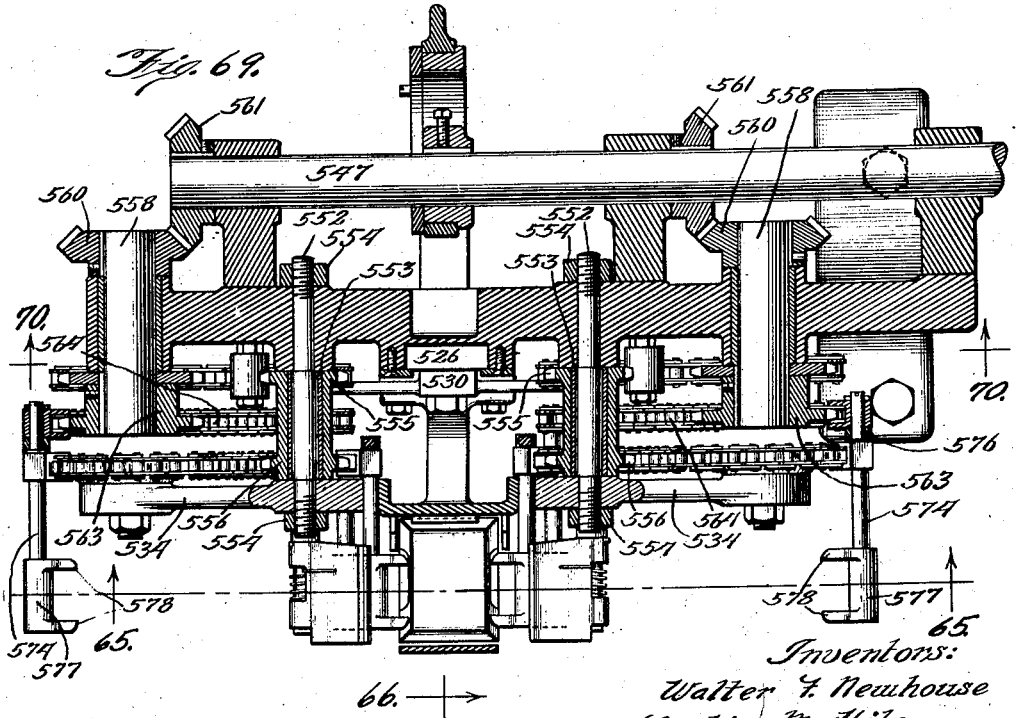

Feb. 11, 1936.  W. F. NEWHOUSE ET AL  2,030,071
MACHINERY FOR MAKING RECEPTACLES
Filed March 28, 1932    40 Sheets-Sheet 38
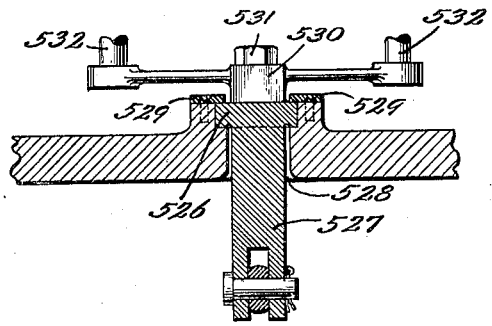
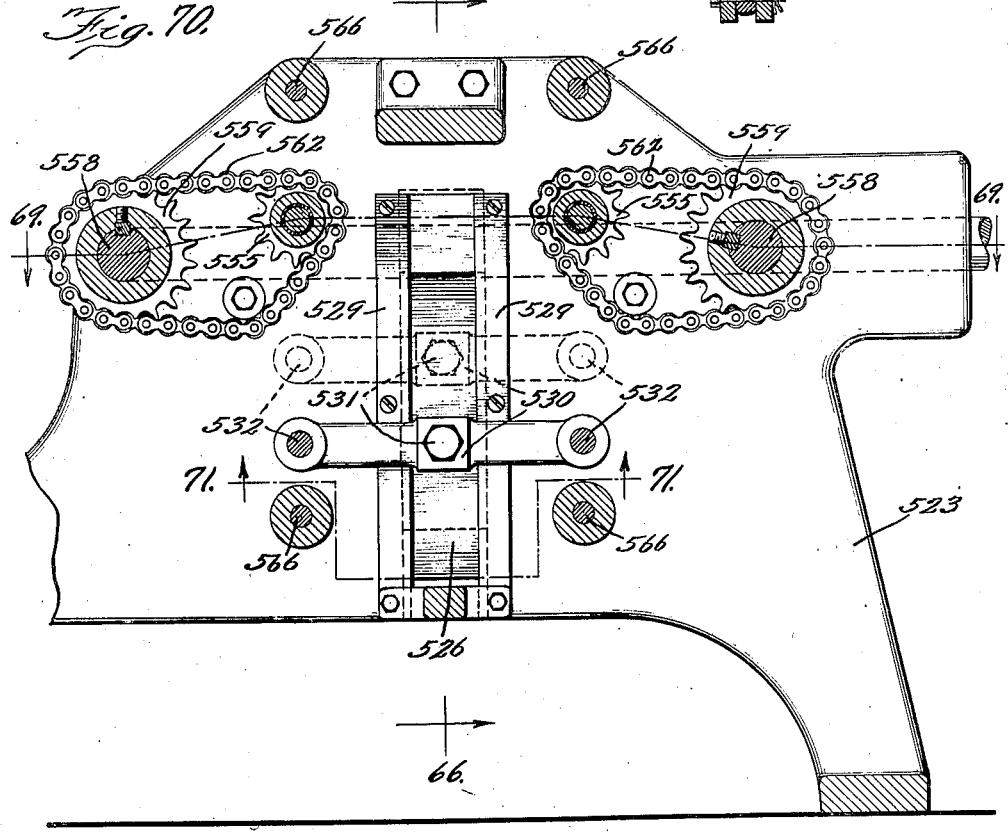

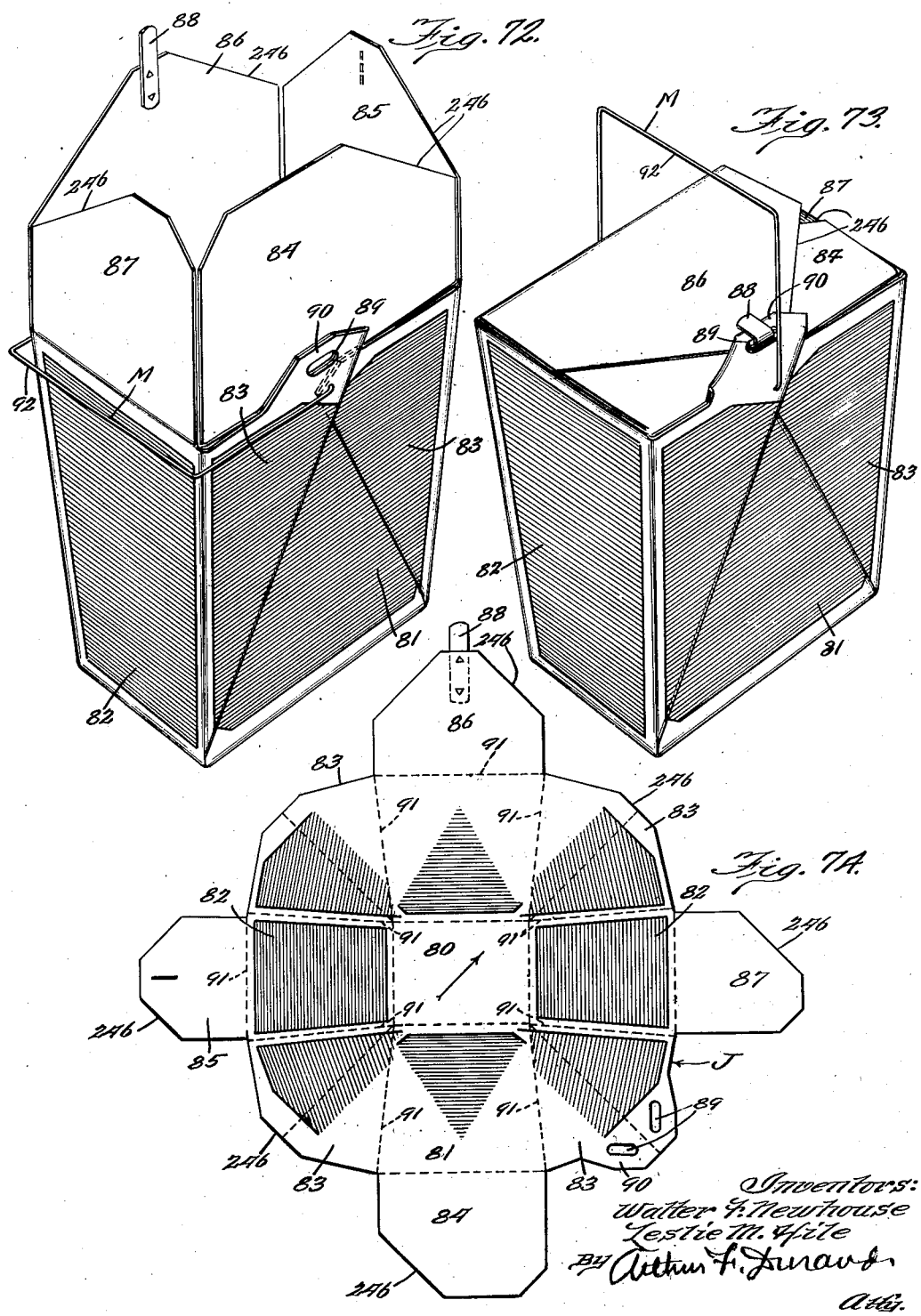

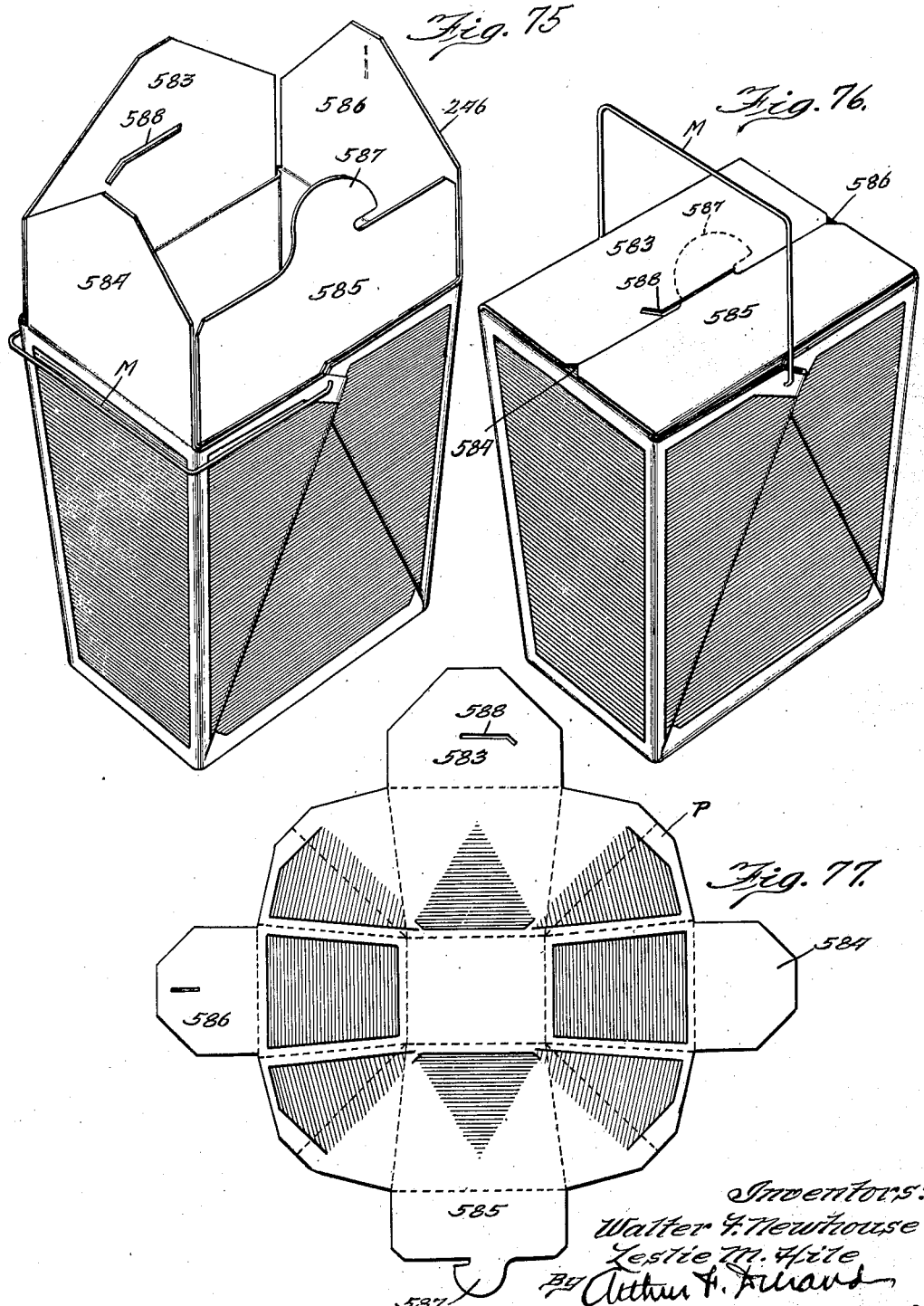

Patented Feb. 11, 1936

2,030,071

UNITED STATES PATENT OFFICE 2,030,071

MACHINERY FOR MAKING RECEPTACLES

Walter F. Newhouse and Leslie M. Hile, Benton Harbor, Mich.

Application March 28, 1932, Serial No. 601,564

60 Claims. (Cl. 93—47)

This invention relates to machinery for making ice cream pails, or similar receptacles, and more particularly those having wire handles attached thereto. The invention relates more especially to machinery of this kind in which the paper or sheet material from which the receptacles are made is printed and then fed to the blanking press, which latter then cuts out a blank from the sheet material, in which the material is also paraffined to make the receptacles practically waterproof, and in which the blanks are then fed along to the devices for making and attaching the handles to the receptacles.

Generally stated, the object of the invention is to provide a novel and improved construction and arrangement whereby the different steps are accomplished by improved devices, assembled and organized in a more effective and efficient manner than heretofore, whereby the different steps, such as printing and paraffining the blank and attaching the handles, are performed in a more satisfactory and a more reliable manner than heretofore, thereby to insure a more satisfactory product than has heretofore been possible with automatic machines of this particular character.

It is also an object to provide machinery of this kind which is capable of running at relatively high speed, with accuracy and certainty, thereby to speed up and reduce the cost of production.

A special object is to provide machinery of this kind having novel and improved means for changing the blanking press to produce blanks of different shapes.

Another special object is to provide novel and improved means for applying metal tabs to certain portions of the blanks, which tabs are for the purpose of holding the portions of the blank which later form the closure for the receptacle in closed position.

Another special object is to provide novel and improved means for feeding a continuous strip of tape to the blanks from which the receptacles are made.

Another special object is to provide novel and improved means for utilizing the bail-shaped handles of the receptacles for feeding the finished receptacles away from the mechanism for making and attaching the handles, and for nesting and thereby stacking the receptacles in a manner to facilitate their delivery from the machine.

It is also an object to provide certain details and novel features of construction, and certain combinations, tending to increase the general efficiency and the desirability of an automatic receptacle machine of this particular character.

To these and other useful ends, the invention consists in matters hereinafter set forth and claimed, and shown in the accompanying drawings, in which—

Figs. 1 and 2 are elevational views of one side of a machine embodying our invention;

Figs. 3 and 4 are similar elevational views showing the opposite side of the machine;

Figure 1:
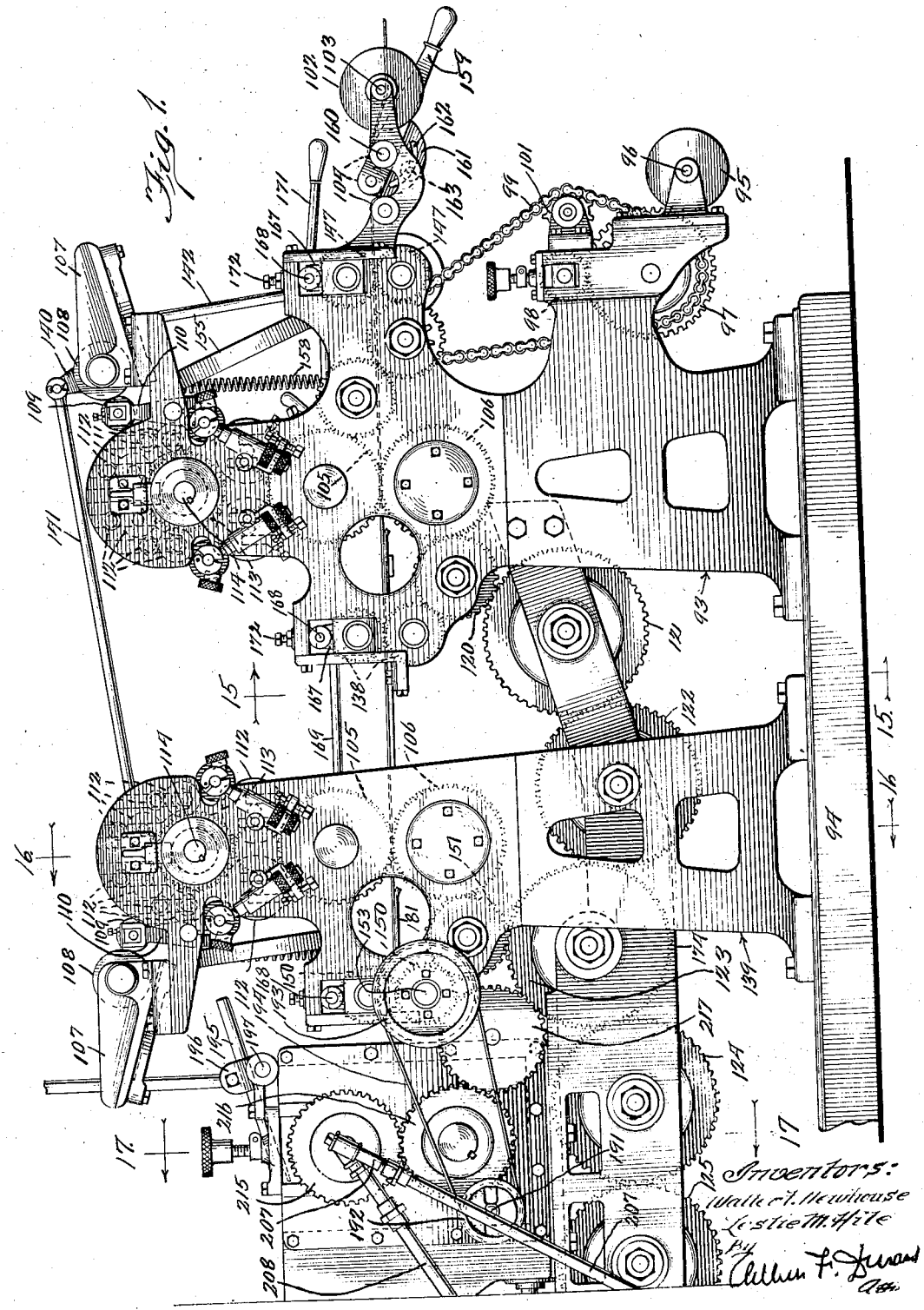
Figure 16:
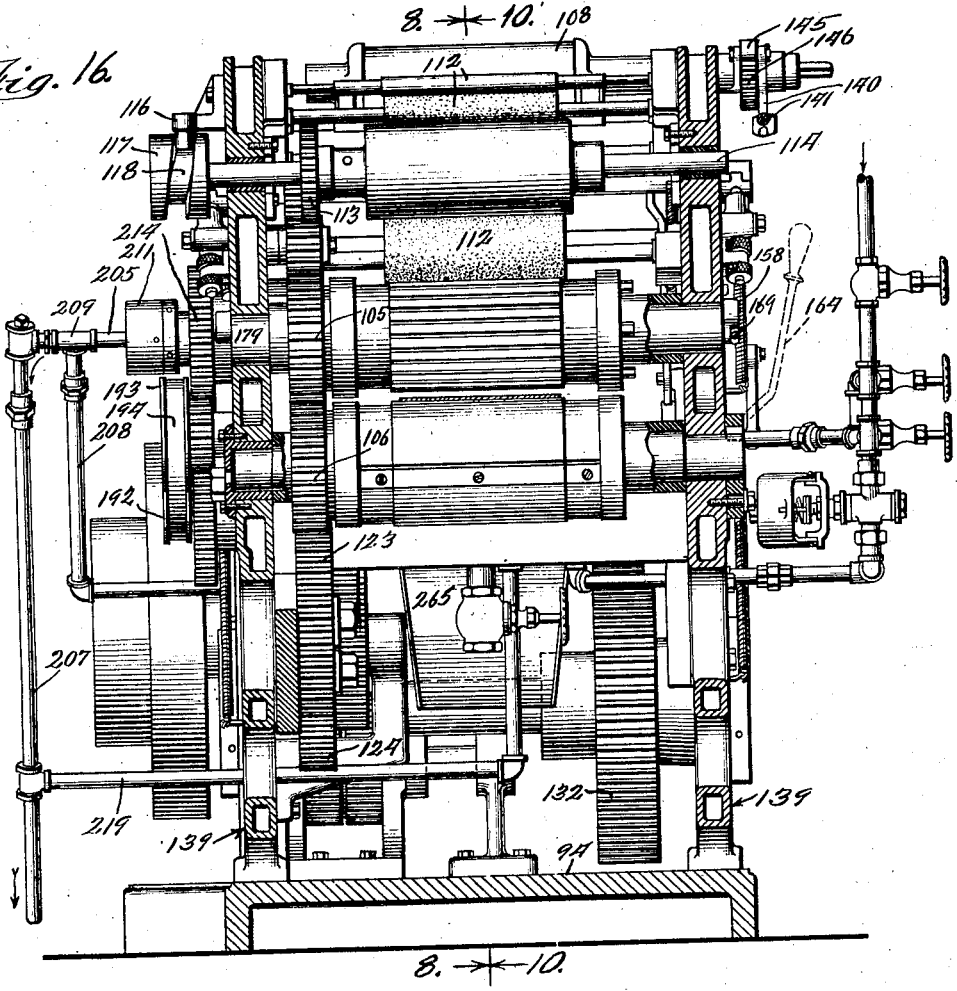
Figure 29:
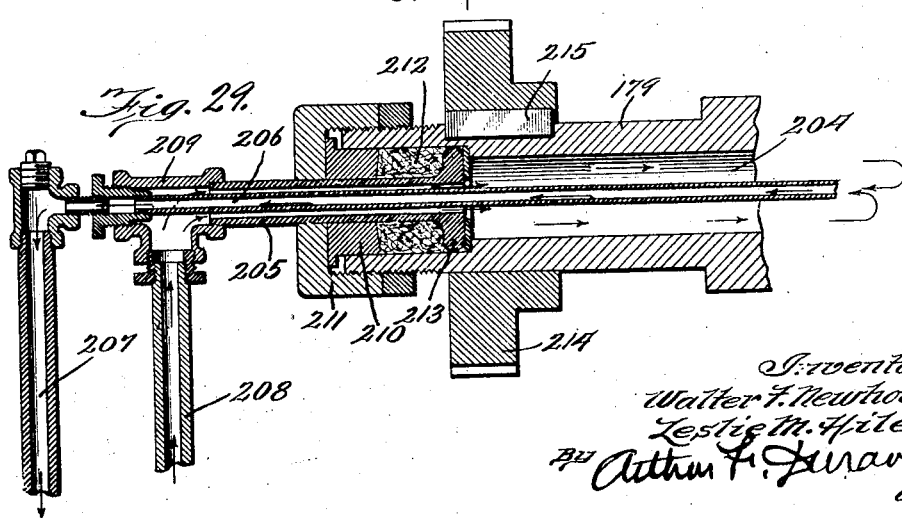
Figure 18:
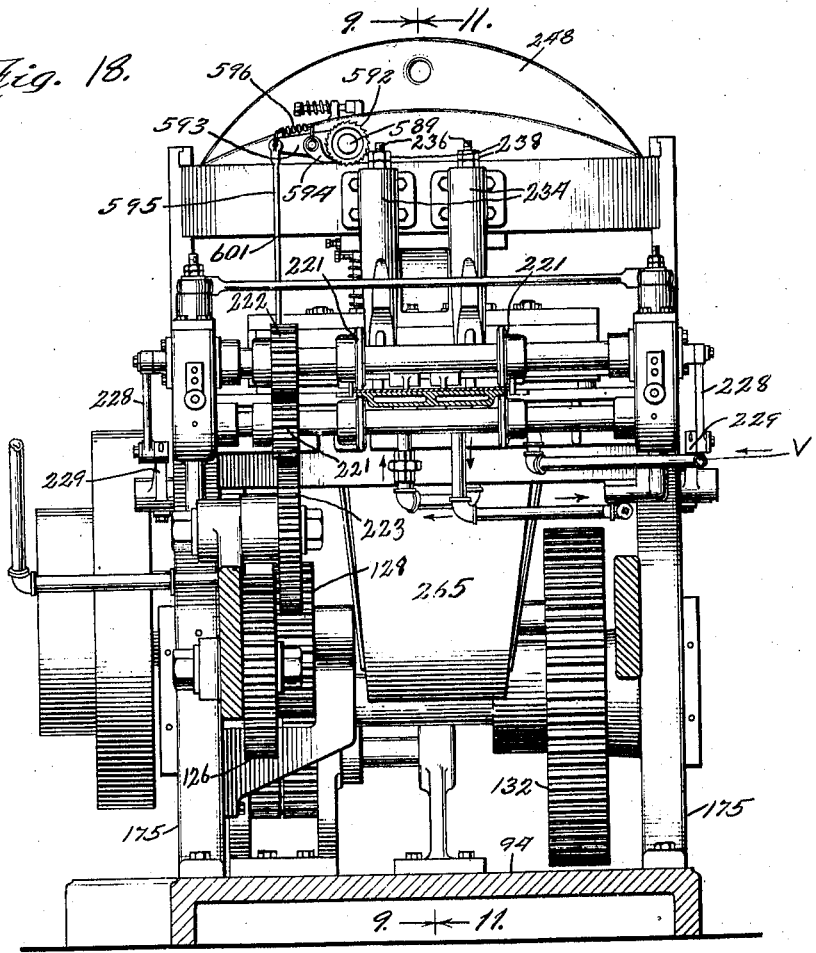
Figure 45:
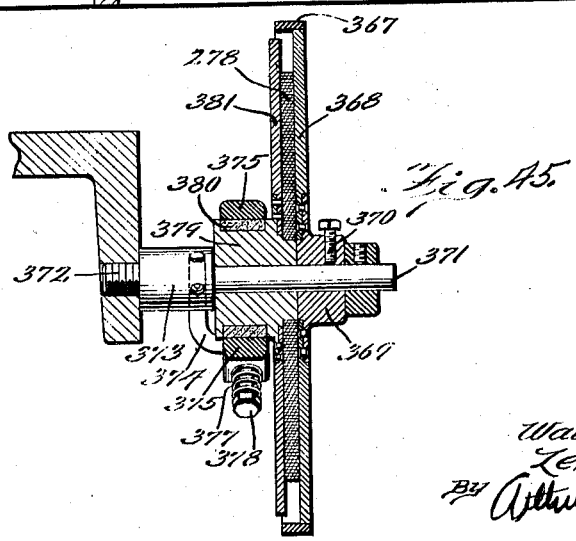
Figure 27:
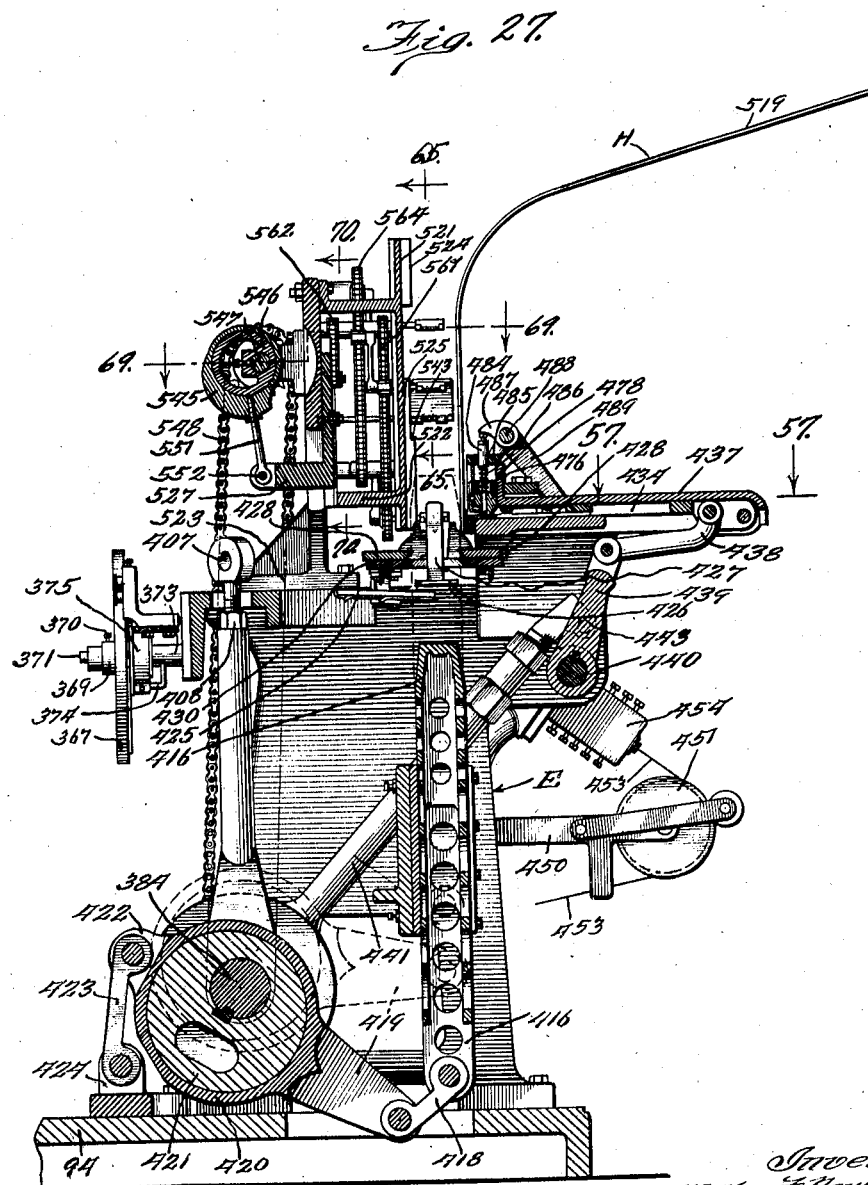

Figs. 5 and 6 together constitute a plan view of our machine, as viewed from above in Figs. 1 and 2;

Fig. 7 is an end elevation of a machine looking from the right of Fig. 1;

Fig. 8 is a vertical section taken along the line 8—8 of Fig. 5, and also the line 8—8 in Figs. 7, 15, 16 and 17;

Fig. 9 is a section taken along the line 9—9 of Fig. 6, and also of Figs. 18, 19 and 20;

Fig. 10 is a vertical section taken along the line 10—10 of Figs. 5, 7, 15, 16 and 17;

Fig. 11 is a section taken on the line 11—11 of Figs. 6, 18, 19 and 20;

Fig. 12 is a fragmentary plan view showing a modification of the cut-off knife;

Fig. 13 is a vertical elevation of the cut-off knife, with parts thereof in section;

Fig. 14 is a section taken along the line 14—14 of Fig. 12;

Fig. 15 is a section taken along the line 15—15 of Figs. 1, 3, 5, 8 and 10;

Fig. 16 is a section taken along the line 16—16 of Figs. 1, 3, 5, 8 and 10;

Fig. 17 is a section taken along the line 17—17 of Figs. 1, 3, 5, 8 and 10;

Fig. 18 is a cross-section taken along the line 18—18 of Figs. 2, 4, 6 and 9;

Fig. 19 is a section taken along the line 19—19 of Figs. 2, 4, 6 and 9;

Fig. 20 is a section taken along the line 20—20 of Figs. 2, 4, 6 and 9;

Fig. 21 shows a modification of the paraffin-applying rollers shown in Fig. 17;

Fig. 22 is a fragmentary plan view of a portion of the table over which the paper is fed;

Fig. 23 is a section taken along the line 23—23 of Fig. 22;

Fig. 24 is a front elevation of the unit for forming the ice cream bucket, this being a view looking in the direction of the arrows 24—24 in Fig. 26;

Fig. 25 is a side elevation of the mechanism shown in Fig. 24, looking from the left of that figure;

Fig. 26 is a rear elevation of the mechanism shown in Fig. 24;

Fig. 27 is a cross-section taken along the line 27—27 of Figs. 6, 24 and 28;

Fig. 28 is a plan view of the mechanism shown in Fig. 24, with part of the mechanism removed for the sake of clearness;

Fig. 29 is a cross-section through the upper heated roller for the paraffin-applying mechanism;

Fig. 30 is a front elevation of the forming and applying press for forming and applying the metal tab to the ice cream bucket (see Fig. 6 and Fig. 24);

Fig. 31 is a section on the line 31—31 of Fig. 30;

Fig. 32 is a section on the line 32—32 of Figs. 33, 34 and 35;

Fig. 33 is a section taken on the line 33—33 of Fig. 31;

Fig. 34 is a section taken on the line 34—34 of Fig. 31;

Fig. 35 is a section taken on the line 35—35 of Fig. 31;

Fig. 36 is a section taken on the line 36—36 of Fig. 30;

Fig. 37 is a section taken on the line 37—37 of Figs. 30 and 36;

Fig. 38 is a section taken on the line 38—38 of Fig. 36;

Fig. 39 is a section taken on the line 39—39 of Fig. 36;

Fig. 40 is a section taken on the line 40—40 of Fig. 39;

Fig. 41 is a section taken on the line 41—41 of Fig. 36;

Fig. 42 is an enlarged view of the mechanism shown in Fig. 41, with the parts in a different position of adjustment;

Fig. 43 shows a view similar to Fig. 42, in which the parts occupy another position of adjustment;

Fig. 44 is a perspective view showing the metal tab applied to the flap of an ice cream bucket;

Fig. 45 is a section through the reel for supporting the roll of tape to be formed into tabs;

Fig. 46 is a perspective view showing the partially formed bucket and the folding blades for forming the bucket;

Fig. 47 is a view similar to Fig. 46 showing the pail completely formed;

Fig. 48 is a view of a block adapted to cooperate with the bail-forming mechanism;

Fig. 49 is a perspective view of the bail-forming and driving mechanism, with parts broken away;

Figs. 50, 51 and 52 are detail perspective views of parts shown in Fig. 49;

Fig. 53 is a plan view of the bail-driving mechanism, with the parts thereof in inoperative position;

Fig. 54 shows the wire to be formed into a bail as it appears after being cut off from a roll of wire;

Fig. 55 is a view of the mechanism shown in Fig. 53, with the parts thereof in the position which they occupy just after the pivots for the bail have been formed;

Fig. 56 shows the bail as it appears just after the parts arrive in the position shown in Fig. 55;

Fig. 57 is a view similar to Figs. 54 and 56, with the bail formed into a U shape, and with the pivots thereof in a position to be driven through the folded portions of the bucket;

Fig. 58 shows the form of the bail when the parts are in position shown in Fig. 57;

Fig. 59 shows the final position of the bail-forming and driving mechanism, with the pivots for the bail driven through the folded portions of the bucket, and the ends thereof clinched to hold the pivots in place;

Fig. 60 shows the completed bail;

Fig. 61 is a section taken on the line 61—61 of Fig. 24;

Fig. 62 is a side elevation of the parts shown in Fig. 61, looking from the left of Fig. 61;

Fig. 63 is a section taken on the line 63—63 of Fig. 24;

Fig. 64 is an elevation of the parts shown in Fig. 63 and looking from the left of that figure;

Fig. 65 is a section taken on the line 65—65 of Figs. 6, 25, 27, 66, 68 and 69;

Fig. 66 is a section taken on the line 66—66 of Figs. 24, 26, 65, 68 and 69;

Fig. 67 is a perspective view of a plate to assist the insertion of one bucket into another after the bucket has been formed;

Fig. 68 is a plan view of the stacking unit;

Fig. 69 is a section taken on the line 69—69 of Figs. 24, 25, 26, 27, 65 and 66;

Fig. 70 is a section taken on the line 70—70 of Figs. 25, 27, 66, 68 and 69;

Fig. 71 is a section taken on the line 71—71 of Fig. 70;

Fig. 72 is a perspective view of the completed bucket;

Fig. 73 is a perspective view of the bucket after the same is closed;

Fig. 74 is a plan view of the blank from which the bucket is formed;

Fig. 75 is a perspective view of a modified form of bucket before closing;

Fig. 76 is a view similar to Fig. 75, showing the bucket closed; and

Fig. 77 is a view showing the blank from which the bucket in Figs. 75 and 76 is formed.

In the embodiment of our invention shown in the drawings, there are two similar printing presses, designated generally as A and B, for the purpose of printing the paper from which the buckets are formed, one printing press being for the purpose of printing in one color, and the other for printing in another. The paper, after passing through the printing presses, enters the paraffin-applying mechanism, designated C. The paper then passes into a punch press designated as D, this punch press being for the purpose of cutting away portions of the paper to partially form the blank and to also score portions of the blank so that the bucket may be more readily formed. After leaving the punch press D, the blanks are fed to the forming mechanism E, seen particularly in Figs. 27 and 28. Closely associated with the forming mechanism, is the tab-applying mechanism F and the bail-forming mechanism G, as well as the stacking mechanism H. These parts are shown in the general views, Figs. 1 to 11, inclusive, as well as in the detail views.

The blank, which is formed by the machine illustrated in the drawings, is shown in Fig. 74 and is designated by the letter J. This blank is formed from a roll of paper, the length of which extends in the direction of the arrow shown in Fig. 74, and for the purpose of conserving on the amount of paper necessary to form the blank. The blank comprises a bottom portion 80, side walls 81, and end walls 82. The side and end walls are connected by webs 83, and the side and end walls are provided with the flaps 84, 85, 86 and 87. A tab 88 is attached to the flap 86 and is adapted to pass through the openings 89 in the extension 90 on one of the webs 83, the openings 89 being aligned, as shown in Fig. 72, when the bucket is formed.

The punch press which forms the blank, except for cutting it from the strip of material, also scores the blank along the dotted lines 91 to assist in folding the paper along these lines. The shaded portions on the blank, illustrated in Fig. 74, indicate the printed matter which is printed thereon by the printing presses. The blank is formed into the shape shown in Fig. 72 and is provided with a bail M, which acts as a handle for the bucket, as well as forming a means of securing the webs 83 against the sides 81 thereof.

In Figs. 1, 3, 5, 7, 8 and 10, the reference numeral 93 designates generally a frame supported on the base 94, this frame supporting the first printing press which prints on the paper in one color. This frame also supports the mechanism for feeding and straightening the paper. A roll of paper (not shown) is supported to permit the unreeling of the paper therefrom, and as the paper leaves the roll, it passes between the flanges 95, mounted on a shaft 96, rigidly mounted on the frame 93, and over the surface of a drum 97, also rotatably mounted on the frame. A pressure roller 98 has the surface thereof opposed to the surface of the drum 97 and assists in feeding the paper to the printing press. The drum 97 is driven by a chain 99 from the shaft 100, the shaft 100 and the shaft which supports the drum 97 each being provided with suitable sprockets over which the chain is trained. An idler sprocket 101 also acts as a guide for the chain and also as a tensioning element for the chain.

The paper then passes between the flanges 102, mounted on the shaft 103, rigidly carried by the frame 93, and then through a series of three straightening rollers 104 which act to uncurl the paper so that it will lie flat while being printed. The paper then passes between the rolls of the printing press 105 and 106, the former being a printing roll, and the latter a pressure roll, this construction being well understood in the art to which this invention relates. The ink is supplied from an ink reservoir 107, a doctor roll 108, a roll 109 rotatably mounted on the pivoted arm 110, secured to the shaft 111, and distributing rolls 112. An axially movable distributing roll 113, secured to a shaft 114, rotatably mounted in the frame 93, is reciprocated longitudinally of its axis by a fixed projection 115, secured to a bracket 116 on the frame 93, and a cam 117 having a groove 118, into which the projection 115 extends. The rolls 105 and 106, as well as the rolls 112 and 113, are positively driven in synchronism by intermeshing gears on the ends of their respective shafts. The gear on the shaft 119, which carries the roll 106, meshes with a gear 120, which in turn is driven by means of the gears 121, 122, 123, 124, 125, 126 and 127 (see Figs. 10 and 11), gear 128 on the shaft 129, which also supports the gear 127, gear 130 on the shaft 131, and gear 132 also on the shaft 131, the gear 132 being driven by a gear 133, connected by a clutch, designated generally as 134, to the main drive shaft 135, on which the drive pulley 136 is mounted (see Figs. 2 and 20). The shaft 135 also carries the fly-wheel 137.

The frame 93 is also provided with the feed rollers 138, driven from the gears 120 through gears mounted on the ends of the shafts which carry the feed rollers 138.

A frame 139, also mounted on the base 94, supports a printing mechanism which is constructed substantially identical with the printing mechanism mounted on the bracket 93, and the parts have been given the same reference characters as the corresponding parts of the printing mechanism supported by the frame 93. This printing mechanism is driven from the gear 123, previously referred to. The doctor rolls 108 are intermittently operated by mechanism which is best illustrated in Fig. 3. This mechanism comprises bell cranks 140, secured to the shafts of each of the doctor rolls and connected by means of the link 141. A connecting rod 142, connected to one of the bell cranks 140 and to an adjustable pin 143 on the crank disk 144, is adapted to oscillate both of the bell cranks 140. A pawl 145, secured to each of the bell cranks, cooperates with a ratchet 146, secured to the shafts of each of the doctor rolls. As the bell cranks 140 oscillate, the pawls 145 will impart intermittent movement to the doctor rolls and in opposite directions, in view of the fact that the ink reservoirs and doctor rolls are mounted on opposite sides of the printing mechanism.

Additional feed rollers 147, similar to the feed rollers 138, are driven by means of the gears 148 and 149 from the gears on the shafts which support the rolls 105 and 106. There is still another set of feed rolls 150, similar to rolls 138 and 147, which are driven by means of the gear 151 from the gear 123. The lowermost ones of the rolls 147 and 150 are carried by shafts 152 and 153, and to the ends of these shafts are secured the cams 154 (see Fig. 8). Links 155, carrying rollers at their ends, which rollers engage the surfaces of the cams 154, are connected at their upper ends to crank arms 156, which crank arms are secured to the shaft 111. The lower ends of the links 155 are pivoted to freely rockable arms 157, which arms guide the lowermost ends of the links. Springs 158 normally hold the lowermost ends of the links against the surfaces of the cams 154. Therefore, as the shafts 152 and 153 rotate, the links 155 will impart an oscillating movement to the arms 110, to carry ink from the doctor rolls 108 to the rolls 112, by means of the roll 109.

In Figs. 1 and 8, there is clearly illustrated a lever 159, pivoted at 160 and having an arcuate portion 161, slotted at 162, through which an adjusting screw 163 extends. The middle one of the three rollers 104 is carried by the lever 159, so as to change the position of the middle roller with respect to the other two rollers, to modify the bending effect on the paper and also to permit the insertion of the paper when the feed is begun. The adjusting screw 163 is not tight enough to prevent manual operation of the middle roller, but prevents accidental operation thereof, and this roller may be locked by said screw.

The pressure rolls 106 are each mounted on eccentric shafts 119, provided with operating levers 164 at the ends thereof, these levers being held in adjusted position by means of the pin-and-slot connections 165—166, shown particularly in Fig. 3. By this means, the lower pressure rolls may be moved toward and away from the printing rolls 105 in a manner which is well known in the art to which this invention relates.

As is best illustrated in Figs. 3, 8 and 10, each of the upper feed rolls 147, 138 and 150 is mounted in a pillow block 167, vertically movable in suitable guides in the frame, and shafts 168 are arranged within recesses in the pillow blocks 167. The shafts are rotated in unison by means of a rod 169, connected to cranks 170, secured to the ends of the shafts 168, one of the shafts 168 being rotatable by an operating arm 171, which in turn causes the simultaneous operation of the other shafts 168 through the connections just described. Each of the shafts 167 is pressed downwardly by means of the adjustable pressure screws 172, adjustably mounted in the frames 93 and 139. Each of the shafts is provided with a flattened portion adapted to register with the ends of the screws 172 when the shafts are rotated into a predetermined position by the operating arm 171. When the flattened portions of the shafts 168 are opposite the ends of the screws 172, the rollers may move upwardly to relieve the gripping action which the feed rollers 147, 138 and 150 have upon the paper being fed thereby. Springs are used for the purpose of urging the pillow blocks 167 upwardly.

After the paper has been printed, and before the blank is cut from the paper, the paper passes through a paraffin-applying chamber in which the paraffin is applied to one or both sides of the paper, as desired. This mechanism is best illustrated in Figs. 1, 3, 5, 8, 10, 17 and 21, the latter figure showing a modification. The paraffin tank, designated by the reference numeral 173, is supported by the rails 174 which extend between the frame 139 of the printing press, and the frame 226 which supports the punch press. The paraffin tank 173 is adapted to hold paraffin only to about the height illustrated in Fig. 10, the paraffin being designated by the reference numeral 176. A heating coil 177 is arranged within the bottom of the paraffin tank and is adapted to maintain the paraffin at the desired temperature. The bottom of the tank is provided with a drain valve 178. Upper and lower paraffin-applying rolls 179 and 180 are provided for applying paraffin to the upper surface and lower surface of the paper, respectively. The paper is fed over a guide plate 181, through an opening 182 into the paraffin tank, and is partially supported within the paraffin tank by the guide plate 181, which extends through the opening 182. A heated table 183, partially arranged within the paraffin tank 173 and extending outside of the tank to a position adjacent the punch press, as is clearly illustrated in Fig. 9, is also adapted to support the paper within the paraffin tank, after the paper leaves the paraffin-applying rolls.

The rolls 179 and 180 are hardened steel rolls and as the roll 180 rotates about its axis, it carries paraffin to the under surface of the paper. A scraper-blade 184 is adapted to scrape all but a predetermined quantity of paraffin from the surface of the roll, so that there will not be too much paraffin applied to the paper. This scraping-blade 184 is adjustable by means of the screws 185.

A presser plate 186, pivoted at 187, has the end thereof resting on the upper surface of the paper to hold it against the guide 181. When the paraffin is to be applied to the upper surface of the paper also, a pump 188, arranged within the paraffin tank, pumps the paraffin through the conduit 189 to the horizontally arranged perforated pipe 190, which pipe has the perforations thereof arranged to spray the paraffin onto the surface of the roll 179. The pump has a driving shaft 191, which is driven by means of pulleys 192 and 193 and a belt 194. When only the lower surface of the paper is to have paraffin applied thereto, the belt 194 is removed so that the pump is not driven and, therefore, the paraffin is not sprayed onto the upper roll 179. The pulley 193 is mounted on the end of the shaft 153.

In order to prevent too much paraffin from forming on the edges of the upper roll 179, and thereby running down onto the surface of the paper, it is desirable to provide rods 195, secured in brackets 196, secured to the rod 197. On the ends of the rods 195, are scraping-blocks 198 (see particularly Figs. 5, 10 and 17), and as clearly illustrated in Fig. 17, portions of the scraping blocks engage the periphery of the roll 179, and other portions thereof engage the ends of the roll. The scraping-blades 198 may rest by gravity on the roll 179 or may be positively held in adjusted position.

The upper roll 179 is mounted in pillow blocks 199, slidable in the frame and yieldingly urged upwardly by the springs 200. Adjusting screws 201, engaging wear-plates 202 on the pillow blocks, are used for the purpose of imparting the desired amount of downward pressure on the roll 179. Adjustable collars 203 limit the amount of permitted downward movement of the screws 201. The roll 179, as best illustrated in Figs. 17 and 29, is provided with a recess 204, into which live steam is introduced for the purpose of heating the roll. The steam enters the roll through the outer conduit 205, which embraces and is substantially concentric with the inner conduit 206. The steam exhausts through the inner conduit 206 into the exhaust pipe line 207. The live steam enters the conduit 205 through the pipe 208 and T 209. A suitable packing gland 210, held in place by the cap 211, screwthreaded on the end of the roll 179, seals the joint between the stationary conduit 205 and the rotating roll 179, there being packing 212 interposed between the packing gland 210 and an enlarged head 213 on the end of the conduit 205. A gear 214, keyed to the roll 179 by the key 215, meshes with a gear 216 on the lower roll 180, which latter gear is keyed to the roll 180. The gear 216 is driven from the gear 123 by means of the idler gear 217.

As is best illustrated in Fig. 17, the steam enters the coil 177 through the pipe line 218 and leaves through the pipe line 219. The pipe line 219 joins the exhaust pipe 207 by means of the T 220.

After the paraffin has been applied to the paper, the paper leaves the tank 173 and, as best illustrated in Figs. 11 and 9, passes between the jump-feed rollers 221, which are caused to rotate with each other by means of the gears 222 at the ends of each of the shafts 227 which carry the rollers, the lowermost gear 222 meshing with a gear 223, which gear is driven from the gear 128 secured to the shaft 129, to which the gear 127 is secured.

The upper feed roller 221 is carried by pillow blocks 224, slidable in a portion 225 of the frame 226, which supports the punch press D, to be described presently. The ends of the shaft 227, which supports the upper feed rollers 221, are connected by links 228 at opposite ends thereof to pairs of bell cranks 229, pivoted at 230 to the frame 226. The free ends of the bell cranks carry adjustable stops 231 (see particularly Fig. 4 and Fig. 20). The adjustable stops 231 are positioned to be engaged by the lugs 232, rigidly secured to the sliding frame 233 of the punch press. As the sliding frame 233 moves downwardly, the lugs 232 engage the stops 231 and, as a result, the bell cranks 229 are rocked in a clockwise direction, as viewed in Fig. 4, to raise the shaft 227 and rollers 221. Therefore, the continuous rotation of the rollers 221 is not interrupted, but their gripping engagement with the paper is interrupted, and as a consequence the paper is not fed during the time that the shaft 227 is elevated by the bell crank 229.

On the side of the sliding frame 233 which lies adjacent the rollers 221, there are provided the brackets 234, which are recessed at 235 to receive sliding pins 236 and springs 237 which surround the pins 236 and urge the same downwardly to their full permitted extent, as determined by the position of the lock nuts 238, which are threaded on the upper end of the pins 236. As the frame 233 moves downwardly and releases the upper feed rollers 221, the lower ends of the pins 236 engage the paper and stop the forward movement of the paper under the influence of the feed rollers 150. As a consequence, a loop is formed in the paper, as illustrated in Fig. 10 at 239, as the paper is fed continuously forward by means of the rollers 150. As soon as the rollers 221 are again brought into engagement with the paper, and the pins 236 are raised out of engagement with the paper, the forward movement of the paper between the rollers 221 is resumed. The upper rollers 221 may be released manually by means of either of the levers 240, connected by the tie-rod 241 and acting upon screws 242, connected to the pillow blocks 224, in a manner which is well known in the art to which this invention pertains.

In order to prevent buckling of the paper between the punch press and the rollers 221, we provide the members 243, secured to a rod 244, which extends across and above the paper.

The paper, as it leaves the paraffin tank 173, passes over the chambered heating table 183, the chamber of which is supplied with steam in a manner which will be described later. This chambered heating table distributes the paraffin uniformly and assists in impregnating the paper with the paraffin. The main purpose of heating the table 183 is to prevent the cooling paraffin from accumulating at the corners of the bottom 80, shown in Fig. 74, from which the scored or creased lines 91 radiate. The paper at these corners would otherwise burst in folding over the accumulated paraffin which, by this time, would be hardened.

The feeding of the paper by means of the feed rollers 221 is at a greater rate than by means of the feed rollers 150, 138, and 137, as it is necessary to make up for the time lost in stopping the feed of the paper in the manner which has just been described. The punch press receives the printed paper and is so spaced with relation to the printing presses that when the punch press punches out portions of the paper to form the blank shown in Fig. 74, the portions which are cut out will bear the proper relation to the printed matter thereon. The punch or blanking press scores the paper along the dotted lines shown in Fig. 74 and cuts the blank to the shape shown in Fig. 74, except that the blanks remain attached to each other along the lines 246, indicated in Fig. 74 and also in Fig. 28.

The punch press is perhaps best illustrated in Figs. 4, 11 and 19. The sliding frame 233 of the punch press comprises the side rails 247, secured together at the top by the bridge 248. The side rails 247 are provided with guides 249, suitably guided in the frame 226 and retained therein by means of the gibs 250. The side rails have cross-pieces 251 integral therewith, and these cross-pieces have openings 252 therein to receive the pillow blocks 253, which engage upper and lower wear-plates 254, upon which they may slide in a horizontal direction, there being a clearance between the ends of the pillow blocks and the adjacent ends of the openings 252. The shaft 131 has eccentric portions 255, which rotate in bushings 256, arranged within the pillow blocks 253. Cover plates 257, shown removed in Fig. 4, cover the ends of the shaft 131 and the bearings for the pillow blocks.

As is clear from an inspection of Fig. 19, the shaft 131 is journaled in the frame 226 and, therefore, as it rotates, the eccentric portions 255 cause the pillow blocks 256 to have an orbital movement, which movement raises the sliding frame 233, but does not move the same laterally, due to the clearance between the ends of the openings 252 and the pillow blocks.

The frame 226 carries the stationary table 258, which table is heated by means of the coil 259. The bridge 248 supports the post 260, which is secured to the lower side of the bridge. The post 260 carries the usual upper die member 261, and the table 258 carries the usual lower die 262. The upper die is guided by the pins 263, secured to the table 258. Cut-away portions 264 in the table 258 permit portions of the blank, which are cut away by the punch press, to fall through the table into a trough 265, secured to the under side of the table. This trough directs the portions of the blank, which are cut away, to one side of the shaft 131 and into a suitable scrap-pan or the like.

The die member 261 carries the creasing die 261a and outline-cutting die 261b, the latter being removably mounted by screws 261c to the under side of the member 261. With this arrangement, the outline-cutting die 261b may be changed to form a blank, as in Fig. 74, or a blank such as shown in Fig. 77, without changing the creasing die 261a.

As the paper, which has been partially formed into a blank, leaves the punch press, it is guided along the table 266, provided with the guide strips 267, adjustably secured to the table 266 by means of the machine screws 268 and the slots 269, the latter being formed in the lugs 270, secured to the guide strips 267. The table 266 is formed with an internal chamber 271, into which steam is introduced in any desired manner. The paper is held down upon the table 266 by means of the presser strips 272 (see particularly Figs. 4, 6, 9 and 11), connected by means of the tie-bars 273 and 274, the tie-bars 273 resting in notches 275 (see particularly Figs. 4, 9 and 22) in the guide strips 267. Handles 276 are used for the purpose of raising the presser strips and tie-bars which connect the presser strips. Therefore, if a jam occurs, the presser strips can be removed to straighten out the paper.

As the blanks, which are still connected together, arrive at the position K in Fig. 6, the metal tab 88 is cut and applied to the flap 86 of the bucket. This mechanism, illustrated in plan in Fig. 6 and in Fig. 28, is perhaps best illustrated in the elevation views in Figs. 30 and 25, as well as in detail views 31 to 43, inclusive.

The tab itself, as best illustrated in Fig. 44, has two integral prongs 277 which are struck out of the tab itself and pressed through the paper and thereafter clinched against the paper to hold the tab in place. The tabs are formed from a continuous roll of metal tape, which is cut to the length desired and also has the prongs 277 struck up therefrom before the tab is cut from the tape. The prongs are first formed in the end portion of the metal tape and thrust through the paper. After the prongs pass through the paper, the tape is cut to form the desired length of tab simultaneously with the forming of additional prongs in the newly formed end of the tape.

In Fig. 41, the reference numeral 86 indicates the flap of the bucket, and 278 indicates the metal tape from which the tabs are formed. Prongs 277, illustrated in Fig. 41, are in a position to be driven into the paper 86, and this is accomplished by means of the plate 279, carried by a plunger 280, slidably mounted in an opening 281 in the base 282 of the lower or movable portion of what we will hereafter refer to as the tab-forming punch press. The plate 279 has a portion 283 of substantially the shape of the end of the tab to be formed, and a punch 284, mounted rigidly on the support 285, carried by the pin 286 on the base 282, has a shape complementary to the shape of the edge of the portion 283, the reverse side of the punch 284 being given a similar shape, as is clearly illustrated in Fig. 39. The punch 284 enters a recess 287 in the upper plate 288, carried by the stationary member 289, the portion 289 being rigid with the frame, designated generally in Fig. 30 by the reference numeral 290. A U-shaped trough 291, secured by screws 292 (see Fig. 38) to the under side of the member 289, has the end thereof, adjacent the punch 287, adapted to fit within the recessed surface of the punch, which in this case is semi-circular in cross-section, as clearly illustrated in Fig. 39. The lower base member 282 is moved vertically by means which will be described later and is guided in its vertical movement by the pin 293, secured to the base member 282 and slidably mounted in the bore 294 in the member 289, the bore being formed in a sleeve 295, carried by the member 289. Just above the plate 279, is a head 296, mounted within a recess 297 in the member 289, and this head is yieldingly urged downwardly by the spring 298 which surrounds a spindle 299, having a head 300 cooperating with the head 296, it being understood that the head 296 may move along the spindle 299 in the direction of its length and away from the head 300. The member 289 is provided with a cap 301, having a set screw 302 threaded therein and held in place by the lock nut 303, the end of the screw 302 engaging the end of the spindle 299 to limit its upward movement. A pin 304, threaded in the head 296, acts as a stop for limiting the downward movement of a pair of dogs 305, pivoted at 306 to the head 296, the pin 304 being arranged within the recesses 307, formed in the sides of the dogs 305, as clearly illustrated in Figs. 42 and 38.

In Fig. 41, the parts are shown in inoperative position, with the prongs 277 of one tab in position to be driven through the paper. As the base 282 moves upwardly, the plate 279 engages the under side of the tape 278 and pushes the prongs on the tape upwardly and through the paper, the spring 298 resisting the upward movement of the paper and permitting the prongs to pass therethrough. The dogs 305, which are engaged by the prongs as they pass through the paper, are pivoted into the position shown in Fig. 42. The continued upward movement of the base 282 carries the head 296 vertically, and since the spindle 299 cannot move vertically, the free ends of the dogs 305 engage the head 300 on the spindle and rotate the dogs into the position shown in Fig. 43 to thereby clinch the prongs over the upper surface of the paper. The plunger 280 is surounded by a spring 308 which is strong enough to force the head 296 upwardly, but permits the plate 279 to move downwardly relative to the base 282 when the prongs have been clinched. The base member continues to move upwardly, even after the prongs 277 are clinched, so as to carry the punch 284 into the recess 287 to thereby sever the portion which has been clinched to the flap 86 and form a rounded end on the end of the continuous strip of metal tape. Just before the tape is cut, however, the two prong-forming plungers 309, carried by the pins 310, secured in the base plate 282 against rotation, and guided in openings in the bottom of the trough 291, which openings are shaped into a form complementary to the shape of the plungers 309, force the adjacent portions of the tape 278 against the lower side of the plate 288 and thereafter force portions of the tape into the recesses 311 to form the prongs, as is clearly illustrated in Fig. 43. The base member 282 then moves downwardly to the position shown in Fig. 41, and simultaneously with this movement the blank, to which the tab 88 has been applied, moves out of position and another blank moves into position. Also, the tape is fed forward to the position shown in Fig. 41. In order to hold the tape down in the bottom of the trough, we provide a spring 312, secured to a block 313, which block is loosely carried between the pins 314, there being a cross-pin 315 upon which the tape rests. The free end of the spring engages the tape, and an intermediate portion thereof engages the corner of the member 289, which corner forces the spring downwardly in a manner clearly illustrated in Fig. 41. A guide 316, secured by an adjustable screw 317 (see Figs. 41 and 30), prevents upward movement of the tape.

The tape is fed into the trough by means of the cooperating rollers 318 and 319, which engage opposite sides of the tape. Since it is desired to feed the tape intermittently, it is necessary that the rollers 318 and 319 feed the tape with an intermittent movement, and this is accomplished by means of a pawl and ratchet mechanism, best illustrated perhaps in Figs. 31 to 35, inclusive. In these figures, 320 illustrates a shaft upon which the roller 318 rotates freely, the roller having a gear 321 integrally formed thereon and secured by rivets 322 to a ratchet 323, having a sleeve 324 engaging the shaft 320. A disk 325, secured by means of the key 326 to a gear 327, also rotates on the shaft 320, with an oscillating movement imparted thereto by a rack 328, operated by a pitman 329 from an eccentric 330 on the shaft 331. As best illustrated in Fig. 33, the disk 325 carries a pawl 332 pivoted thereto at 333 and yieldingly urged toward the ratchet 323 by means of the spring 334, which is carried by the pawl 332 and engages a pin 335 on the disk 325. The shaft 331 rotates continuously, and this motion is transformed into rectilinear movement for the rack 328 by means of the pitman and eccentric connection between the rack and shaft 331. The reciprocating movement of the rack rotates the gear 327 and imparts an oscillating movement to the pawl 332, which pawl in turn imparts an intermittent rotation to the roller 318.

The roller 318 is preferably roughened on the surface thereof and has the outer periphery thereof arranged between the flanges 436 on the roller 319, so that the tape is guided positively along a predetermined path toward the tab-punching and applying press. The bearing 337, upon which the roller 319 rotates, is eccentrically mounted on the end of a rotating bearing member 338, provided with an arm 339, normally urged in a clockwise direction, as viewed in Fig. 30, by means of a spring 340 attached to the end of the arm 339 and a pin 341 on the punch press. Consequently, the roller 319 is yieldingly pressed at all times toward the roller 318, but may be released by a counter-clockwise movement of the arm 339 by the operator, if and when desired. In Figs. 41, 42 and 43, there is shown a recess 342, which recess receives the portions of the metal which are punched out of the tape by the punch 284. These punchings may pass out through an opening 343 (see Fig. 30) into a trough 344 and be conveyed away from the punch press to any desired position.

In Fig. 40, there is shown a set screw 345, extending into thhe recess 346 in the plunger 280, for limiting the upward movement of the plunger under the influence of the spring 308. In Fig. 30, there is shown an arm 347, which has a notched end engaging over the pin 315 to hold the same in place and prevent the accidental removal thereof, while at the same time permitting the ready removal of the pin, if and when desired.

The base member 282 has an extension 348 (see Fig. 36), which extends partially within a recess 349 in the slide member 350 and partially within the cap 351, secured by bolts 352 to the slide member 350. The slide member is guided within suitable guides 353 secured to the frame 290 by the bolts 354. The lower end of the slide member is notched at 355 to receive a hardened steel bearing member 356, having a spherical seat to receive a portion of the spherical head 357 on a bolt 358. A bushing 359, threaded into the recess which receives the member 356, also has a spherical seat for engaging the opposite side of the spherical head 357. The bolt 358 is provided with screw threads and openings 360 to rotate the bolt and thereby adjustably determine the position of the bolt within a tapped opening 361, formed in a split bearing 362 on the eccentric collar 363, journaled on the eccentric portion 364 of the shaft 331. Therefore, as the shaft 331 rotates, a vertical reciprocating movement is imparted to the slide member 350 by means of the connections just described. The shaft 331 is rotatably mounted in the split bearings 365, formed on the frame of the punch press.

The tape, which is fed to the punch press, is mounted on a reel, which is best illustrated perhaps in Fig. 45 in cross-section, and in isometric in Fig. 2. The reel, indicated generally by the reference numeral 366, has an outer peripheral ring portion 367, supported by spokes 368, secured to a hub 369, which in turn is held against rotation by the set screw 370, which is brought into clamping engagement with the shaft 371, threaded at 372 into a rigid portion of the frame, as clearly illustrated in Fig. 45. The shaft 371 also has an enlarged portion 373, into which the arm 374 extends. The other end of the arm 374 is secured to one of two brake-shoes 375, hinged together at 376 (see Figs. 6 and 25) and yieldingly urged toward each other by means of the spring 377, surrounding the bolt 378, secured to one of the brake-shoes 375. The tape 278 is wound about a hub 379, rotatable on the shaft 371, and the hub is provided with friction material 380 which cooperates with the brake-shoes 375 to retard the movement of the hub 379. The hub 379 also carries a radially extending guide 381, which cooperates with the spokes 368 to hold the tape in a flat coil. The brake-shoes 375 stop the rotation of the hub 379 after each feeding movement of the tape by means of the feed rollers 318 and 319.

The shaft 331 carries a sprocket 382, which is secured thereto, and this sprocket is connected by means of a chain 383 to a driven shaft 384. This driven shaft 384 carries a bevel gear 385, which meshes with the bevel gear 386 on a shaft 387 (see particularly Figs. 2, 11 and 26). The shaft 387 also has a spur-gear 388 thereon, driven by means of the gears 389, 390 and 391 from the gear 130 (see Figs. 28 and 11).

The shaft 384 drives the cut-off knife which severs the blanks from each other along the lines 246 (shown in Fig. 74). This knife, together with its operating mechanism, is illustrated most clearly in Figs. 11, 27 and 28. The knife 392 is secured by means of bolts 393 to an arm 394, pivoted at 395 to the frame of the machine, and a cooperating hardened steel plate 396 secured to the frame (see Fig. 11) cooperates with the knife 392 as it moves downwardly to sever the blanks.

In Figs. 12, 13 and 14, a modified form of knife is illustrated. This knife 397 is secured by bolts 398 to the arm 394 and is pivoted the same as described for the knife 392, but cooperates with a pair of hardened steel members 399, spaced by means of the block 400, so that a clean cut is made at the end of both blanks which are severed by the knife 397, as the knife moves between the hardened steel members 399. In order to insure that the knife will always be guided into the space between the hardened steel members 399, the knife is provided with a tailpiece 401, best illustrated in Fig. 13. This tailpiece never leaves the space between the hardened steel members 399, although the knife is raised sufficiently high to permit the passage of the blanks therebeneath.

The upper side of the frame of the machine carries an inverted U-shaped bracket 402, secured in place by the bolts 403 and adjustable in the direction of the feed of the blank by the adjusting screw 404, threaded in a block 405, adjacent the U-shaped member 402. An actuating rod 406 (see Figs. 13, 14, 2 and 27) has an eye-bolt 407 adjustably secured in place at the upper end of the actuating rod 406 and held in adjusted position by a lock nut 408. The eye-bolt 407 receives a pin 409, which passes between spaced lugs 410 guided by the legs of the U-shaped bracket 402. The U-shaped bracket is for the purpose of positively guiding the free end of the arm 394 as it rocks about the pivot 395. The shaft 384 has a cam 411 secured therein. This cam has a cam groove 412 in which the roller 413 on the flattened portion 414 of the rod 406 is adapted to travel. The flattened portion 414 is also provided with an elongated recess 415 which embraces the shaft 384 and guides the rod 406 in a vertical rectilinear path as the rod 406 is reciprocated by the roller 413 traveling in the cam groove 412. It will, of course, be understood that any other means may be used to reciprocate the rod 406, or oscillate the knife arm 394 about its pivot.

The folding mechanism is best illustrated in plan in Fig. 28, and in cross-section in Figs. 27 and 65. Figs. 46, 47 and 48 are perspective views of the folding blades. Figs. 24, 25 and 26 are elevational views taken from different sides of the machine and showing portions of the folding mechanism which are visible from the outside of the machine.

As is best illustrated in Fig. 28, the blanks are fed from right to left in a rectilinear path, and the blanks are so formed that the portion 80 of the blank, which is to form the bottom of the bucket, extends at a 45-degree angle to the path of movement of the blank; that is, the parallel sides of the bottom are arranged at 45-degree angles to the path of movement of the blank. Accordingly, the plunger 416, which is forced against the portion 80 and has the end thereof substantially the same size and shape as the portion 80, must be arranged at a 45-degree angle, in order that all parts of the portion 80 will be engaged simultaneously to carry this portion upwardly as the plunger moves upwardly.

As is clearly illustrated in Figs. 26 and 27, the plunger 416 has the upper end thereof tapered to the shape of the bucket to be formed, as is well known in the art to which this invention pertains. The plunger is hollow and has portions thereof drilled away to make the same as light as possible without making the same too weak to perform its intended function without breaking. The plunger is guided by the brackets 417 (see Fig. 26), which brackets are provided with suitable guides cooperating with adjacent machined portions of the plunger. The lower end of the plunger 416 is pivotally connected to a link 418 which in turn is pivoted to an arm 419 on the eccentric collar 420, the eccentric collar embracing an eccentric 421, secured to the shaft 384. The eccentric collar also has a lug 422 pivotally connected to a link 423 which in turn is pivotally connected to a lug 424 secured to the base 94 of the machine. As the shaft 384 rotates, a vertical movement is imparted to the plunger 416 through the connections just described. After the plunger moves into engagement with the bottom portion 80 of the bucket and carries the blank vertically, the remaining portions of the blank are folded into the position shown in Fig. 72 by means which we will now describe.

The blank J is conveyed along the guides 267 into a position over the plunger. As the plunger lifts the blank off the guides 267 and conveys the same upwardly, the side portions 81 of the bucket are first engaged by the laterally extending folding members 426, which carry the vertically extending bars 427 (see Figs. 27, 28, 46, 47 and 65). This operation tends to throw the sides 81 into a substantially parallel position before the end portions 82 are folded into substantially the same relative positions. The end portions are folded inwardly by the yieldingly pressed plungers 428, yieldingly pressed toward the plunger 416 by springs arranged within the recesses 429 in the plungers 428 and abutting against rigid abutments on the guiding members 430, which support and also guide the plungers 428. Since the plungers 428 are yieldingly urged toward the plunger 416, the same will firmly press the end portions 82 of the bucket against the tapered sides of the plunger 416. The connecting web portions 83 are doubled upon each other by these portions just described, and as the movement of the plunger continues in an upward direction, the folding blades 431 and 432 engage the folded web portions 83 and turn them inwardly against the sides 81, as is quite clearly illustrated in Figs. 46 and 47. The folding blades 431 are so arranged as to fold the flaps engaged thereby into contact with the sides 81 prior to the folding of the other web portions 83 against the sides 81 by the folding blades 432. With this arrangement, the web portions are caused to overlap near the top of the bucket, and it is through these overlapping portions that the bail of the bucket is forced to hold the parts of the bucket in position. The folding blades 431 also have projecting portions 433 which tend to hold the web portions in overlapping relation and against the outer surfaces of the vertically extending bars 427, which bars are arranged between the sides 81 and the webs 83, as clearly illustrated in Fig. 47. In Fig. 47, the webs 83 are clear of the portions 433 of the blades 431, but as will be apparent from the description as it proceeds, the bail-forming and driving means has by this time moved into operative position partially about the bucket to hold the webs 83 in overlapping relation after the same leave the folding blades 431.

The bucket has now been formed and it remains only to form the bail and apply the same to the bucket. This mechanism is best illustrated in Figs. 25, 26, 27, 28 and 49 to 60, inclusive. The bail-forming and driving mechanism comprises a reciprocating slide 434 having hardened steel guide strips 435 on opposite sides thereof, bearing against and guided by the guide strips 436 on the frame, and held down by means of the cover 437, best illustrated in Fig. 27. To the rear of the slide, or to the right as viewed in Fig. 27, there is pivoted a link 438, which link in turn is pivoted to an arm 439 on a shaft 440, rotatably mounted in the frame. This arm 439 is rocked by means of a rod 441, pivotally connected to an arm 442, secured to the shaft 440 (see Fig. 26). The rod is pivoted to the arm 442 at 443. The rod is adapted to have reciprocating movement imparted thereto by means of a cam 444, secured to the shaft 384 and having a cam groove 445 therein cooperating with a roller 446 on the end of the rod 441, the rod being provided with an elongated recess 447 in a flattened portion 448 thereof, so that the rod 441 may move longitudinally in the direction of its length when actuated by the cam 444.

The wire to be formed into the bail is fed from a reel, not shown, through an opening in a pin 449, mounted on a bracket 450 on the frame of the machine. The bracket also carries a grooved roller 451 and a cooperating roller 452 for retaining the wire 453 in the groove of the roller 451. The wire then passes through wire-straightening mechanisms 454 and 455 and between cooperating grooved feed rollers 456 and 457, the latter of which is grooved to receive the wire, and both of which are geared to rotate with each other by means of the gears 458 and 459, respectively (see Figs. 24 and 26). The roller 456 and gear 458 are mounted on a shaft 460, driven by means of bevel gears 461 and 462 on the shafts 384 and 460, respectively.

The wire then passes out into a loop 463 (see Fig. 26) and through additional straightening mechanisms 464 and 465. The wire next passes between the feed rollers 466 and 467, the latter being grooved at 468 and being secured to the shaft 460. Cooperating gears 469 and 470 cause the rollers 466 and 467 to move in unison with each other. The rollers 466 and 467 are adapted to feed the wire intermittently, and each time the feed takes place, a sufficient amount of wire is fed to form a single bail. The intermittent feed is accomplished by having a groove 468 in the roller 467 to increase the space between the rollers 466 and 467 during a portion of the revolution of the roller 467. While the rollers have the space therebetween increased, the wire is not gripped and is therefore not fed into the bail-forming position. The wire passes through a tube 471 (see Fig. 26 and Fig. 6) and then through an opening 472 in the frame portion 473 (see Figs. 53 and 57), which frame portion supports the guides 436.

The guide strips 435 and slide 434 have a limited amount of movement relative to each other, due to the provision of the blocks 474, rigidly secured to the slide and operating within slots 475 in the guide strips 435, which slots are slightly longer than the blocks 474. As is best illustrated in Figs. 53, 55 and 27, the cover 434 has an upstanding bearing portion 476 in which the plungers 477 and 478 are adapted to slide vertically in the bearing 476. The plungers 477 and 478 are arranged in alignment with each other, the two plungers 477 being arranged on the outside of the plunger 478, as best illustrated in Fig. 55. The lower ends of each of the plungers 477 and 478 are grooved to receive the wire, and since the plungers in their lowermost position have the grooves thereof substantially in alignment with the opening in the tube 471, and the opening 479 in the frame 473, it is obvious that when the wire is fed through the tube 471, it will be fed into the position shown in Fig. 53. The central portion of the wire resting on the rib 480 on a plate 481, secured to the frame by the screws 482, passing through openings 483 in the plate (see Figs. 54, 27 and 48). The central plunger 478 is provided with a plunger 484, slidable in the bearing cap 485 and surrounded by a spring 486, which normally abuts against an enlarged portion of the plunger 484 and the plunger 478. This causes the plunger 478 to be yieldingly held in its lowermost position and the plunger 484 to move upwardly except when a cam 487 on a shaft 488 is rocked by means of a cam-operating lever 489 secured to the shaft 488. When the cam 487 is rocked in a counter-clockwise direction, as viewed in Fig. 27, the lower end of the plunger 484 is moved positively into engagement with the upper surface of the wire to hold the wire in engagement with the upper surface of the rib 480 and thereby prevent upward movement of the wire during the forming operation. The wire also rests on the integral projections 490 on the forward end of the slide 434, the projections 490 also limiting the downward movement of the plungers 477.

The cam-operating lever 489 has a roller 491 rotatably mounted on the free end thereof and engaging the surface of a cam 492, formed integral with the roller 467, the cam surface being arranged substantially perpendicular to the axis of rotation of the shaft 460 (see Figs. 25 and 26). When the cam 487 is rotated in a clockwise direction, as viewed in Fig. 27, the wire is released and the feeding of the wire can take place, the movement of the parts being so timed as to produce this result.

The wire, which is fed through the opening 479, emerges from the guide strip 436 through a boss 493 which extends inwardly somewhat from the guiding surface of the guide strip 436. To one end of each of the guide strips 435, there is pivoted at 494 a pair of pivot-forming blocks 495 and 496 for forming the pivot of the bail. The block 495 has an enlarged recess portion 497, adapted to pass over the boss 493, and a knife-edged portion 498 adapted to travel close to the surface of the boss surrounding the opening through which the wire emerges, so as to cut the wire as the block 495 passes the boss 493 in its movement from the position shown in Fig. 53 to the position shown in Fig. 55. The blocks 495 and 496 are also grooved at 499 and 500 to receive the opposite ends of the wire bail after it has been cut to the form shown in Fig. 54, or rather simultaneously with the cutting of the same to the shape shown in Fig. 54.

As the slide 434 moves from the position shown in Fig. 53 to that shown in Fig. 55, the pivot blocks 495 and 496 engage the stationary cams 501 and 502, respectively, to rock the blocks about their pivots and bend the ends of the wire, shown in Fig. 54, inwardly against the sides of the plungers 477 to form the wire bail into substantially the shape shown in Fig. 56. It will be understood, of course, that up until the present time, the wire is still within the grooves in the plungers 477 and 478. The projections 490 are recessed at 503 to permit the blocks 495 and 496 to pivot into the position shown in Fig. 55.

A continued movement of the slide 434 to the left causes the raising of the plungers 477 and the forming of the bail into the shape shown in Fig. 58 and the movement of the parts into the position shown in Fig. 57. As is best illustrated in Fig. 49, the blocks 504, secured by the screws 505 to the integral lug portions 506 thereof, are spaced apart sufficiently to receive the members 507, pivoted at 508 to the blocks 504 and projections 490. The members 507 are arranged mostly in the spaces between the projections 490 and blocks 504 and are provided with extensions 509 of reduced thickness, which pass between plates 510 secured to the opposed surfaces of the blocks 504 and projections 490. The members 507 are also grooved at 511 for a purpose which will appear presently. The members 507 are normally urged into the position shown in Fig. 49 by the plungers 512, slidable within the lug portions 506 by springs (not shown) arranged within the bores in which the plungers reciprocate. The forward ends of the blocks 504 are provided with cam surfaces 513, tapered to substantially a complementary bevel to the adjacent beveled edges of the plungers 477.

As the slide, therefore, moves from the position shown in Fig. 55 to that shown in Fig. 57, the cam surfaces 513 engage the plungers 477 and raise the same vertically in the bearing 476, thereby releasing the wire from the grooves in the lower ends of the plungers 477. The ends of the extensions 509 engage the now free portions of the wire on opposite sides of the plunger 478 and bend the free ends of the wire into the shape shown in dotted lines in Fig. 57, and in full lines in Fig. 58. The wire is guided into engagement with the ends of the extensions 509 by the plates 510, it being understood that the rib 480 spaces the wire above the surface of the plate 481 a sufficient amount to permit this guiding movement.

The slide 434 continues its movement to the left from the position shown in Fig. 57 to that shown in Fig. 59 to drive the pivots 514 of the bail through the folded web portions 83 to secure the latter in folded position and also provide a handle for carrying the bucket. In order to do this, it is necessary to first free the bail from the plunger 478 and this is accomplished by means of the cam surfaces 515 on the blocks 504, these cam surfaces raising the plunger 478 in a manner similar to the manner in which the plungers 477 are raised by the cam surfaces 513. When the wire is free of the groove in the plunger 478, it can move forwardly under the influence of the extensions 509 into engagement with the adjacent surface of a block 516, which acts as a limiting stop for the bail and also as a means for assisting the forming of the bail and the driving of the pivots thereof through the web portions 83 of the bucket. The first result during the continued movement of the slide 434 to the left is that the middle portion of the bail is brought against the block 516 and the forward movement of the bail is, therefore, arrested. The continued movement of the slide brings the pivoted members 507 to a position such that the middle portion of the bail, which rests against the block, enters the grooves 511 in the pivoted members 507 and causes the pivoting of the members 507 in a direction such that the extensions 509 thereof are brought inwardly toward the bucket and toward the free ends of the members 427, the latter being provided with a clinching recess 517 (see Figs. 47 and 46). The pivots 514 first pass through the web portions 83 and into the recesses 517 to form the bail into the shape shown in Fig. 60. The bail is, therefore, completed and positioned in its proper position with respect to the bucket. The bucket is also formed and securely held in shape by the bail. As is clearly illustrated in Figs. 48, 46 and 59, the plate 481 is also provided with an upwardly sloping cam surface 518 which normally tends to hold the middle portion of the bail at the proper height to enter the grooves 511. Secured within the block 516 is one end of a stacking guide strip 519, cut away at 520 (see Fig. 46) just above the block 516, in order that the bail, after a slight movement in a vertical direction by the stacker feeding means, presently to be described, will be relieved of its frictional binding engagement with the block and stacking guide strip 519. The stacking guide strip 519 is also of less thickness than the block 516, as is clear from an inspection of Fig. 46, to relieve the friction between the bail and the stacking guide strip 519.

The bucket, having been completely formed, is now ready to be stacked, and in order to do this, the buckets are moved successively upward as they are formed into the last of the buckets formed, to form a stack such as is illustrated in Fig. 25, with the bails, designated as H, extending around the stacking guide strip 519. The buckets are then removed in desired quantities, by hand, from the stacking guide strip 519. The mechanism for feeding the buckets into stacked relation with each other will now be described.

The buckets are guided in their upward travel by the stacking guide strip 519 and an opposed vertical surface 521 on the stacking mechanism carrying bracket 522, carried by the support 523, mounted on the frame of the machine. Formed integrally with the bracket 522, are a pair of guide strips 524 extending outwardly from the surface 521 on opposite sides thereof to prevent lateral movement of the buckets relative to the guide stacking strip 519. Projecting from the surface 521, is a ledge 525, having a horizontal abutment surface extending upwardly and adapted to engage the edge of the flap 85 and prevent downward movement of the bucket after the bucket is moved into the position shown in Fig. 66. The flaps 84 and 86 have a tendency to move inwardly toward each other, and in order to move the flaps outward away from each other, so that they will not interfere with the movement of the next succeeding bucket into the lowermost bucket shown in the stack in Fig. 66, we provide means whereby a bucket, moving from the end of the plunger 416 into the lowermost one of a stack of buckets, will operate flap-engaging means, which engages the flaps 84 and 86 and separates the same and permits the bucket to enter the endmost one of the stack of buckets.

This mechanism is best illustrated in Figs. 65, 66, 67, 68, 69, 70 and 71. In these figures, there is illustrated a vertical slide member 526, guided within suitable guides in the support 523 and having an extension 527 extending through the opening 528 in the support 523. Detachable plates 529 hold the slide 526 in its guide. A cross-arm 530, secured by a bolt 531 to the slide 526, has laterally extending arms, on the ends of which are mounted the pivots 532. These pivots 532 extend outwardly from the cross-arm 530 and are arranged on opposite sides of the path of travel of the buckets. They also pass through slots 533 in the plates 534, later to be described. On the ends of the rods 532 are a pair of pivoted flap-engaging plates 535 and 536, yieldingly urged about their pivots by springs 537, coiled about the pivots and having one end 538 engaging the upper side of the plate, the other end of the spring being fixed rigidly to the pivots. The plates have a limited movement about their pivots, due to the pins 539 extending radially from the pivots 532 and operating in the slots 540 (see particularly Fig. 67). Cotter keys 541 hold the plates against longitudinal movement on the pivots. It will be noted that the plate 535 has an upwardly curved extension 542, so that in the event the flaps of the bucket are close together, the plates will more readily enter between the flaps to move them apart. The guides 524 are recessed at 543 (see Fig. 66), in order to permit the plates 535 and 536 to swing about their pivots. The guides 524 are also recessed at 544 so that after the plates have entered the bucket between the flaps, the flaps may be spread outwardly more than is normally permitted by the guides 524. It is therefore insured that the flaps 84 and 86 will be fully extended so as to provide no obstruction to entrance of the next succeeding bucket into the lowermost one of the stack of buckets.

The plates 535 and 536 are moved outwardly by the bottom of the bucket as it is carried upwardly, but, however, there is another movement of the flaps bodily in the direction of the travel of the bucket. This travel is effected by moving the slide 526 vertically. The movement of the slide in a vertical direction is accomplished by means of an eccentric collar 545, surrounding an eccentric 546 (see particularly Figs. 66 and 2), and the eccentric in turn is secured to the shaft 547 by a key or the like, so as to rotate therewith. The shaft 547 is driven by a chain 548, trained over a sprocket 549 on the shaft 547, and a sprocket 550 on the shaft 384 (see particularly Fig. 2). The eccentric collar 545 is connected by a pitman arm 551, pivoted to the extension 527 on the slide 526 at 552. Of course, it is obvious that the rotation of the shaft 547 causes a reciprocating movement to be imparted to the slide 526 by means of the connections which have just been described.

The means for moving the buckets vertically, after they have been formed, to cause the formed bucket to be inserted in the lowermost one of the stack, carried by the stack-guiding strips 519, is best illustrated in Figs. 27, 65, 66, 68, 69 and 70. Spaced from the support 523, are a pair of auxiliary plates 534, which are held in spaced relation to the support 523 by means of the bolts 566, which pass through the support 523 and plates 534 and are surrounded by spacing sleeves 553 which hold the plates and support in spaced relation to each other when the nuts 554 are tightened to hold the plates spaced from the support 523. The upper sleeves 553 act also as bearings for sprockets 555 and 556, integrally formed, but spaced from each other longitudinally to receive different driving chains, which will be referred to hereinafter, the lower sleeves 552 carrying only a single sprocket 557 (see Figs. 65 and 66).

The support 523 rotatably carries a pair of shafts 558, to which are secured the sprockets 559. The shafts 558 extend through the supports 523 and have bevel gears 560 on the ends thereof (see particularly Figs. 68 and 69, as well as Fig. 2), and these bevel gears mesh with bevel gears 561 on the shaft 547. It will be noted that the gears 561 are arranged on opposite sides of their respective gears 560, so as to impart rotation of the shafts 558 in opposite directions, for a purpose which will appear obvious as the description proceeds. The sprockets 555 and 559 have chains 562 trained thereover, so that as the shafts 558 are driven, the sprockets 555 will also be driven, and this in turn actuates the sprockets 556. The shafts 558 also carry additional sprockets 563 secured thereto, and chains 564 are trained over the sprockets 563 and also over the sprockets 557 and 565, the latter being rotatably mounted on the stub shafts 566, threaded into the support 523. Chains 567 are trained over the drive sprockets 556 and over the idler sprockets 568 and 569, rotatably mounted on the studs 570 and 571, respectively, the studs 570 and 571 being carried by the plates 534.

The effect of the arrangement just described is to have two chains 564 and 567 traveling in substantially triangular paths which are parallel to each other. In addition to having their paths parallel, the runs of the chains, which lie adjacent the path of the movement of the stackers, travel in a direction parallel to that path, and for the purpose of supporting feeding means for feeding the buckets upwardly into the stack of buckets carried by the stack-guiding strip 519. The chains 564 carry the pivots 572, rotatably mounted in brackets 573, which latter are secured to spaced links on the chains. Each chain has three pivots 572. The chains 567 carry similar pivots 574, mounted rotatably in brackets 575. The pivots 572 and 574 are so arranged on their respective chains that they always travel one above the other. Links 576, having their upper ends either secured to or just embracing the pivots 572, have their lower ends secured to the pivots 574, so that the pivots 574 will not rotate at all, except in their brackets 575. The pivots 574 have castings 577 secured to their outer ends, and fingers 578 formed on these castings extend inwardly toward each other to engage the lowermost edges of the web portions 83 of the bucket J when the pivots move inwardly toward the path of travel of the buckets and begin their upward movement, as is best illustrated in Fig. 65. A continued movement of the bucket vertically from the position shown in Fig. 65 will bring the bottom of the bucket into engagement with the plates 535 and 536 and these will move the flaps 84 and 86 of the lowermost bucket in the stack outwardly, as previously described, and permit the buckets to be carried into the lowermost bucket without interference by the flaps 84 and 86 thereof. During the upward movement of the pivots 574, the same are guided against lateral movement by the guides 524 and the edges 579 on the plates 534 (see Fig. 65). When the buckets have been raised sufficiently high to have the flap 85 above the projection 525, the pivots begin their movement outwardly away from the path of travel of the buckets, due to the movement of the chains over their respective upper sprockets. It will be noted from an inspection of Fig. 65 that the plates 535 and 536 are engaged by the pivots 574 near the upper path of travel of the pivots 574 and are moved outwardly against the action of their springs until after the pivots have passed the ends of the plates, after which the springs return the plates to the full line position shown in Fig. 65.

In Fig. 21, I have illustrated a modified form of roller for the paraffin-applying mechanism. In this figure, the same reference numerals correspond to similar parts hereinbefore referred to. The upper roll 580, instead of being a plain roll, as in Fig. 17, has a covering 581 of felt or similar material which is more or less absorbent, this material being held on the roll by the end plates 582. Therefore, when the paraffin is sprayed on the upper roll 580, the paraffin is more easily distributed and the roll yields to permit the paper to impress itself therein, as shown in a slightly exaggerated manner in Fig. 21, thereby preventing a surplus of paraffin from forming on the edges of the paper. In other words, since the surface of the roll is yielding, there is a tendency for the yielding surface to not only apply the paraffin, but to wipe any surplus paraffin off the edges of the paper, thus doing away with the scrapers 198, illustrated in Fig. 17 in connection with the first embodiment of this invention disclosed in the drawings. The rest of the paraffin apparatus is substantially as shown in connection with the first embodiment illustrated and described.

In Figs. 75, 76 and 77, I have illustrated a bucket P, which is constructed somewhat differently than that illustrated in Figs. 72, 73 and 74, but the same may be formed by the same apparatus illustrated in the drawings by merely changing the dies used in cutting the blanks. About the only difference in the formation of the blank is that the flaps 583, 584, 585 and 586 of the blank are formed so that there is a tab 587 on the flap 585 adapted to enter the slot 588, as in the usual construction of the bucket. In forming this type of bucket, of course, it is obvious that the tab-punching and applying mechanism is not necessary and, if desired, may be disconnected so as not to operate, merely by removing the chain 383. However, the punch press may be permitted to operate, if desired, as it does not interfere with the rest of the mechanism. If the tab-forming and applying press is permitted to operate, the tab, of course, is not fed through the apparatus, but is permitted to remain idle on the reel.

The forming and the stacking of the buckets is performed in exactly the same way for both forms of buckets.

The bridge 248 of the frame 233 of the punch press carries a rotatable shaft 589, about which there is a split yoke 590, the portions of which are yieldingly urged toward each other by the springs 591. The shaft 581 has a ratchet 592 secured thereto (see Fig. 18), and an arm 593, rotatably mounted on the shaft 589, carries a pawl 594, to the end of which is connected a pivoted rod 595. The pawl 594 is urged into engagement with the ratchet 592 by a spring 596. The rod 595 has the lower end thereof adapted to periodically engage the tube 258 as the frame 233 reciprocates. This causes the arm 593 to be rocked and, as a result, the shaft 589 is rotated with an intermittent movement by means of the pawl and ratchet connection 594—592. The rotation of the shaft is resisted by means of the split yoke 590. The shaft 589 carries a collar 597, having a projection 598 in the periphery thereof. A rod 599 (see Figs. 11, 18, 19 and 20) is surrounded by a spring 600 which abuts against a screw 601 threaded into the rod 599 and against the upper side of the die member 261 to normally hold the rod in its uppermost position, the screw 601 also acting as a limiting stop to limit the upward movement of the rod 599. As the collar 597 rotates and the frame 233 moves up and down the rod 599 is not engaged sufficiently by the collar to move the lower end of the rod into engagement with the blank, but when the projection 598 is above the rod 599 the movement of the frame downwardly causes the lower end of the rod to engage and mark the blank. Since this movement of the rod to mark the blank is at regular intervals, the number of marked blanks may be counted and the number of buckets produced estimated. For instance, every fiftieth blank may be marked. See the patent to Craig No. 1,678,901, granted July 31, 1928.

The operation of the machine, while having been described in detail, will now be described in a more or less brief manner, in order to more clearly set forth the invention.

The paper, which is used in forming the blanks and the buckets, is fed between the rollers 96 and 97 and then through the straightening rollers 104 and feed rollers 147 between the printing rolls 105 and 106, which printing rolls print one color on the paper and thereafter the paper travels between the feed rollers 138, which, together with the feed rollers 150, assist in feeding the paper between the printing rolls 105 and 106 of the second printing press.

The printing rolls 105 have ink applied thereto by means of the rollers 112, 113, 109, and doctor rollers 108, which rollers 108 feed the ink from the reservoirs 107 to the rollers 109, 112 and 113. Both of the printing presses are driven from the same source of power and in timed relation with each other, in a manner which has previously been described.

The paper then is fed over the plate 181 into the paraffin tank 173, where the rolls 179 and 180 rotate in engagement with the opposite sides of the paper. If the paraffin is to be applied to only one side of the paper, the belt 194, which drives the shaft 191 of the pump 188, is removed so that no paraffin is pumped through the pipe 189 through the spray-pipe 190. However, if both sides of the paper are to have paraffin applied thereto, the belt remains in place and the pump forces the paraffin from the lower part of the tank through the spray-pipe 190 through the pipe 189.

The scrapers 198 prevent the accumulation of excess paraffin on the ends of the roll 179. However, as explained in connection with the description of Fig. 21 which shows a modified upper paraffin-applying roll, the felt or yielding porous covering 581 on the roll 589 prevents the accumulation of excess paraffin on the edges of the paper and assists in distributing the paraffin uniformly over the entire surface. It will be understood, of course, that both the upper and lower rolls may be formed the same as the upper roll in Fig. 21, if desired, and all of the paraffin fed to the rolls by means of a spray-pipe, instead of having the lower roll immersed in the paraffin in the tanks 173.

The paper then passes out of the paraffin tank 173 between the feed rollers 221, which feed rollers grip opposite sides of the paper. The upper feed rollers 221 are periodically moved upward by means of the stop 232 engaging the adjustable stop 231 on the bell crank 229, pivotally connected by the link 228 to the shaft 227, which supports the upper feed rollers. In this manner, while the feed rollers are continuously driven, they do not continuously feed the paper. As soon as the feed rollers stop feeding the paper, the frame 233 of the punch press D has moved down sufficiently so that the ends of the plungers 236 are yieldingly pressed by the springs 235 against the upper surface of the paper to thereby prevent the forward movement of the paper toward the punch press. This results in a loop 239 forming in the paper, as is best illustrated in Fig. 10. The punch press G cuts the blank except along the line 246, which connects adjacent blanks, the blanks being severed later when they arrive at the bucket-forming position. As soon as one blank has been stamped, the upper and lower feed rollers 221 grip the paper and feed the same forwardly at a speed greater than the normal continuous feed of the paper by the rollers 147, 138 and 150, to make up for the time lost while the paper was held stationary by the plungers 236.

The paper is carried over the heated tables 183 and 266 between the guides 267, into a position adjacent the tab-applying and punching press F. This is perhaps best illustrated in Figs. 30 to 44, inclusive. The slide 350 is reciprocated in the manner previously described in detail, and the metal tape 278 is fed intermittently into tab-forming and driving positions by the feed rollers 318 and 319. The end of the tape is first formed with vertically extending prongs 277 by the prong-forming plungers 309, which force the tape upwardly against the under side of the plate 288 and portions of the tape into the recesses 311, in order to form the prongs. The prongs, after they are formed, pass into the position shown in Fig. 41, which is a position below the blank 86, and as the base member 282 moves upwardly, carrying with it the yieldingly pressed plate 279, the under side of the end of the tape 278 is engaged by the plate 279 and the continued movement of the base member 282 causes the prongs to penetrate the paper and be clinched by the pivoted clinching dogs 305, which first move to the position shown in Fig. 42 as the prongs are forced through the paper, and later are moved into the position shown in Fig. 43 as the head 300 engages the dogs 305 and causes them to move about their pivots into clinching position. Simultaneously with the clinching of the prongs of the tab, the tab is cut from the tape by the punch 284, which enters the recess 287, to form a rounded end on the tab which has just been cut from the tape, and also form a rounded end on the end of the tape from which the tab has been cut, the rounded ends being convex in both instances.

The blanks are then fed into the guides 425 into a position above the plunger 416, with the bottom portion 80 of the bucket aligned with the upper end of the plunger. The blank, when it arrives in this position, is cut from the remaining blanks by the knife 392 or 397 in the manner previously described. As the plunger moves upwardly, the portion 80 of the blank is engaged and forced upwardly between the folding members 426 which fold the sides 81 against the sides of the plunger 416; the plungers 428, which fold the ends 82 of the blank against the sides of the plunger; and blades 431 and 432, which successively fold the web portions 83 into the overlapping relation shown in Fig. 72 and also 47. The vertically extending bars 427 are arranged between the folded overlapping portions 83 of the bucket and the sides 81 thereof and have recesses 517 adapted to receive and clinch the ends of a bail applied to the bucket in the following manner.

In Fig. 27, I have illustrated a slide 434 (also shown in Figs. 53, 55, 57 and 59), which is reciprocated in a direction toward and from the stacking guiding strip 519. This slide is adapted to form the bail and apply the same to the bucket.

The vertically extending bearing 476 on the cover 437 carries the vertically sliding plungers 478 and 477, which have recesses at their lower ends for receiving the wire to be formed into the bail. The slide is equipped with the extensions 490 which partially support the wire, and there is also a plate 481 having a rib 480, which rib also assists in supporting the wire. The plunger 484, actuated by the cam 487, is normally held down on top of the wire to prevent the wire from shifting until desired.

The slide is also equipped with the blocks 504, spaced from the extensions 490, and pivoted members 507. The wire enters the space between the blocks 504 and extensions 490, and the ends of the wire are formed first into the shape illustrated in Fig. 56 by means of the pivoted blocks 495, which cooperate with the adjacent ends of the plungers 477 as the slide moves forwardly. The continued movement of the slide causes the cam surfaces 513 to raise the plungers 477 to release the wire and permit the ends 509 of the rotatable members 507 to engage the ends of the wire and move these ends into the position shown in Fig. 57, thereby forming the bail in the shape illustrated in Fig. 58. The bail is still held, however, by the plunger 478, but as the slide 434 continues its movement, the cam surfaces 515 raise the plunger 478 at about the same time as the plunger 484 moves upwardly under the influence of the spring 486, due to the fact that the arm 428 has rocked about its pivot to permit this movement. The middle portion of the bail enters the recesses 511 in the pivoted members 507 and is carried forward into engagement with the block 516, the bail being kept at a proper height to center the same in the grooves 511 by an upwardly sloping portion 518 on the plate 481. The block limits the movement of the bail as the rotatable members 507 are rocked about their pivots, due to the engagement of the portions of the rotatable members, which have the grooves 511 therein, engaging the block 516. This causes the extensions 509 on the rotatable members 507 to move inwardly and force the pivots 514 of the bail through the web portions 83 to hold the web portions in folded position. Simultaneously, the ends of the pivots enter the recesses 517 in the bars 427 to thereby clinch the pivots and hold the bail in position. The completed bail is shown in Fig. 60.

As the plunger 416 moves downwardly into its inoperative position, the fingers 578 and the pivots 574, carried and controlled by the chains 564 and 567, engage the under sides of the web portions 83 and the bail M to thereby raise the completed bucket into the stack of buckets carried by the stacking guide strip 519. The plates 535 and 536 pivot and move bodily upward in the manner described, to extend the flaps 84 and 86 of the bucket which is lowermost in the stack, to permit the entry of the next succeeding bucket into the same without interference by the flaps. It will be noted that the bails M surround the stacking guide strip 519 and hold the buckets in stacked relation in a manner which is quite clearly illustrated both in Fig. 66 and Fig. 25. The buckets can be removed manually from the end of the stacking guide strip 519, as desired.

While the steam pipe connections for the various units to be heated have not been described specifically, it will be understood that the steam pipe lines leading to the various heating chambers are arranged either to feed the steam successively through the various chambers, or simultaneously, as may be desired. In the arrangement shown in the drawings, the steam is passed successively through the heated tables which support the paper, but a description of the steam pipe connections is not material to the present invention and would only tend to confuse any one reading the description. The description of this portion of the apparatus has, therefore, been omitted.

From the foregoing it will be seen that the paper or web or other sheet material from which the receptacles are made is automatically printed, blanked, paraffined, and converted into receptacles having bail-shaped wire handles. The instrumentalities shown and described for performing the different steps are of such character that greater accuracy is insured in the performance of the different steps, thereby insuring better receptacles and a less number of defectives than was possible heretofore with automatic machines for performing these different steps automatically. In addition, the said instrumentalities are of such character that they are capable of operating at relatively high speed, thereby serving to speed up and reduce the cost of production.

While the invention is shown in connection with the production of what are commonly called ice cream pails, it is obvious that the invention, and various features thereof, may be employed in connection with the production of similar or other receptacles, for other purposes, without departing from the spirit of the invention.

From the foregoing it will be seen that the sheet of paper practically has a straight line feed through the entire machine. It periodically buckles, of course, after leaving the paraffin mechanism, but the line of feed is really on a straight horizontal line through the entire machine, and it follows that the line of feed through the paraffin mechanism is straight and horizontal. The paper is first printed, then paraffined, either on the under side or on both the under and the upper sides, and the paraffin on the upper side of the paper tends to waterproof the printing thereon. Thereafter, the blanks are formed on the sheet, but not severed therefrom, with the waterproof printing, if any, on the upper side of each blank. After that, a metal tab or fastener is secured to one edge of the blank, if a receptacle of a certain type is being made. After that, the blank with its metal fastener is cut off or severed from the sheet, and the severed blank with its metal fastener, or with the integral tabs of the other form of blank, is then moved into position to be formed into the desired receptacle. Finally, when the blank is folded and held in the shape necessary for the receptacle, the wire bail is then inserted and its ends clinched on the under side of the receptacle. Thus the receptacles are made upside down, and the stacking is done at the bottom of the stack, so that the stack grows, so to speak, from the bottom downward, by adding receptacles at the bottom, instead of by adding successive receptacles at the top of the stack. And, of course, as explained, the folding operation, the handle inserting operation, and the stacking operation are all effected without any interference therewith by the metal tabs or fasteners secured to the receptacles, if one type of receptacle is made, or by the integral tabs or fasteners if the other type of receptacle is made.

Furthermore, it will be seen that the stacking is facilitated by the sprocket chain mechanism shown and described, as this mechanism is provided with projections that move upward a distance with the receptacles. But this action is periodic, so to speak, and is not of a character to interfere or disturb each receptacle while it is being formed and equipped with a handle.

Therefore, in the organization of the different instrumentalities for producing the ultimate result, the finished receptacle, it will be seen that there are always one or more connected blanks (four as shown) between the blank which is being formed in the blanking press and the blank which is being shaped into a receptacle, which latter blank is the one being cut off at the time that the other one is formed in the blanking press. The metal tabs are applied to the blank that is the second one ahead of the one that is being scored or cut or otherwise formed in the blanking press. Thus the blank with its metal tab that is cut off and shaped into a receptacle is fed into position above the plunger 416 by a series of connected blanks, some of which have metal tabs, and some of which have not as yet been provided with metal tabs or fasteners.

What we claim as our invention is:

1. In the general organization of a machine for making and folding paper blanks and inserting wire bails therein to form receptacles having handles, the combination with means for feeding a strip of paper, of means for printing on said paper, means for applying a paraffin coating or the like to both the printed and unprinted sides of said paper, means for delivering the paper straight from the printing means to the paraffining means, by a straight line feed of the paper horizontally to and through the paraffining means, so that the paraffining is done while the paper is stretched straight and horizontal in the line of feed thereof, means for cutting a blank from said paper, with said paraffined printing thereon, means for delivering the paper by jump feed from the paraffining means to the blank-forming means, and means for folding and creasing said blank to form said receptacle with said printing thus waterproofed on the outer surface thereof.

2. In the general organization of a machine for making and folding paper blanks and inserting wire bails therein to form receptacles having handles, the combination with means for feeding a strip of paper continuously along a predetermined horizontal path, means for applying paraffin to said paper as it moves horizontally along said path, blank-forming mechanism, means for changing the feed of said paper after the paraffin is applied thereto, so that said paper is fed intermittently to said blank-forming mechanism and remains stationary while the blank is being formed, means for forming the blanks into receptacles after the blanks have been formed, and means for supporting the sheet and for applying heat to the paraffined surface of the paper as it moves from the paraffin-applying mechanism to said blank-forming mechanism, thereby to distribute the paraffin uniformly over the surface of said paper and more thoroughly impregnate the surface of said paper with the paraffin, before the paper is formed into blanks.

3. In the general organization of a machine for making and folding paper blanks and inserting wire bails therein to form receptacles having handles, the combination with blank-forming mechanism for forming successive blanks from the sheet, of means for applying a metal tab to the blank, before the blank is severed from the sheet, comprising a press having means thereon for forming a tab from a metal strip and applying the tab, and means for cutting off the previously formed blank with its tab, whereby the blank is first formed, the tab is applied, and the blank is then severed from the sheet, there being one or more blanks between the one being formed and the one being cut off, and the tab being applied to the second one ahead of the one being formed.

4. In the general organization of a machine for making and folding blanks made from sheet paper and inserting wire bails therein to form receptacles having handles, means for forming a series of blanks from the paper as it is fed along a path, and means for applying a metal tab or the like to a portion of each blank, before the blank is severed from the sheet, comprising means movable toward each other from opposite sides of said blank, means for forming a holding means on a metal strip and for forming a portion of said metal strip, including said holding means, into a tab, means for applying said tab to said blank and for securing said tab to said blank by said holding means, and means for cutting off the previously formed blank with its tab, whereby the blank is first formed, the tab is applied, and the blank is then severed from the sheet, there being one or more blanks between the one being formed and the one being cut off, and the tab being applied to the second one ahead of the one being formed.

5. In the general organization of a machine for making and folding blanks made from sheet paper and inserting wire bails therein to form receptacles having handles, receptacle-shaping means for shaping receptacles from the blanks as they are formed, and a tab-forming and applying means for forming and applying metal tabs or the like to a portion of each blank, before the blank is severed from the sheet, said tab acting as a means for holding the cover of said receptacle in closed position, said tab-forming and applying means comprising means for feeding a continuous strip of metal along a predetermined path, means for forming prongs adjacent the end of said strip, means for driving said prongs through a portion of said blank and for clinching said prongs to hold said metal strip securely with respect to said blank, means for cutting the portion of said strip containing said prongs from the strip to form a tab on said blank, and means for cutting off the previously formed blank with its tab, whereby the blank is first formed, the tab is applied, and the blank is then severed from the sheet, there being one or more blanks between the one being formed and the one being cut off, and the tab being applied to the second one ahead of the one being formed.

6. In the general organization of a machine for making and folding blanks made from sheet paper and inserting wire bails therein to form receptacles having handles, the combination with blank-forming mechanism, before the blank is severed from the sheet, folding mechanism for shaping each blank to form the receptacle, and means for forming and applying a metal tab to said blank, comprising means for feeding a continuous strip of metal to a position adjacent said blank, means for forming prongs on said metal strip near the end thereof, means for driving said prongs through a portion of said blank and for clinching said prongs, means for cutting the end of said strip containing said prongs from the remaining portion of said strip after the prongs have been driven through said paper and clinched, and means for cutting off the previously formed blank with its tab, whereby the blank is first formed, the tab is applied, and the blank is then severed from the sheet, there being one or more blanks between the one being formed and the one being cut off, and the tab being applied to the second one ahead of the one being formed.

7. In the general organization of a machine for making and folding paper blanks and inserting wire bails therein to form receptacles having handles, means for feeding the sheet of paper, means for forming blanks successively on said sheet, means for feeding a continuous strip of metal along a predetermined path, a pair of dies located along the path of movement of said strip for forming prongs on said strip, means for driving said prongs into a portion of a blank, while the latter is still connected to a blank that is in turn connected to one being formed, means for clinching the prongs after they are passed through said blank to secure the end of said metal strip to said blank, means for cutting the end of the metal strip which contains said prongs from the rest of said strip after the prongs have been driven into said blank, and means for thereafter severing the previously formed blank from the sheet.

8. A device as claimed in claim 7, in which the means which cuts the end of said strip from the remaining portion thereof comprises a knife which cuts an irregular portion out of said strip to form rounded ends on the portion of said strip which has been severed and the remaining portion of the strip.

9. A device as claimed in claim 7, in which the driving mechanism comprises means for moving the end of said metal strip towards the blank, and means for preventing the movement of said blank away from said prongs while the prongs are being driven therethrough and in which the prongs are clinched by means operable after the movement of the prongs through the blank as said prongs and blank continue their movement under the influence of said driving means in the same direction.

10. In the general organization of a machine for making and folding paper blanks and inserting wire bails therein to form receptacles having handles, the combination with a means for feeding a continuous strip of tape intermittently to a prong-forming position and to a tab-forming position, of cooperating dies for forming prongs at said prong-forming position, and cooperating presser heads and cut-off devices at said tab-forming position for forming said tab by cutting the portion of said tape having said prongs from the remaining portion of said tape and driving said prongs through a blank, and means for thereafter severing the previously formed blank from the sheet, and for clinching said prongs after the prongs are forced through said blank, together with means for finally cutting off the blank with the finished tab thereon, while another blank is being formed and one between is receiving a tab.

11. A device as claimed in claim 10, in which the intermittent feed for the tape comprises a pair of cooperating rollers and pawl and ratchet mechanism operatively connected to one of said rollers to drive the same, said pawl and ratchet mechanism being operative intermittently to impart rotation to said last mentioned roller.

12. In the general organization of a machine for making and folding paper blanks and inserting wire bails therein to form receptacles having handles, the combination with blank-feeding mechanism, means for forming a receptacle from said blank, means for applying a bail to said receptacle, an elongated member arranged between a portion of said bail and said receptacle, and means for feeding said receptacle in the direction of the length of said member, said bail acting as a means for guiding said receptacle along said elongated member.

13. In the general organization of a machine for making and folding paper blanks and inserting wire bails therein to form receptacles having handles, the combination with blank-feeding means, means for forming a receptacle from said blank, an elongated member adjacent one side of said receptacle after said receptacle has been formed, a bail-applying mechanism for applying a bail to said receptacle with a portion of said bail embracing said member, and means for feeding said receptacle along said elongated member while guided therealong by the portion of said bail which embraces said member.

14. In the general organization of a machine for making and folding paper blanks and inserting wire bails therein to form receptacles having handles, the combination with a blank-feeding means, of means for shaping said blank to form the receptacle, a guide for guiding said receptacle after it is formed, and feeding means comprising elements movable continuously along a predetermined endless path for engaging said receptacles for a portion of said path, after they are formed, and for feeding said receptacles in stacked relation along said guide, but without distorting each receptacle while it is being formed.

15. A device as claimed in claim 14, in which the feeding means comprises a pair of flexible elements trained over guide pulleys, and members carrying projections thereon supported by said flexible elements, said flexible elements traveling continuously in one direction and having portions thereof arranged adjacent said guide so that said projections periodically come into engagement with a formed receptacle and convey the same along said guide.

16. A device as set forth in claim 14, in which the feeding means comprises a plurality of projections for engaging said receptacle and feeding the same along said guide, members carrying said projections, rigid means for guiding said members in paths parallel to said guide during the travel of said members along said guide, and flexible elements for conveying said members along said guide and in one direction only along said guide while the projections are in a position to engage a receptacle.

17. In the general organization of a machine for making and folding paper blanks and inserting wire bails therein to form receptacles having handles, the combination with means for forming a receptacle from a blank, and means for stacking said receptacles, one within the other, comprising a guide, means for moving a receptacle along said guide after it is formed, means for holding said receptacle in a predetermined position along said guide after it has moved to that position, means for moving the next successive receptacle along said guide into said first mentioned receptacle, and movable guiding strips adapted to enter said first mentioned receptacle in advance of said second receptacle to facilitate the entrance of said second receptacle into said first receptacle.

18. A device as claimed in claim 17, in which said movable means comprises a pair of pivoted plates movable against opposite walls of said first receptacle to separate those walls sufficiently to permit entrance of said second receptacle.

19. In the general organization of a machine for making and folding paper blanks and inserting wire bails therein to form receptacles having handles, the combination with means for feeding blanks to a forming position, means for forming said receptacle, a guiding means for guiding said receptacle after it is formed, means for moving each receptacle into the previous receptacle formed and at a predetermined position along said guiding means, said receptacles having flaps extending upwardly from the body of said receptacles, and means for separating the flaps of the last receptacle in a stack to facilitate the entrance of the next receptacle into the last receptacle of said stack.

20. A device as claimed in claim 19, in which there is a bail-applying mechanism for applying a bail to said receptacle with a portion of said bail cooperating with said guiding means to assist in guiding said receptacles along said guiding means.

21. In the general organization of a machine for making and folding paper blanks and inserting wire bails therein to form receptacles having handles, the combination with a blank-forming and feeding means, means for forming a receptacle from said blanks as said blanks reach a predetermined position, and stacking mechanism for stacking the receptacles, one within the other, after the same have been formed, comprising a guide, a pair of flexible elements mounted on one side of said guide, said flexible elements being trained over a series of guiding elements and having the runs thereof between adjacent guiding elements parallel with two corresponding runs on each of said flexible elements lying in a plane parallel to said guide, members carried by one of said flexible elements, a connection between said member and the other of said flexible elements, a projection carried by said member extending transversely of the length of said guide, and means for driving said flexible elements, said projections moving continuously in a path such that said projection always extends in the same direction with respect to said guide, due to the interconnecting means between said member and the flexible element other than the one to which said member is secured.

22. A device as claimed in claim 21, in which another set of flexible elements carrying members and projections is provided on the opposite side of said guide, so that opposite sides of said receptacle may be engaged by said projections and conveyed along said guide.

23. In the general organization of a machine for making and folding paper blanks and inserting wire bails therein to form receptacles having handles, the combination with a guide, a pair of members arranged on opposite sides of said guide and extending transversely to the length of said guide, guides for guiding said members rigidly along paths parallel to said guide and for preventing movement of said members away from said guide, said projections engaging the edges of a receptacle for feeding said receptacle along said guide, means for feeding said projections in only one direction along said guide while said projections are in a position in the path of travel of said receptacles, means arranged in advance of a receptacle being moved by said projections movable into a preceding receptacle on said guide for spreading portions of said last mentioned receptacle so that the receptacle being moved by said projections will have its entrance into said second mentioned receptacle facilitated and so that the receptacles will be arranged in proper stacked relation with each other.

24. A device as claimed in claim 23, in which the means which moves in advance of said first receptacle comprises a pair of pivoted plates movable outwardly against edge portions of said second receptacle so that said edge portions will not be engaged by said first receptacle as said second receptacle moves toward and into said first receptacle.

25. A device as claimed in claim 23, in which the means which moves in advance of said first receptacle comprises a pair of pivoted plates movable outwardly against edge portions of said second receptacle so that said edge portions will not be engaged by said first receptacle as said second receptacle moves toward and into said first receptacle, and in which said pivoted plates also have bodily movement in the direction of the feed of said receptacles.

26. In the general organization of a machine for making and folding paper blanks and inserting wire bails therein to form receptacles having handles, the combination with a blank-forming means, means for forming the blank into a receptacle, a guide, means for positioning said receptacle after it is formed adjacent said guide on one side thereof, bail-forming and applying mechanism on the opposite side of said guide from said receptacle, means for moving said last mentioned means to form and apply a bail to said receptacle with a portion of said bail embracing said guide, and means for feeding said receptacle along said guide after said bail has been applied thereto.

27. A device as claimed in claim 26, in which said bail-forming and applying mechanism comprises a wire-feeding means, means for cutting said wire to the desired length to form a bail, means for bending the ends of said bail through slightly more than ninety degrees, means for thereafter shaping the portion of said bail intermediate the ends thereof into a substantially U shape by bending said wire at opposite sides of the middle thereof toward each other and through slightly less than ninety degrees and thereafter driving said end portions through the receptacle by means engaging the legs of said U-shaped portion, and means for clinching the ends after the same have been driven through said receptacle to securely hold said bail in place on said receptacle.

28. In the general organization of a machine for making and folding paper blanks and inserting wire bails therein to form receptacles having handles, means for forming a bail and for applying said bail to the receptacle, comprising a slide, pivoted members carried by said slide, means for feeding a wire into a position between said slide and a receptacle to which the bail is to be applied, means for moving said slide toward the receptacle to which a bail is to be applied, means for engaging opposite ends of said wire as said slide moves toward said receptacle and for bending said ends toward each other through substantially more than ninety degrees so that said ends extend in the same general direction, but are inclined toward each other, means for forming the remaining portion of said wire into a substantially U shape, and means for driving said ends of said wire into opposite sides of said receptacle, the ends of said wire being substantially perpendicular to the sides of the receptacle through which the same are driven as the driving of said ends begins.

29. In the general organization of a machine for making and folding paper blanks and inserting wire bails therein to form receptacles having handles, means for forming the bail into a substantially U shape with pivot portions extending inwardly toward each other from the opposite legs of said bail, said pivots being substantially in alignment with each other before being applied to said bail and at such angles that said pivots are substantially perpendicular to the sides of said receptacle before the driving of said pivots through said sides commences, and means for inserting the pivots through the sides and clinching them inside the receptacle while the receptacle is upside down.

30. In the general organization of a machine for making and folding paper blanks and inserting wire bails therein to form receptacles having handles, means for severing successive blanks from each other, preliminary to successively forming them into receptacles, comprising a knife and supports on opposite sides of said knife for supporting the edges of adjacent blanks closely adjacent the knife while the blanks are being severed from each other, and means for forming a blank each time one is cut off, with one or more unsevered blanks between the blank being cut off and the one being formed.

31. A device as claimed in claim 30, in which the knife has means associated therewith for guiding said knife positively into a position between said supporting members as it moves to sever the blanks from each other.

32. A device as claimed in claim 30, in which said knife has an extension in prolongation with the cutting edge thereof arranged between said supporting members at all times to act as a guide for guiding the knife between said supporting members as said knife moves to sever adjacent blanks from each other.

33. In the general organization of a machine for making and folding paper blanks to form receptacles, the combination with means for feeding a strip of paper along a predetermined path, by a straight-line feed through each position where an operation is performed on the paper, a paraffin-applying mechanism for applying paraffin to said paper at one point in the path of travel of said strip, a blanking mechanism for forming the blank for the receptacle at a subsequent point along the path of travel of said strip, so that the paraffin is put on before the blank is formed, and a receptacle-forming mechanism located along the path of travel of said strip adapted to operate on the blanks after they are formed to complete the receptacle, with sufficient distance between the blanking and forming positions to permit the paraffin to harden, said paraffin-applying mechanism comprising a tank for the paraffin to be applied to the paper, rolls on opposite sides of said paper and in engagement with the same, means for supplying paraffin to both of said rolls so that paraffin may be applied to both sides of said paper, and means for selectively rendering the means which supplies paraffin to one of said rolls inoperative.

34. In the general organization of a machine for making and folding paper blanks to form receptacles, the combination with means for feeding a strip of paper along a predetermined path, by a straight-line feed through each position where an operation is performed on the paper, a paraffin-applying mechanism for applying paraffin to said paper at one point in the path of travel of said strip, a blanking mechanism for forming the blank for the receptacle at a subsequent point along the path of travel of said strip, so that the paraffin is put on before the blank is formed, and a receptacle-forming mechanism located along the path of travel of said strip adapted to operate on the blanks after they are formed to complete the receptacle, with sufficient distance between the blanking and forming positions to permit the paraffin to harden, said paraffin-applying mechanism comprising a tank through which the paper to be formed into receptacles is passed, rolls engaging opposite sides of said paper, said tank being adapted to receive a quantity of paraffin in which one of said rolls is partially immersed so that as said roll rotates, the paraffin will be carried by said roll onto the adjacent surface of the paper, and means for conveying a quantity of the paraffin to the other of said rolls so that when said latter roll rotates paraffin is carried into engagement with the other surface of said paper.

35. A device as claimed in claim 34, in which the means for conveying the quantity of paraffin to the second mentioned roll comprises a pump, a driving means therefor, and means for rendering the drive to said pump inoperative whereby paraffin can be selectively applied to the second mentioned roll if and when desired.

36. A device as claimed in claim 34, in which the means for supplying paraffin to the second mentioned roll includes a spray-pipe having openings therein through which the paraffin is sprayed onto the surface of said second mentioned roll.

37. In the general organization of a machine for making and folding paper blanks to form receptacles, the combination with means for feeding a strip of paper along a predetermined path, by a straight-line feed through each position where an operation is performed on the paper, a paraffin-applying mechanism for applying paraffin to said paper at one point in the path of travel of said strip, a blanking mechanism for forming the blank for the receptacle at a subsequent point along the path of travel of said strip, so that the paraffin is put on before the blank is formed, and a receptacle-forming mechanism located along the path of travel of said strip adapted to operate on the blanks after they are formed to complete the receptacle, with sufficient distance between the blanking and forming positions to permit the paraffin to harden, said paraffin-applying mechanism comprising a reservoir for the paraffin, a roll above the normal liquid level of the paraffin in said reservoir, a pump for pumping paraffin in said reservoir onto the surface of said roll, and means for preventing the accumulation of excess paraffin adjacent the ends of said roll.

38. In the general organization of a machine for making and folding paper blanks to form receptacles, the combination with means for feeding a strip of paper along a predetermined path, by a straight-line feed through each position where an operation is performed on the paper, a paraffin-applying mechanism for applying paraffin to said paper at one point in the path of travel of said strip, a blanking mechanism for forming the blank for the receptacle at a subsequent point along the path of travel of said strip, so that the paraffin is put on before the blank is formed, and a receptacle-forming mechanism located along the path of travel of said strip adapted to operate on the blanks after they are formed to complete the receptacle, with sufficient distance between the blanking and forming positions to permit the paraffin to harden, said paraffin-applying mechanism comprising a reservoir for the paraffin, a roll above the normal liquid level of the paraffin in said reservoir, a pump for pumping paraffin in said reservoir onto the surface of said roll, and means for preventing the accumulation of excess paraffin adjacent the ends of said roll, comprising scrapers engaging the edges of said roll for scraping the excess paraffin therefrom.

39. In the general organization of a machine for making and folding paper blanks to form receptacles, the combination with means for feeding a strip of paper along a predetermined path, by a straight-line feed through each position where an operation is performed on the paper, a paraffin-applying mechanism for applying paraffin to said paper at one point in the path of travel of said strip, a blanking mechanism for forming the blank for the receptacle at a subsequent point along the path of travel of said strip, so that the paraffin is put on before the blank is formed, and a receptacle-forming mechanism located along the path of travel of said strip adapted to operate on the blanks after they are formed to complete the receptacle, with sufficient distance between the blanking and forming positions to permit the paraffin to harden, said paraffin-applying mechanism comprising a roll engaging one side of said paper, a paraffin tank in which said roll is arranged, said tank being adapted to receive a quantity of paraffin and said roll being out of contact with said paraffin, a yielding and porous covering on said roll, and means for supplying paraffin to the surface of said roll as said roll rotates.

40. In the general organization of a machine for making and folding paper blanks to form receptacles, the combination with means for feeding a strip of paper along a predetermined path, by a straight-line feed through each position where an operation is performed on the paper, a paraffin-applying mechanism for applying paraffin to said paper at one point in the path of travel of said strip, a blanking mechanism for forming the blank for the receptacle at a subsequent point along the path of travel of said strip, so that the paraffin is put on before the blank is formed, and a receptacle-forming mechanism located along the path of travel of said strip adapted to operate on the blanks after they are formed to complete the receptacle, with sufficient distance between the blanking and forming positions to permit the paraffin to harden, said blanking mechanism comprising a die having a portion for cutting the outline of the blank and a portion for scoring portions of the blank so that the blank may be folded to form the receptacle, said first mentioned portion being interchangeable with other similar portions so that the outline of the blank may be changed without changing the scoring of the blanks.

41. In the general organization of a machine for making and folding paper blanks to form receptacles, the combination with means for feeding a strip of paper along a predetermined path, by a straight-line feed through each position where an operation is performed on the paper, a paraffin-applying mechanism for applying paraffin to said paper at one point in the path of travel of said strip, a blanking mechanism for forming the blank for the receptacle at a subsequent point along the path of travel of said strip, so that the paraffin is put on before the blank is formed, and a receptacle-forming mechanism located along the path of travel of said strip adapted to operate on the blanks after they are formed to complete the receptacle, with sufficient distance between the blanking and forming positions to permit the paraffin to harden, said blanking mechanism comprising a die having two portions, one for scoring the paper along predetermined lines to form the body of the receptacle, and a second portion adapted to cut said blank along predetermined lines to form the outline thereof, and the flaps which form a closure for the receptacle, said latter portion being interchangeable with similar portions to form blanks having differently shaped flaps and without changing that portion of the die which scores the blank.

42. In the general organization of a machine for making and folding paper blanks, to form receptacles, the combination with a paraffin-applying mechanism, of a blanking mechanism, means for feeding a continuous strip of paper through said paraffin applying mechanism and subsequently through said blanking mechanism, by a straight-line feed through each position where an operation is performed on the paper, said feeding means including continuously moving feeding elements for feeding the continuous strip of paper continuously at a substantially uniform rate through the paraffin-applying mechanism, and means for changing the movement of the connected blank of the strip of paper after it leaves said paraffin-applying mechanism including means for intermittently starting and stopping the movement of said strip while said strip is in position to be operated on by said blanking mechanism, said blanking mechanism being operable on said strip of paper to form blanks therefrom at the time when said strip of paper is stationary.

43. In the general organization of a machine for making and folding paper blanks to form receptacles therefrom, the combination with a paraffin-applying mechanism and a blanking mechanism, of means for feeding a continuous strip of paper through said paraffin-applying mechanism and then through said blanking mechanism, by a straight-line feed through each position where an operation is performed on the paper, comprising intermittent feeding mechanism for feeding the strip of paper to and past said blanking mechanism and for maintaining the strip of paper at rest while a blank is being formed therefrom, and a continuously moving feeding means for feeding the strip of paper through said paraffin-applying mechanism, at a substantially uniform rate, while said portion being paraffined is still connected to a plurality of blanks that are moving intermittently.

44. A device as set forth in claim 43 which includes, in addition, mechanism for shaping the receptacle from said blanks after said blanks are formed, positioned at the proper angle with respect to the blanks as they arrive at the forming position to immediately begin the formation of the receptacle, and means moving in timed relation with said forming mechanism to sever successive blanks from the continuous strip substantially simultaneously with the beginning of the formation of said receptacle from the blank.

45. In a machine for making paper receptacles with closures having fastening means, the combination of (1) instrumentalities for performing the successive operations in the making of the receptacle in the following order: first, printing on the sheet of paper, second paraffining the paper, third, forming a blank on the sheet, fourth, attaching a metal fastener to the blank, and fifth, severing the blank with its metal fastener from the sheet, preparatory to forming the blank into a receptacle while another blank is being formed, with one or more unsevered blanks between the one being formed and the one being cut off; and (2) feeding means whereby the paper has a continuous feed while being printed and paraffined, and an intermittent feed for the blank forming and fastener attaching operations.

46. A structure as specified in claim 45, the paraffining instrumentalities being disposed in position to waterproof the printing on the sheet of paper.

47. A structure as specified in claim 45, said paraffining instrumentalities being disposed in position to waterproof both the upper and lower surfaces of the sheet of paper.

48. A structure as specified in claim 45, said blank forming instrumentalities being interchangeable with other forming means to form a blank of different shape, thereby in effect substituting an integral paper fastening means for the said metal fastener.

49. In a machine for making paper receptacles, the combination of blank forming means for forming successive blanks on a sheet of paper, means for feeding the paper in a horizontal plane, means for applying a metal fastener to each blank, while the blank is still integral with the sheet of paper, with one blank between the one receiving the fastener and the one being formed, means for thereafter severing the blank with its metal fastener from the sheet, and means for finally forming the blank into a receptacle with said metal fastener in position to perform its function of closing the top of the receptacle, with two unsevered blanks between the one receiving a fastener and the one being formed into a receptacle.

50. In a machine for making containers from sheet material, the combination of means for paraffining the sheet material, cutting means for thereafter forming successive blanks of the sheet material, without severing the blanks, means for thereafter severing the end blank from the series of connected blanks, with the said severing means disposed such a distance from the paraffining means that there is always a plurality of unsevered paraffined blanks in a straight line between the paraffining position and the blank being severed from the sheet, instrumentalities for heating the material after it leaves the paraffining position, means for preventing the connected blanks from buckling, and means for converting the severed blank into a container.

51. A structure as specified in claim 50, in which the relative arrangement of the parts is such that the said number of intermediate blanks between the paraffining position and the blank being severed from the sheet is not less than three, and in which said means for preventing buckling comprises presser bars resting on the intermediate blanks, movable upwardly therefrom.

52. A structure as specified in claim 50, comprising means disposed in position to operate on one of said intermediate blanks to automatically provide each blank, before it is folded, with means for closing the top of the container.

53. In a machine for converting a sheet of paper into containers, by feeding the sheet lengthwise thereof through the machine, so that the sheet enters at one end of the machine and is finally converted into containers at the other end thereof, the combination of means for cutting and forming successive blanks in the sheet, with definite fold lines for each blank, but without completely severing the blanks from each other, or from the unblanked portion of the sheet, paraffining means disposed in position to paraffin the sheet before it reaches the blanking position, and heating means for supporting the unsevered blanks while they are traveling forward from the blanking position to the point where they are, after being cut off, successively converted into containers, serving to prevent cooling of the paraffin on the blanks, which would tend to interfere with the proper folding of the blanks into the desired containers, means for successively severing the said blanks from the end of the sheet, and folding means operative on the practically uncooled blanks to successively form the blanks into containers.

54. A structure as specified in claim 53, comprising heating means for supporting the paraffined sheet between the paraffining position and the blanking position.

55. A structure as specified in claim 53, comprising a jump feed for the sheet, between the paraffining position and the blanking position, operative to advance the paraffined blanks as well as the paraffined unblanked portion of the sheet, immediately after the forming of a new blank on the sheet, there being a plurality of blanks between the blanking position and the container forming position, and said heating means supporting the unconnected and paraffined blanks in a horizontal plane, whereby the blanks are prevented from cooling while advancing intermittently from the blanking position to the container forming position.

56. In a machine for converting paper into containers, by feeding the sheet longitudinally thereof through the machine, the combination of paraffining means disposed in position to continuously paraffin the advancing sheet, and heating means for supporting and keeping the paraffined sheet heated intermediate the paraffining position and the container forming position, to prevent cooling of the paraffin and thereby prevent interference with the proper folding of the blanks, and means for successively severing the said blanks from the end of the sheet, and folding means operative on the practically uncooled blanks to successively form the blanks into containers.

57. A structure as specified in claim 56, comprising means for outlining blanks on the sheet, intermediate the paraffining position and the container forming position, and heating means for supporting the sheet intermediate the paraffining position and the blanking position.

58. In a machine for converting a sheet of paper into containers, by feeding the sheet lengthwise thereof through the machine, the combination of a blanking press for outlining successive blanks on the sheet, paraffining means for paraffining the sheet before it reaches the blanking position, heating means for supporting the sheet intermediate the paraffining position and the blanking position, folding means to convert the blanks successively into containers, and heating means to prevent cooling of the blanks before reaching the folding means.

59. In a machine for making containers from a paper sheet, the combination of paraffining means disposed in position to continuously paraffin the sheet, while the sheet is advancing through the machine, a blanking press having means for cutting the paraffined sheet to successively form paraffined container blanks, folding means to convert the blanks successively into containers, and heating means to prevent cooling of the blanks before reaching the folding means, said heating means serving to keep the blanks flat in a horizontal plane while moving in said plane.

60. A structure as specified in claim 59, said cutting means being operative to leave the blank connected to the paraffined and unblanked portion of the sheet.

WALTER F. NEWHOUSE.
LESLIE M. HILE.